United States Patent
Caminade et al.

(10) Patent No.: US 7,838,625 B2
(45) Date of Patent: Nov. 23, 2010

(54) DENDRITIC POLYMERS HAVING BIPHOSPHONIC TERMINATIONS, DERIVATIVES THEREOF, METHOD FOR PREPARING THEM, AND THEIR USE

(75) Inventors: Anne-Marie Caminade, Tolouse (FR); Jean-Pierre Majoral, Ramonville St Agne (FR); Laurent Griffe, Carcassonne (FR); Cédric Turrin, Toulouse (FR); Pascal Metivier, Paris (FR)

(73) Assignees: Rhodia Uk Ltd., Watford (GB); Center National de la Recherche Scientifique (C.N.R.S.), Paris (FR)

( * ) Notice: Subject to any disclaimer, the term of this patent is extended or adjusted under 35 U.S.C. 154(b) by 131 days.

(21) Appl. No.: 10/580,459

(22) PCT Filed: Nov. 23, 2004

(86) PCT No.: PCT/FR2004/002988

§ 371 (c)(1), (2), (4) Date: May 24, 2006

(87) PCT Pub. No.: WO2005/052031

PCT Pub. Date: Jun. 9, 2005

(65) Prior Publication Data

US 2007/0106030 A1  May 10, 2007

(30) Foreign Application Priority Data

Nov. 24, 2003 (FR) .................................. 03 13752

(51) Int. Cl.
*C08G 79/04* (2006.01)
*C08G 79/06* (2006.01)

(52) U.S. Cl. ................. 528/398; 528/399; 424/DIG. 16

(58) Field of Classification Search .......... 424/DIG. 16; 504/367

See application file for complete search history.

(56) References Cited

U.S. PATENT DOCUMENTS

| | | | | |
|---|---|---|---|---|
| 2,964,549 | A * | 12/1960 | Ramsey et. al. | ............... 556/19 |
| 3,629,124 | A * | 12/1971 | King | ......................... 510/228 |
| 3,925,245 | A * | 12/1975 | Harris et al. | ........... 252/389.22 |
| 4,783,500 | A | 11/1988 | Webster et al. | |
| 4,871,779 | A | 10/1989 | Killat et al. | |
| 6,464,971 | B1 * | 10/2002 | Matthews et al. | ........ 424/78.17 |

FOREIGN PATENT DOCUMENTS

| | | |
|---|---|---|
| FR | 2734268 | 5/1995 |
| FR | 2 734 268 A1 | 11/1996 |
| WO | WO0053009 A1 * | 9/2000 |
| WO | 00/64975 A1 | 11/2000 |

OTHER PUBLICATIONS

Prevote, D. et al., "*Phosphate-, Phosphite-, Ylide-, and Phosphonate-Terminated Dendrimers*", Journal of Organic Chemistry, vol. 62, No. 14, 1997, pp. 4834-4841, American Chemical Society, Columbus, OH, USA.

Launay et al., "Synthesis of bowl-shaped dendrimers from generation 1 to generation 8," *J. Organometallic Chemistry*, 1997, pp. 51-58, vol. 529, Elsevier Science S.A.

Launay et al., A General Synthetic Strategy for Neutral Phosphorus-Containing Dendrimers, Angew. Chem. Int. Ed. Engl., 1994, vol. 33, pp. 1589-1592. VCH Verlogsgesellschaft mbH, Germany.

* cited by examiner

*Primary Examiner*—Randy Gulakowski
*Assistant Examiner*—Mike Dollinger
(74) *Attorney, Agent, or Firm*—Buchanan Ingersoll & Rooney PC

(57) ABSTRACT

The invention relates to novel dendritic polymers having biphosphonic terminations, to derivatives thereof, to a method for preparing them and to their uses.

62 Claims, No Drawings

DENDRITIC POLYMERS HAVING BIPHOSPHONIC TERMINATIONS, DERIVATIVES THEREOF, METHOD FOR PREPARING THEM, AND THEIR USE

CROSS-REFERENCE TO RELATED APPLICATIONS

This application is the U.S. national stage of International Application No. PCT/FR2004/002988, filed Nov. 23, 2004 and claims priority under 35 U.S.C. §119 of Application No. 03/13752, filed in France on Nov. 24, 2003, incorporated by reference herein in their entireties and relied upon.

Dendritic polymers are macromolecules composed of monomers which combine according to a branching process around a central multifunctional core.

Dendritic polymers, also called "cascade molecules", are highly branched functional polymers of defined structure. Those macromolecules are, in fact, polymers because they are based on the combination of repeating units. However, dendritic polymers are fundamentally different from conventional polymers in that they have their own properties due to their branched structure. The molecular weight and the form of dendritic polymers can be controlled precisely, and all the functions are situated at the ends of the branches, forming a surface, which renders them readily accessible.

Dendritic polymers are constructed step by step by the repetition of a reaction sequence, allowing each repeating unit and the terminal functions to be multiplied. Each reaction sequence forms a so-called "new generation". The aborescent structure is obtained by the repetition of a reaction sequence, which allows a new generation and an increasing number of identical branches to be obtained at the end of each reaction cycle. After several generations, the dendritic polymer generally assumes a globular form which is highly branched and multifunctionalized by virtue of the large number of terminal functions present at the periphery.

Such polymers have been described especially by Launay et al., *Agnew. Chem. Int. Ed. Engl.*, 1994, 33, 15/16, 1589-1592, or by Launay et al., *Journal of Organometallic Chemistry*, 1997, 529, 51-58.

The treatment of surfaces, for example in order to protect them, involves the phenomenon of adhesion, which often requires the presence of hydrogen-bond donor and acceptor groups on the surface and/or the protecting agent. It is therefore desirable to provide agents that have a high hydrogen-bond capacity as surface-treatment agents.

Owing to their structure, dendritic polymers exhibit a high density of terminations and therefore a high functional density at their periphery. It has therefore been envisaged to prepare functional dendritic polymers permitting the creation of hydrogen bonds with the aim of using them as surface-treatment agents.

The phosphonic acid function or the corresponding methyl ester function, and a fortiori the corresponding bis functions, are particularly favourable for the formation of hydrogen bonds. It is therefore desirable to prepare dendritic polymers having biphosphonic acid-functional terminations, or derivatives thereof.

Dendritic polymers having various phosphorus-containing functions (phosphine, phosphinate, phosphate, phosphonate, phosphorane, spirophosphorane) have been described especially in the articles mentioned above or in French patent application FR 95 06 281.

However, no dendritic polymer having free biphosphonic acid terminations, or optionally terminations in the form of corresponding salts or esters, has been described. In fact, it has hitherto been impossible to prepare such functionalities on dendritic polymers. More precisely, it was impossible to prepare dendritic polymers exhibiting a biphosphonic acid function. This has now been made possible starting from the corresponding methyl ester.

The inventors have now found a reaction that allows the type of terminal functionality of the diester or biphosphonic acid type to be obtained on dendritic polymers.

According to a first object, the present invention according relates to dendritic polymers exhibiting two terminal functions —$PO(OX)_2$, wherein X represents a radical -Alkyl or -Aryl, or —$PO(OH)_2$ or the corresponding salts, at the termination of each branch.

According to a second object, the present invention relates also to a method for preparing such dendritic polymers.

According to another object, the present invention relates also to the use of the dendritic polymers according to the invention in the treatment of surfaces.

The present invention accordingly relates to dendritic polymers of generation n comprising:
- a central core § of valence m;
- optionally generation chains branching around the core;
- an intermediate chain at the end of each generation chain that may be present or at the end of each bond around the core, where appropriate; and
- a terminal group at the end of each intermediate chain, characterised in that said terminal group is represented by the formula:

$$\text{-}(A1)\text{<}[A2\text{-}P(\text{=}O)(OX_2]_2 \qquad (T)$$

wherein
-A1< represents the radical -CR< or -Heteroatom<;
the radicals A2, which may be identical or different, each independently of the other represents a single bond or a linear or branched hydrocarbon chain having from 1 to 6 chain members, it being possible for each of said chain members optionally to be selected from a heteroatom, preferably nitrogen, it being possible for each chain member to be optionally substituted by one or more substituents selected from -Alkyl, -Hal, —$NO_2$, —NRR', —CN, —$CF_3$, —OH, —OAlkyl, -Aryl, -Aralkyl;
X represents a radical -Alkyl, -Aryl, —H or $M^+$, wherein $M^+$ is a cation,
m represents an integer greater than or equal to 1;
n represents an integer from 0 to 12;
< represents two bonds situation on A1.

Most frequently, the dendritic polymers of the invention comprise intermediate chains terminated by a terminal group:
- at the end of each generation chain that may be present; or
- at the end of each bond around the core that is not connected to a generation chain.

The dendritic polymers of the invention accordingly generally comprise m arms linked to the central core §, each of those arms being:
- an arm of type (1), that is to say an arm constituted by an intermediate chain terminated by a terminal group of formula (T); or
- an arm of type (2), that is to say an arm constituted by one or more generation chains comprising at its end an intermediate chain terminated by a terminal group of formula (T).

According to a particular embodiment, the dendritic polymers comprise only arms of type (1) linked to the central core §.

According to another embodiment, the dendritic polymers comprise only arms of type (2) linked to the central core §.

The dendritic polymers according to the invention preferably correspond to commercially available dendritic polymers to the surface of which the terminal group -(A1)<[A2-P(=O)(OX)_2]_2$ has been grafted.

According to the invention, said commercially available dendritic polymers are selected especially from dendritic polymers of the type DAB-AM, PAMAM (especially Starbust®) having terminal functions —NH$_2$, —OH or —COOH, of the PMMH type, such as cyclotriphosphazene- or thio- phosphoryl-PMMH, or alternatively from phosphorus-containing dendritic polymers such as:
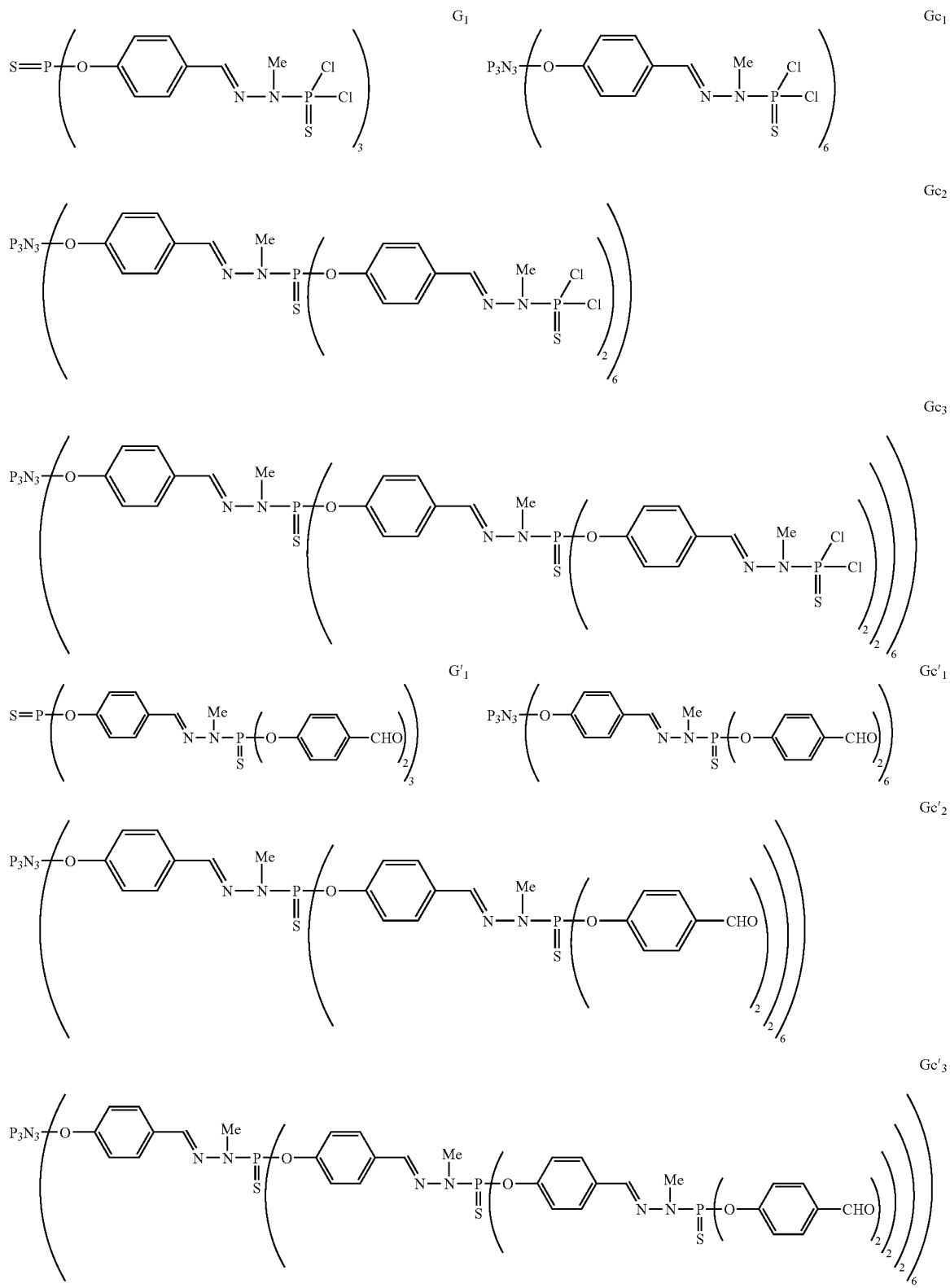
as well as subsequent generations.

All those dendritic polymers are marketed by Aldrich.

A1 represents the radical —CH< or —N<.

The groups —P(=O)(OX)$_2$ are preferably in the gem position.

X represents a radical -Alkyl, such as -Methyl.

A2 represents -Me-.

The central core § is constituted by at least one atom of valence m.

The central core § can be selected from any atom or radical having a valence m greater than or equal to 1. § preferably contains at least one heteroatom.

M$^+$ is a cation of an atom, for example a metal atom, or a cation derived from any radical capable of being stable in cation form. Said cation can be selected especially from the salts of a nitrogen-containing base, especially ammonium salts, on their own or in a mixture, especially with cationic surfactants.

M$^+$ preferably represents a cation of an element of group IA, IIA, IIB or IIIA of the periodic table; M is preferably selected from sodium, potassium, calcium, barium, zinc, magnesium, lithium and aluminium atoms, more preferably from sodium, lithium and potassium.

According to another preferred aspect, M$^+$ represents the cation of a nitrogen-containing base, such as HNEt$_3^+$.

The core § is preferably selected from the following groups:

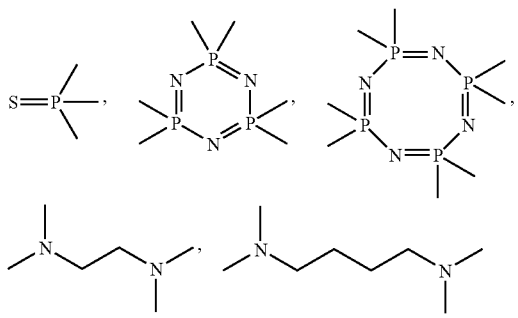

The central core § preferably has the formula:

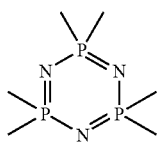

m represents an integer from 1 to 8, more preferably from 3 to 8, more particularly 3, 4 or 6;

n represents the number of generations of the dendritic polymer; it represents an integer from 0 to 12; preferably from 0 to 3;

The generation chains are selected from any linear or branched hydrocarbon chain having from 1 to 12 chain members and optionally containing one or more double or triple bonds, it being possible for each of said chain members optionally to be selected from a heteroatom, a group Aryl, Heteroaryl, >C=O, >C=NR, it being possible for each chain member to be optionally substituted by one or more substituents selected from -Alkyl, -Hal, —NO$_2$, —NRR', —CN, —CF$_3$, —OH, —OAlkyl, -Aryl, -Aralkyl, wherein R and R', which may be identical or different, each independently of the other represents a hydrogen atom or a radical -Alkyl, -Aryl, -Aralkyl;

The generation chains, which may be identical or different, are preferably represented by formula:

wherein:

A represents an oxygen atom, a sulfur atom, a phosphorus atom or a radical —NR—;

B represents a radical -Aryl-, -Heteroaryl-, -Alkyl-, it being possible for each of those radicals to be optionally substituted by a Halogen atom or by a radical —NO$_2$, —NRR', —CN, —CF$_3$, —OH, -Alkyl, -Aryl, -Aralkyl;

C represents a carbon atom,

D and E, which may be identical or different, each independently of the other represents a hydrogen atom, a radical -Alkyl, —OAlkyl, -Aryl, -Aralkyl, it being possible for each of those radicals to be optionally substituted by a halogen atom or by a radical —NO$_2$, —NRR', —CN, —CF$_3$, —OH, -Alkyl, -Aryl, -Aralkyl;

G represents a sulfur, oxygen, nitrogen, Sulfur, Selenium or Tellurium atom or a radical =NR;

N represents a nitrogen atom;

P represents a phosphorus atom.

In the general formula (C1) above, A preferably represents an oxygen atom.

In the general formula (C1) above, B preferably represents a phenyl ring optionally substituted by a halogen atom or by a radical —NO$_2$, —NRR', —CN, —CF$_3$, —OH, -Alkyl, -Aryl, -Aralkyl; more preferably, B represents an unsubstituted phenyl ring.

In the general formula (C1) mentioned above, D preferably represents a hydrogen atom.

In the general formula (C1) mentioned above, E preferably represents a radical -Alkyl.

In the general formula (C1) above, G preferably represents a sulfur atom.

According to another preferred aspect, the generation chains are represented by formula:

wherein

A' and B' each independently of the other represents a radical -Alkyl, -Alkenyl, -Alkynyl, each of which is optionally substuted by one or more substituents selected from -Alkyl, -Hal, —NO$_2$, —NRR', —CN, —CF$_3$, —OH, —OAlkyl, -Aryl, -Aralkyl;

R, R' have the meaning defined hereinbefore.

A' preferably represents -Alkyl-, more preferably -Ethyl.

B' preferably represents -Alkyl-, more preferably -Ethyl.

R preferably represents a hydrogen atom.

According to another preferred aspect, the generation chains are represented by formula:

wherein

A" represents a radical -Alkyl, -Alkenyl, -Alkynyl, each of which is optionally substituted by one or more substituents selected from -Alkyl, -Hal, —NO$_2$, —NRR', —CN, —CF$_3$, —OH, —OAlkyl, -Aryl, -Aralkyl, wherein RR' have the meaning defined hereinbefore.

A" preferably represents -Alkyl-, more preferably -Propyl-.

According to another preferred aspect, the dendritic polymers according to the invention of generation 1 do not comprise a generation chain. In particular, in the case where the generation chain is represented by formula (C1') or (C1"), the corresponding dendritic polymers of generation 1 do not comprise a generation chain.

The intermediate chains are selected from any linear or branched hydrocarbon chain having from 1 to 12 chain members and optionally containing one or more double or triple bonds, it being possible for each of said chain members optionally to be selected from a heteroatom, a group Aryl, Heteroaryl, >C=O, >C=NR, it being possible for each chain member to be optionally substituted by one or more substituents selected from -Alkyl, -Hal, —NO$_2$, —NRR', —CN, —CF$_3$, —OH, —OAlkyl, -Aryl, -Aralkyl, wherein RR' have the meaning defined hereinbefore.

The intermediate chains preferably have a single bond at their ends.

The intermediate chains, which may be identical or different, are preferably represented by formula:

-J-K-L- (C2)

wherein

J represents an oxygen atom, a sulfur atom or a radical —NR—;

K represents a radical -Aryl-, -Heteroaryl-, -Alkyl-, it being possible for each of those radicals to be optionally substituted by a Halogen atom or by a radical —NO$_2$, —NRR', —CN, —CF$_3$, —OH, -Alkyl, -Aryl, -Aralkyl;

L represents a linear or brached hydrocarbon chain having from 1 to 6 chain members and optionally containing one or more double or triple bonds, it being possible for each of said chain members optionally to be a heteroatom, it being possible for each chain member to be optionally substituted by one or more substituents selected from -Alkyl, -Hal, —NO$_2$, —NRR', —CN, —CF$_3$, —OH, —OAlkyl, -Aryl, -Aralkyl, wherein RR' have the meaning defined hereinbefore.

In formula (C2) above, J preferably represents an oxygen atom.

In formula (C2) above, K preferably represents an optionally-substituted phenyl ring; more preferably, K represents an unsubstituted phenyl ring.

In formula (C2) above, L preferably represents a radical -(Alk)$_a$-, or L represents the radical —C(D)=N—N(E)-(Alk)$_a$-, wherein C represents ea carbon atom, D and E, which may be identical or different, each independently of the other represents a hydrogen atom, a radical -Alkyl, —OAlkyl, -Aryl, -Aralkyl, each of which radicals may optionally be substituted by a Halogen atom or by a radical —NO$_2$, —NRR', —CN, —CF$_3$, —OH, -Alkyl, -Aryl, -Aralkyl;

a represents 0 or 1;

R, R' have the meaning defined hereinbefore.

According to another preferred aspect, the intermediate chains are represented by formula

-A'-(C=O)—N(R)-B'- (C2')

wherein A', B', R, R' have the meaning defined hereinbefore.

A' preferably represents -Alkyl-; more preferably -Ethyl-.
B' preferably represents -Alkyl-; more preferably -Ethyl-.
R preferably represents a hydrogen atom.

According to another preferred aspect, the intermediate chains are represented by formula

-A"- (C2")

wherein

A" has the meaning defined hereinbefore.

A" preferably represents a radical -Alkyl-, more preferably -Propyl-.

The generation chains are preferably identical.

In formulae (C1) and (C2) mentioned above, J and K are preferably equal to A and B, respectively.

The dendritic polymers according to the invention can preferably be represented by the following formula (I-1i):

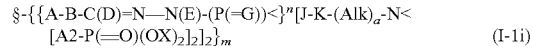

§-{{A-B-C(D)=N—N(E)-(P(=G))<}$^n$[J-K-(Alk)$_a$-N<
[A2-P(=O)(OX)$_2$]$_2$]$_2$}$_m$ (I-1i)

in which:

§, A, B, C, D, E, G, N, P, J, K, X, A2, m, n have the meaning defined hereinbefore, 0$^n$denotes the branched structure of the generation n chains of said dendritic polymer, and a represents 0 or 1; A2 preferably represents a radical -Alkyl-.

The dendritic polymers according to the invention can preferably be represented by the following formula (I-1ii):

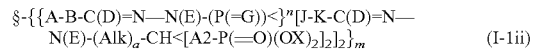

§-{{A-B-C(D)=N—N(E)-(P(=G))<}$^n$[J-K-C(D)=N—
N(E)-(Alk)$_a$-CH<[A2-P(=O)(OX)$_2$]$_2$]$_2$}$_m$ (I-1ii)

in which:

§, A, B, C, D, E, G, N, P, J, K, X, A2, m, n have the meaning defined hereinbefore, 0$^n$denotes the branched structure of the generation n chains of said dendritic polymer, and a represents 0 or 1; A2 preferably represents a single bond.

According to another preferred aspect, the dendritic polymers according to the invention can be represented by the following formula (I-2):

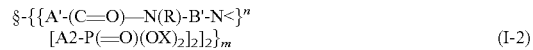

§-{{A'-(C=O)—N(R)-B'-N<}$^n$
[A2-P(=O)(OX)$_2$]$_2$]$_2$}$_m$ (I-2)

in which:

§, A', B', C, N, P, X, A2, m, n have the meaning defined hereinbefore and 0$^n$denotes the branched structure of the generation n chains of said dendritic polymer.

According to another preferred aspect, the dendritic polymers according to the invention can be represented by the following formula (I-3):

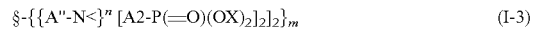

§-{{A"-N<}$^n$ [A2-P(=O)(OX)$_2$]$_2$]$_2$}$_m$ (I-3)

in which:

§, A", N, P, X, A2, m, n have the meaning defined hereinbefore and 0$^n$denotes the branched structure of the generation n chains of said dendritic polymer.

According to the present invention, the radical -Alk, -Alkyl or -Alkyl- represents an alkyl radical, that is to say a straight-chained or branched saturated hydrocarbon radical having from 1 to 20 carbon atoms, preferably from 1 to 5 carbon atoms.

In the case of linear radicals, particular mention may be made of the radicals methyl, ethyl, propyl, butyl, pentyl, hexyl, octyl, nonyl, decyl, dodecyl, hexadecyl and octadecyl.

In the case of branched radicals or radicals substituted by one or more alkyl radicals, particular mention may be made of the radicals isopropyl, tertbutyl, 2-ethylhexyl, 2-methylbutyl, 2-methylphenyl, 1-methylpentyl, and 3-methylheptyl.

-Alkenyl or -Alkenyl- denotes an aliphatic hydrocarbon group that contains at least one carbon-carbon double bond and that can be linear or branched and has from approximately 2 to approximately 15 carbon atoms in the chain. Preferred alkenyl groups have from 2 to approximately 12 carbon atoms in the chain; and more preferably, from approximately 2 to approximately 4 carbon atoms in the chain. Branched means that one or more lower alkyl groups, such as methyl, ethyl or propyl, are bonded to a linear alkenyl chain. Typical examples of alkenyl groups include ethenyl, propenyl, n-butenyl, isobutenyl, 3-methylbut-2-enyl, n-pentenyl, heptenyl, octenyl, cyclohexylbutenyl and decenyl.

-Alkynyl or -Alkynyl- denotes an aliphatic hydrocarbon group that contains at least one carbon-carbon triple bond and that can be linear or branched and has from 2 to approximately 15 carbon atoms in the chain. Preferred alkynyl groups have from 2 to approximately 12 carbon atoms in the chain; more preferably, from approximately 2 to approximately 4 carbon atoms in the chain. Branched means that one or more lower alkyl groups, such as methyl, ethyl or propyl, are bonded to a linear alkynyl chain. Typical examples of alkynyl groups include ethynyl, propynyl, n-butynyl, 2-butynyl, 3-methylbutynyl, n-pentynyl, heptynyl, octynyl and decynyl.

Among the halogen atoms (Hal) there may be mentioned more especially fluorine, chlorine, bromine and iodine atoms, preferably fluorine.

The radical -Aryl- or -Aryl- represents an Aryl radical, that is to say a mono- or bi-cyclic aromatic hydrocarbon system having from 6 to 10 carbon atoms.

Among the Aryl radicals there may be mentioned especially the phenyl or naphthyl radical.

Among the radicals -Aralkyl (-AlkylAryl) there may be mentioned especially the benzyl or phenethyl radical.

The term "Heteroatom" denotes a nitrogen, oxygen, phosphorus, silicon or sulfur atom.

-Heteroaryl or -Heteroaryl- denotes a Heteroaryl radical, that is to say a mono or bi-cyclic aromatic system comprising one or more heteroatoms selected from nitrogin, oxygen and sulfur and having from 5 to 10 carbon atoms. Among the Heteroaryl radicals there may be mentioned pyrazinyl, thienyl, oxazolyl, furazanyl, pyrrolyl, 1,2,4-thiadiazolyl, naphthyridinyl, pyridazinyl, quinoxalinyl, phthalazinyl, imidazo[1,2-a]pyridine, imidazo[2,1-b]-thiazolyl, cinnolinyl, triazinyl, benzofurazanyl, azaindolyl, benzimidazolyl, benzothienyl, thienopyridyl, thienopyrimidinyl, pyrrolopyridyl, imidazopyridyl, benzoazaindole, 1,2,4-triazinyl, benzothiazolyl, furanyl; imidazolyl, indolyl, triazolyl, tetrazolyl, indolizinyl, isoxazolyl, isoquinolinyl, isothiazolyl, oxadiazolyl, pyrazinyl, pyridazinyl, pyrazolyl, pyridyl, pyrimidinyl, purinyl, quinazolinyl, quinolinyl, isoquinolyl, 1,3,4-thiadiazolyl, thiazolyl, triazinyl, isothiazolyl, carbazolyl, as well as the corresponding groups obtained from the fusion thereof or from fusion with the phenyl ring. Preferred Heteroaryl groups include thienyl, pyrrolyl, quinoxalinyl, furanyl, imidazolyl, indolyl, isoxazolyl, isothiazolyl, pyrazinyl, pyridazinyl, pyrazolyl, pyridyl, pyrimidinyl, quinazolinyl, quinolinyl, thiazolyl, carbazolyl, thiadiazolyl, and the groups obtained from the fusion thereof with a phenyl ring, more especially quinolinyl, carbazolyl, thiadiazolyl.

According to the invention, "corresponding dendritic polymer" is understood as meaning the dendritic polymer of the same generation that possesses the same cores, generation chains, intermediate chains and distinct terminal groups.

Salts of the compounds according to the invention refer to the addition salts of the compounds of the present invention. Those salts can be prepared in situ during the final isolation and purification of the compounds. The addition salts can be prepared by separately reacting the purified compound in its acid form with an organic or inorganic base and isolating the salt so formed. The addition salts include amine and metallic salts. Suitable metallic salts include sodium, potassium, calcium, barium, zinc, magnesium and aluminium salts. Sodium and potassium salts are preferred. Suitable inorganic basic addition salts are prepared from metal bases, which include sodium hydride, sodium hyroxide, potassium hydroxide, calcium hydroxide, aluminium hydroxide, lithium hydroxide, magnesium hydroxide, zinc hydroxide.

According to another object, the present invention relates also to a method for preparing the above-mentioned dendritic polymers.

The compounds of the invention can be prepared by application or adaptation of any method that is known per se by and/or that is within the scope of the person skilled in the art and that permits the grafting of —$PO_3X_2$ functions, in particular -(A1)<[A2-P(=O)(OX)$_2$]$_2$, especially those described by Larock in *Comprehensive Organic Transformations*, VCH Pub., 1989, or by application or adaptation of the methods described in the Examples which follow.

In the reactions described hereinbelow, it may be necessary to protect the reactive functional groups, for example the hydroxy, amino, imino, thio, carboxy groups, when they are desired in the final product, in order to avoid their undesirable participation in the reactions. Conventional protecting groups can be used in accordance with standard practice; for examples see T. W. Green and P. G. M. Wuts in *Protective Groups in Organic Chemistry*, John Wiley and Sons, 1991; J. F. W. McOmie in *Protective Groups in Organic Chemistry*, Plenum Press, 1973.

According to the invention, the method for preparing a dendritic polymer according to the invention comprising the terminal group -$A_1$<[A2-P(=O)(OX)$_2$]$_2$ comprises:

(i) reacting the corresponding dendritic polymer having a terminal function —CHO, —CH=NR, —NH$_2$ or —P(=G)Cl$_2$ with a corresponding compound having one or two —$PO_3X_2$ functionalities;

(ii) optionally followed, when X represents H or M, by a step which comprises converting the dendritic polymer obtained in (i) having a —$PO_3Me_2$ termination into the corresponding dendritic polymer having a -A1<[A2-P (=O)(OH)$_2$]$_2$ termination, (iii) optionally followed, when X represents M, by a step which comprises converting the dendritic polymer obtained in (ii) having a -A1<[A2-P(=O)(OH)$_2$]$_2$ termination into the salt of the corresponding dendritic polymer having a -A1<[A2-P(=O)(OM)$_2$]$_2$ termination.

The corresponding starting dendritic polymers are commercially available (Aldrich) or can be prepared according to methods known per se.

More precisely, step (i) can be carried out according to the invention according to the following alternatives:

According to a first alternative, when the dendritic polymer according to the invention is represented by formula (I-1i)

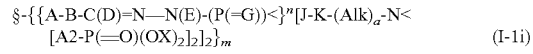

in which §, A, B, C, D, E, G, N, P, J, K, A2, Alk, X, a, m, n, < have the meaning defined hereinbefore, step (i) comprises reacting with the corresponding dendritic polymer of the same generation n of formula

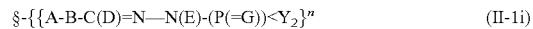

wherein Y represents —Cl;
a compound of formula

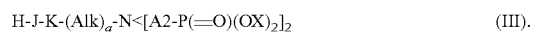

This reaction is carried out with stirring, in solution in a polar aprotic solvent, such as THF, acetonitrile, chloroform, dichloromethane, DMF or acetone, preferably THF, in the presence of an organic or inorganic base, such as cesium carbonate, at a temperature of from −80° C. to 100° C., preferably at ambient temperature.

In formula (II-1i), G preferably represents S.

The dendritic polymers of formula (II-1i) are preferably selected from SPCl$_3$, P$_3$N$_3$Cl$_6$,

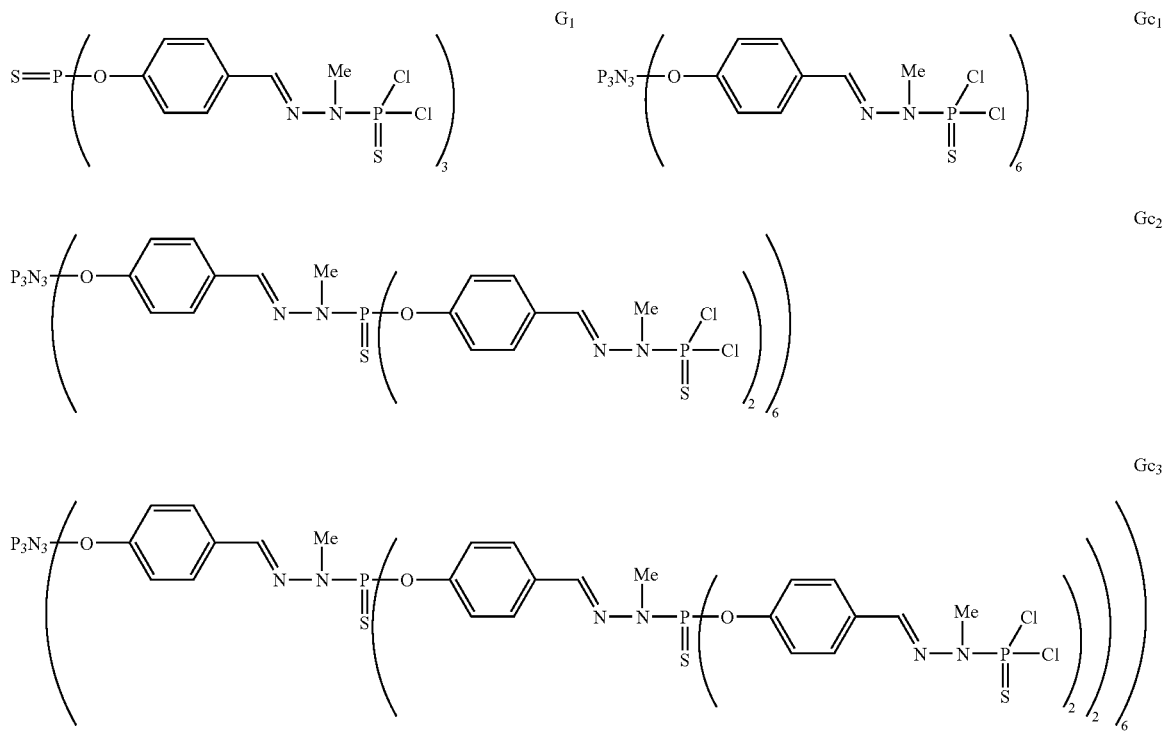

According to a second alternative, when the dendritic polymer according to the invention is represented by formula (I-2) or (I-3):

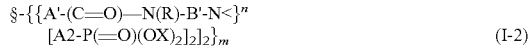
(I-2)

or

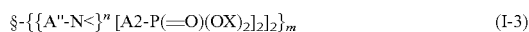
(I-3)

in which §, A', A", B', B", C, N, P, A2, X, m, n, < have the meaning defined hereinbefore, step (i) comprises reacting with the corresponding dendritic polymer of the same generation n of the formula

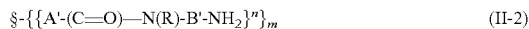
(II-2)

or

(II-3)

a compound of formula

(IV), in the presence of a corresponding compound of formula H-A2-(C=O)H (V).

This reaction is carried out with stirring, optionally diluted in aqueous solution, at a temperature of from −5° C. to the reflux temperature of the mixture.

The compounds of formulae (IV) and (V) are commercially available (Aldrich) or can be prepared according to methods known per se.

The dendritic polymers of formulae (II-2) and (II-3) are commercially available (Aldrich). They are preferably of the DAB or PAMAM type mentioned above.

According to a third alternative, when the dendritic polymer according to the invention is represented by formula (I-1ii)

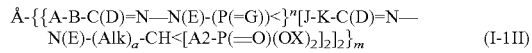
(I-1II)

in which:

§, A, B, C, D, E, G, N, P, J, K, L, X, A2, m, n, a have the meaning defined hereinbefore, step (i) comprises reacting with the corresponding dendritic polymer of formula

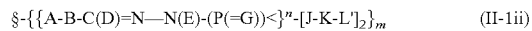
(II-1ii)

wherein L' represents a radical —CHO;

a compound of formula

(VI)

wherein Alk' corresponding to Alk defined above in formula (I-1ii) represents an Alkenyl radical, in the presence of a compound of formula

(VII).

This reaction can be carried out by application or adaptation of the method described in J. Org. Chem., 1977, 62, 4834.

The procedure is preferably carried out in a polar aprotic solvent medium, such as THF, chloroform, dichloromethane or acetonitrile, preferably $CH_2Cl_2$, by the simultaneous addition of (VI) and (VII) to the dendritic polymer at a temperature of from −80° C. to 50° C., preferably approximately 0° C.

The compounds of formulae (VI) and (VII) are commercially available or can be prepared according to methods known per se.

The dendritic polymers of formula (II-1ii) are preferably selected from: $SPCl_3$, $P_3N_3Cl_6$,

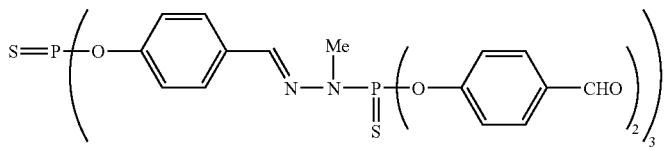

$G_1$

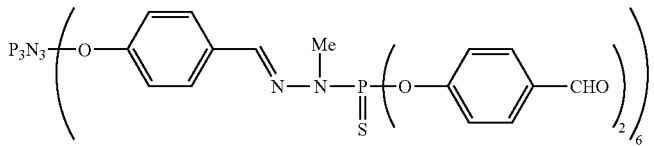

$Gc_1$

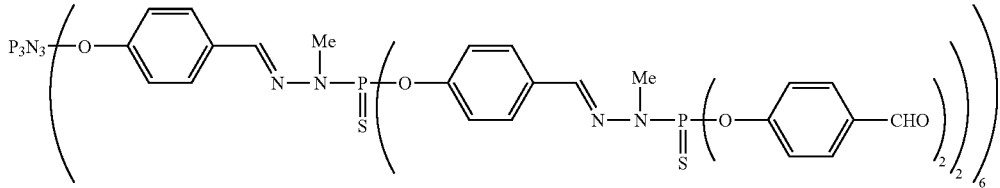

$Gc_2$

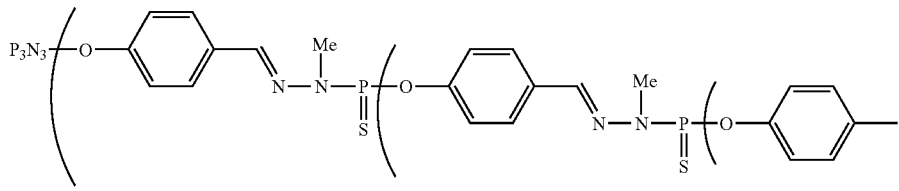

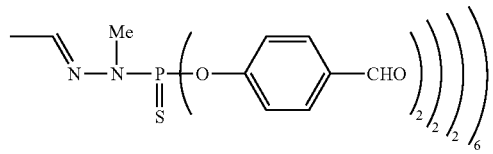

$Gc_3$

In order to obtain a compound of a dendritic polymer according to the invention wherein X=H or M, step (i) is preferably carried out with a reagent of formula (III), (IV) or (VI) wherein X=Me. Step (ii) is then carried out starting from the compound of formula (I-1i), (I-2), (I-3), (I-1ii) obtained in (i) wherein X=Me Step (ii) is preferably carried out:
- by the action of a trimethylsilane halide, preferably trimethylsilane bromide ($Me_3SiBr$) in a polar aprotic organic solvent, such as acetonitrile, chloroform or dichloromethane, preferably acetonitrile. The procedure is preferably carried out by slowly adding the trimethylsilane halide while keeping the reaction mixture at a temperature of from −80° C. to 50° C., preferably at approximately 0° C.
- followed by the action of anhydrous MeOH, which is added to the reaction mixture.

In step (iii), the acid salts of the compounds according to the invention can be obtained starting from the compounds according to the invention having a terminal group in which X represents a hydrogen atom, by application or adaptation of known processes, by addition of a base. The procedure is preferably carried out in solution, with stirring, in a suitable protic or aprotic, polar solvent, such as THF, chloroform, dichloro methane, DMF, acetonitrile, alcohols, water, preferably water, in the presence of an organic or inorganic base, such as sodium, lithium or potassium hydroxide, depending on the salt that is desired.

When the starting dendritic polymers that are used have terminal groups other than the terminal functions described above for the dendritic polymers of formulae (II-1i), (II-1ii), (II-2) and (II-3), the method according to the invention comprises an additional preliminary step which allows said groups to be converted into said required functions. For example, in the case of dendritic polers having terminal groups of the carboxylic acid or hydroxyl type, it is sufficient to carry out any reaction allowing said groups of the carboxylic acid or hydroxyl type to be converted into functions of the —$NH_2$, —CHO, —CH=NR or —$PSCl_2$ type corresponding to the dendritic polymers of formula (II-1i), (II-1ii), (II-2) or (II-3). Such reactions are known to the person skilled in the art and/or can be carried out by application or adaptation of those discussed by Larock et al. (supra).

In order to obtain a dendritic polymer according to the invention of generation 0, the above reactions can be carried out in the same manner by proceeding from the core, which has the required functionality. For example, the generation reactions can be carried out starting from a $PSCl_3$, $P_3N_3Cl_6$, $P_4N_4Cl_8$ or

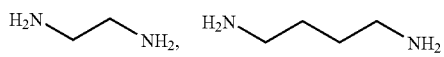

core.

The compounds of formula (III) are novel and accordingly also form part of the present invention.

The present invention accordingly relates also to compounds of formula (III):

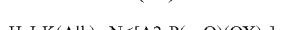 (III)

in which

X represents H, a radical -Alkyl, -Aryl or M⁺, wherein M⁺ represents a cation;

J represents an oxygen atom, a sulfur atom or a radical —NR—;

K represents a radical -Aryl-, -Heteroaryl-, -Alkyl-, each of which may optionally be substituted by a Halogen atom or by a radical —NO$_2$, —NRR', —CN, —CF$_3$, —OH, -Alkyl, -Aryl, -Aralkyl;

the radicals A2, which may be identical or different, each independently of the other represents a single bond or a linear or branched hydrocarbon chain having from 1 to 6 chain members, it being possible for each of said chain members optionally to be selected from a heteroatom, preferably nitrogen, it being possible for each chain member to be optionally substituted by one or more substituents selected from -Alkyl, -Hal, —NO$_2$, —NRR', —CN, —CF$_3$, —OH, —OAlkyl, -Aryl, -Aralkyl;

-Alk- represents an alkyl radical;

a represents 0 or 1.

In formula (III) above, J preferably represents an oxygen atom.

In formula (III) above, K preferably represents an optionally substituted phenyl ring; more preferably, K represents an unsubstituted phenyl ring.

In formula (III) above, -Alk- preferably represents a radical -Ethyl-.

In formula (III) above, A2 preferably represents a radical -Alkyl-, more preferably -Methyl-.

In formula (III) above, X preferably represents —H or -Me.

The compounds of formula (III) can be obtained from a compound of formula (VIII) in the following manner:

H-J-K(Alk)$_a$-NH$_2$ (VIII+H-A2'-(C=O)H (V)+H—P(=O)(OX)$_2$ (IV)

→H-J-K-(Alk)$_a$-N<[A2-PO$_3$X$_2$]$_2$ (III)

wherein, in formula (V), -A2'- is a radical corresponding to A2.

That reaction is carried out by application or adaptation of a method known per se, especially described in I. Linzaga et al., Tetrahedron 2002, 58, 8973-8978. The procedure is carried out especially by the slow addition of the compounds (VIII) and (IV), then of the compound (V), optionally diluted in aqueous solution, preferably at a temperature of from −5 to 25° C., preferably at approximately 0° C. The reaction mixture is then allowed to adjust to ambient temperature and is then optionally reacted under reflux.

In the description of the method hereinbefore, two groups are said to be "corresponding" when they are both included in a starting product and an end product, and their structure is identical and can be derived one from the other.

Said method may optionally also include a step comprising isolation of the product obtained following steps (i), (ii) and/or (iii).

The compound so prepared can be recovered from the reaction mixture by conventional methods. For example, the compounds can be recovered by removing the solvent from the reaction mixture by distillation or, if necessary, after removal of the solvent from the mixture of the solution by distillation, by pouring the remainder into water and then carrying out extraction using an organic solvent that is immiscible in water, and removing the solvent from the extract by distillation. Furthermore, the product can, if desired, be purified further by various techniques, such as recrystallisation, reprecipitation or the various chromatographic techniques, especially column chromatography or preparative thin-layer chromatography.

It will be appreciated that the compounds used according to the present invention can contain asymmetric centres. Such asymmetric centres can have the R or S configuration, independently. It will be apparent to the person skilled in the art that some compounds used according to the invention can also have geometrical isomerism. It must be understood that the present invention includes individual geometrical isomers and stereoisomers, and mixtures thereof, including racemic mixtures, of compounds of formula (I) above. Such isomers can be separated from their mixtures by application or adaptation of known processes, for example chromatographic techniques or recrystallisation techniques, or they are prepared separately starting from the appropriate isomers of their intermediates.

For the purposes of this text, it will be understood that the tautomeric forms are included in the mention of a given group, for example thio/mercapto or oxo/hydroxy.

The compounds used according to the present invention can readily be prepared, or formed during the method of the invention, in the form of solvates (for example hydrates). The hydrates of the compounds used according to the present invention can readily be prepared by recrystallisation from an aqueous/organic solvent mixture, using organic solvents such as dioxane, tetrahydrofuran or methanol.

The base products or the intermediates can be prepared by application or adaptation of known processes, for example processes as described in the Reference Examples or their obvious chemical equivalents.

The inventors have found that the dendritic polymers according to the invention have particularly advantageous properties permitting the treatment of surfaces, especially of metal surfaces or surfaces based on silicon or on oxides, such as titanium oxide, zirconium oxide, etc. They can be used especially as an additive in any composition that is to be in contact with or to treat said surfaces. They can be used especially as an anti-corrosive agent, a lubricating agent, a scale preventer or as a flame retardant, especially for plastics polymers.

EXAMPLES

General

The reactions were carried out under a dry argon atmosphere (argon U, Liquid Air). The following solvents were dried and distilled under argon immediately prior to use, according to techniques described in the literature[1]: tetrahydrofuran, dichloromethane, acetonitrile, pentane, toluene, diethyl ether, chloroform, triethylamine, pyridine.

D. D. Perrin; W. L. F. Armarego *Purification of Laboratory Chemicals, Third Edition*; Press P., Ed.: Oxford, 1988.

Thin-layer chromatographies were carried out on silica-coated aluminium plates of type Merck Kieselgel 60F$_{254}$.

NMR spectra were recorded on Brüker devices (AC200, AM250, DPX 300). Chemical shifts are expressed in parts per million (ppm) relative to 85% phosphoric acid in water for $^{31}$P NMR and relative to tetramethylsilane for $^1$H and $^{13}$C NMR. The following abbreviations have been used to express the multiplicity of the signals: s (singlet), d (doublet), dl (broad doublet), dd (double doublet), syst.AB (AB system), t (triplet), td (double triplet), q (quadruplet), hept (heptuplet), m (unresolved multiplet).

Infra-red vibrational spectroscopy was carried out on a Perkin Elmer FT 1725x spectrometer. UV-visible spectroscopy was carried out on a HP 4852A device. Thermogravimetric measurements were carried out on a Netzch DSC 204 or Setaram TGA 92-16.18 device.

Numbering Used for NMR Allocation:
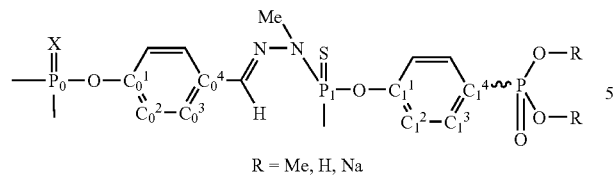
R = Me, H, Na
Example of Numbering for a First Generation Dendritic Polymer
Structures of the Various Dendritic Polymers Used as Starting Material
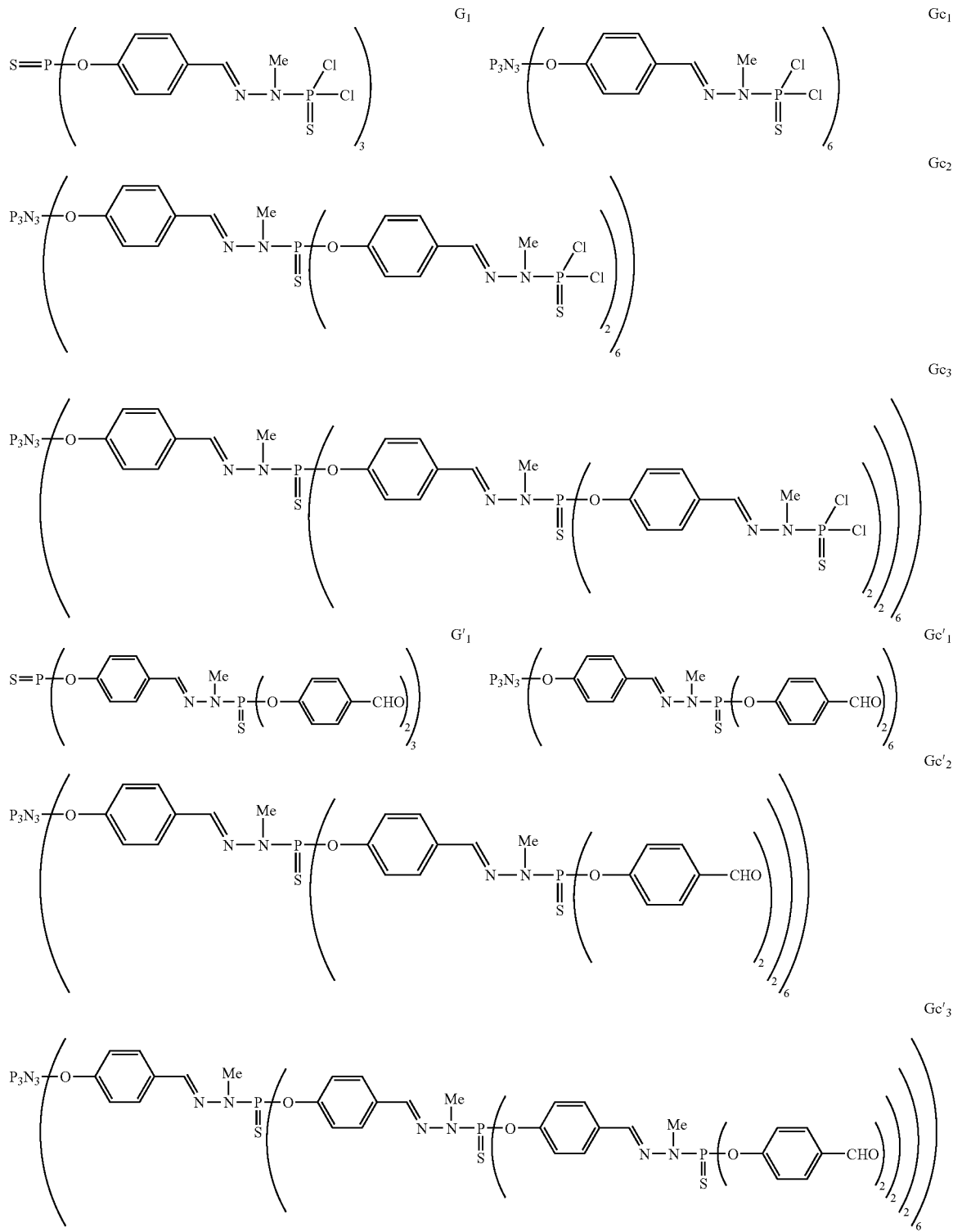

Example 1

Synthesis of the First Generation Dendritic Polymer having a Tetraisopropyl Gem-diphosphonate Surface

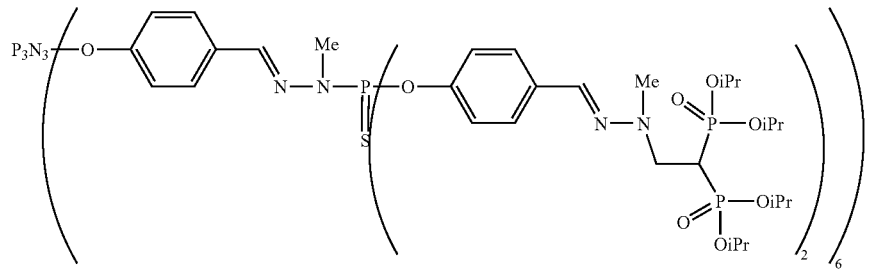

The dendritic polymer Gc'$_1$ (7.0.10$^{-2}$ mmol, 200 mg) is dissolved in CH$_2$Cl$_2$ (10 ml), and then monomethylhydrazine is added at 0° C. (1.3 mmol, 66 µl) as well as tetraisopropyl-vinyl gem-diphosphonate (0.7 g in the knowledge that it is pure only at 65%); the addition must be simultaneous and slow in order to avoid the formation of an isoluble aggregate. When the addition is complete, the mixture is stirred at ambient temperature for 24 hours. Evaporation of the solvent under reduced pressure, followed by washing 3 times with 50 ml of pure pentane, permit elimination of all the by-products of the reaction as well as the impurities contained in the starting tetraisopropyl-vinyl gem-diphosphonate. The final product is isolated in a final yield of 70%.

$^{31}$P—{$^1$H} NMR (CDCl$_3$): δ=66.5 (s, P$_1$); 23.5 (s, P(O)(OiPr)$_2$); 11.9 (s, P$_0$) ppm.

$^1$H NMR (CDCl$_3$): δ=1.29 (d, $^3J_{HH}$=6.1 Hz, 288H, —O—CH—(CH$_3$)$_2$); 2.91 (s, 36H, N—N(CH$_3$)—CH$_2$—); 3.00 (tt, $^2J_{HP}$=23.6 Hz, $^3J_{HH}$=6.0 Hz, 12H, —CH—(P(O)(OiPr)$_2$)$_2$); 3.23 (d, $^3J_{HP}$=8.8 Hz, 18H, CH$_3$—N—P$_1$); 3.78 (td, $^3J_{HP}$=14.7 Hz, $^3J_{HH}$=6.2 Hz, 24H, —CH$_2$— CH—(P(O)(OiPr)$_2$)$_2$); 4.74 (hept, $^3J_{HH}$=6.1 Hz, 48H, —O—CH—(CH$_3$)$_2$); 6.8-7.8 (m, 90H, CH$_{arom}$ and CH—N) ppm.

$^{13}$C—{$^1$H} NMR (CDCl$_3$): δ=23.7 (d, $^3J_{CP}$=3.1 Hz, —O—CH—(CH$_3$)$_2$); 23.8 (d, $^3J_{CP}$=2.5 Hz, —O—CH—(CH$_3$)$_2$); 24.0 (d, $^3J_{CP}$=3.0 Hz, —O—CH—(CH$_3$)$_2$); 24.2 (d, $^3J_{CP}$=2.9 Hz, —O—CH—(CH$_3$)$_2$); 32.9 (d, $^2J_{CP}$=11.7 Hz, CH$_3$—N-P$_1$), 37.7 (t, $^1J_{CP}$=132.2 Hz, —CH—(P(O)(OiPr)$_2$)$_2$); 38.8 (s, N—N(CH$_3$)—CH$_2$—); 55.1 (s, —CH$_2$—CH—(P(O)(OiPr)$_2$)$_2$); 70.9 (d, $^2J_{CP}$=6.6 Hz, —O—CH—(CH$_3$)$_2$); 71.3 (d, $^2J_{CP}$=6.8 Hz, —O—CH—(CH$_3$)$_2$); 121.2 (s broad, C$_0^2$, C$_1^2$); 126.3 (s, C$_1^3$); 128.2 (s, C$_0^3$); 129.4 (s, CH=N—N(Me)-CH$_2$); 132.1 (s, C$_0^4$), 134.5 (s, C$_1^4$); 138.8 (s broad, CH=N—N(Me)-P$_1$), 149.4 (d, $^2J_{CP}$=7.5 Hz, C$_1^1$), 151.1 (s, C$_0^1$) ppm.

Example 2

Synthesis of the Second Generation Dendritic Polymer having a Tetraisopropyl Gem-diphosphonate Surface

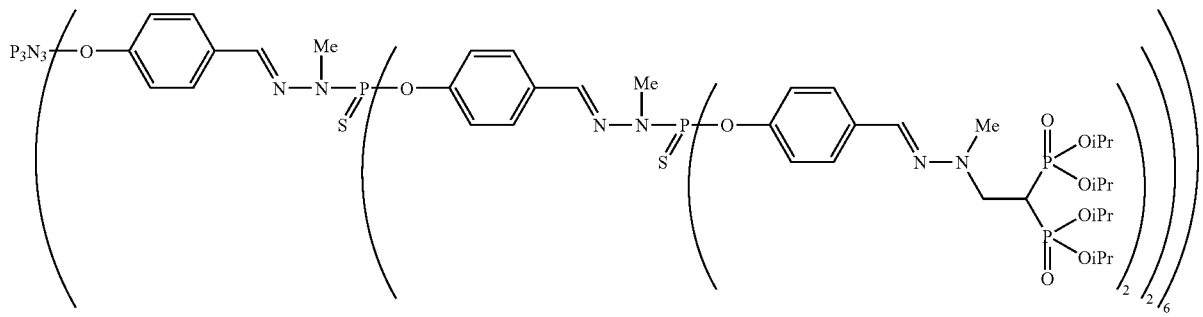

The dendritic polymer Gc'$_2$ (2.9.10$^{-2}$ mmol, 200 mg) is dissolved in CH$_2$Cl$_2$ (10 ml), and then monomethylhydrazine is added at 0° C. (1.05 mmol, 56 µl) as well as tetraisoprophyl-vinyl gem-diphosphonate (0.575 g in the knowledge that it is pure only at 65%); the addition must be simultaneous and slow in order to avoid the formation of an insoluble aggregate. When the addition is complete, the mixture is stirred at ambient temperature for 24 hours. Evaporation of the solvent under reduced pressure, followed by washing 3 times with 100 ml of pentane/ether 1/1, permit elimination of all the by-products of the reaction as well as the impurities contained in the starting tetraisopropyl-vinyl gem-diphosphonate. The final product is isolated in a final yield of 79%.

$^{31}$P–{$^1$H} NMR (CDCl$_3$): δ=66.4 (s, P$_2$); 66.1 (s, P$_1$); 23.5 (s, P(O)(OiPr)$_2$); 11.8 (s, P$_0$) ppm.

$^1$H NMR (CDCl$_3$): δ=1.25 (d, $^3J_{HH}$=6.0 Hz, 576H, —O—CH—(CH$_3$)$_2$); 2.87 (s, 72H, N—N(CH$_3$)—CH$_2$—); 2.97 (tt, $^2J_{HP}$=23.6 Hz, $^3J_{HH}$=6.6 Hz, 24H, —CH—(P(O)(Oipr)$_2$)$_2$); 3.24 (d broad, $^3J_{HP}$=9.5 Hz, 54H, CH$_3$—N-P$_{1,2}$); 3.74 (td, $^3J_{HP}$=13.9 Hz, $^3J_{HH}$=6.2 Hz, 48H, —CH$_2$—CH—(P(O)(OiPr)$_2$)$_2$); 4.71 (hept, $^3J_{HH}$=5.9 Hz, 96H, —O—CH—(CH$_3$)$_2$); 6.8-7.8 (m, 210H, CH$_{arom}$ and CH=N) ppm.

$^{13}$C–{$^1$H} NMR (CDCl$_3$): δ=23.8 (d, $^3J_{CP}$=3.1 Hz, —O—CH—(CH$_3$)$_2$); 24.2 (d, $^3J_{CP}$=3.0 Hz, —O—CH—(CH$_3$)$_2$); 32.9 (d, $^2J_{CP}$=11.8 Hz, CH$_3$—N—P$_{1,2}$), 38.3 (t, $^1J_{CP}$=132.1 Hz, —CH—(P(O)(OiPr)$_2$)$_2$); 38.8 (s, N—N(CH$_3$)—CH$_2$—); 55.2 (s, —CH$_2$—CH—(P(O)(OiPr)$_2$)$_2$); 70.9.(d, $^2J_{CP}$=6.8 Hz, —O—CH—(CH$_3$)$_2$); 71.3 (d, $^2J_{CP}$=6.8 Hz, —O—CH—(CH$_3$)$_2$); 121.4 (s broad, C$_0^2$, C$_1^2$, C$_2^2$); 126.4 (s, C$_2^3$); 128.3 (s broad, C$_0^3$, C$_1^3$); 129.5 (s, CH=N—N(Me)-CH$_2$); 132.1 (s, C$_0^4$), 132.4 (s, C$_1^4$), 134.5 (s, C$_2^4$), 138.7 (s broad, CH=N—N(Me)-P$_{1,2}$), 149.5 (d, $^2J_{CP}$=7.4 Hz, C$_2^1$), 151.2 (s, C$_0^1$, C$_1^1$) ppm.

Example 3

Synthesis of the Third Generation Dendritic Polymer having a Tetra Isopropyl Gem-diphosphonate Surface The dendritic polymer Gc'$_3$ (1.35.10$^{-2}$ mmol, 200 mg) is dissolved in CH$_2$Cl$_2$ (10 ml), and then monomethylhydrazine is added at 0° C. (0.97 mmol, 52 µl) as well as tetraisopropyl-vinyl gem-diphosphonate (0.532 g in the knowledge that it is pure only at 65%); the addition must be simultaneous and slow in order to avoid the formation of an insoluble aggregate. When the addition is complete, the mixture is stirred at ambient temperature for 24 hours. Evaporation of the solvent under reduced pressure, followed by washing 3 times with 100 ml of pentane/ether 1/1, permit elimination of all the by-products of the reaction as well as the impurities contained in the starting tetraisopropyl-vinyi gem-diphosphonate. The final product is isolated in a final yield of 80%.

$^{31}$P–{$^1$H} NMR (CDCl$_3$): δ=66.3 (s, P$_3$); 66.0 (s, P$_{1,2}$); 23.5 (s, P(O)(OiPr)$_2$); 11.4 (s, P$_0$) ppm.

$^1$H NMR (CDCl$_3$): δ=1.26 (d, $^3J_{HH}$=6.0 Hz, 1152H, —O—CH—(CH$_3$)$_2$); 2.88 (s, 144H, N—N(CH$_3$)—CH$_2$—); 2.98 (tt, $^2J_{HP}$=23.9 Hz, $^3J_{HH}$=6.6 Hz, 48H, —CH—(P(O)(OiPr)$_2$)$_2$); 3.26 (d broad, $^3J_{HP}$=9.5 Hz, 126H, CH$_3$—N—P$_{1,2,3}$); 3.74 (m, 96H, —CH$_2$—CH—(P(O)(OiPr)$_2$)$_2$); 4.70 (hept, $^3J_{HH}$=5.9 Hz, 192H, —O—CH—(CH$_3$)$_2$); 6.8-7.8 (m, 450 H, CH$_{arom}$ and CH=N) ppm.

$^{13}$C–{$^1$H} NMR (CDCl$_3$): δ=23.9 (d, $^3J_{CP}$=2.9 Hz, —O—CH—(CH$_3$)$_2$); 24.2 (d, $^3J_{CP}$=2.5 Hz, —O—CH—(CH$_3$)$_2$); 32.9 (d, $^2J_{CP}$=12.3 Hz, CH$_3$—N—P$_{1,2,3}$), 38.4 (t, $^1J_{CP}$=132.3 Hz, —CH—(P(O)(OiPr)$_2$)$_2$); 38.9 (s, N—N(CH$_3$)—CH$_2$—); 55.2 (s, —CH$_2$—CH—(P(O)(OiPr)$_2$)$_2$); 70.9 (d, $^2J_{CP}$=6.9 Hz, —O—CH—(CH$_3$)$_2$); 71.3 (d, $^2J_{CP}$=6.9 Hz, —O—CH—(CH$_3$)$_2$); 121.4 (s, C$_3^2$); 121.8 (s broad, C$_0^2$, C$_1^2$, C$_2^2$); 126.4 (s, C$_3^3$); 128.3 (s broad, C$_0^3$, C$_1^3$, C$_2^3$); 129.6 (s, CH=N—N(Me)-CH$_2$); 131.3 (s, C$_0^4$); 132.4 (s broad, C$_1^4$, C$_2^4$); 134.5 (s, C$_3^4$); 138.7 (s broad, CH=N—N(Me)-P$_{1,2,3}$); 149.5 (d, $^2J_{CP}$=8.1 Hz, C$_3^1$); 151.2 (s broad, C$_0^1$, C$_1^1$, C$_2^1$) ppm.

Example 4

Synthesis of Phenol Aza-bis-dimethyl-phosphonate

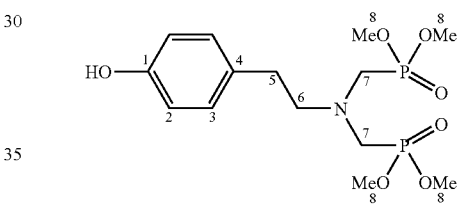

Tyramine (6 g, 43.7 mmol) and dimethyl phosphite (10.32 ml, 112.5 mmol) are mixed at 0° C., and then a 37% formaldehyde solution in water (12.6 ml) is added slowly, still at 0° C. The whole is brought to ambient temperature, over a period of 30 minutes and is heated under reflux for one hour, with magnetic stirring. Finally, the crude reaction fixture is placed under reduced pressure in order to evaporate off the excess formaldehyde. The product is extracted using a chloroform/water mixture (3×100 ml of chloroform) and is then chromatographed on silica using acetone as eluant. The final product is isolated in a yield of 65%.

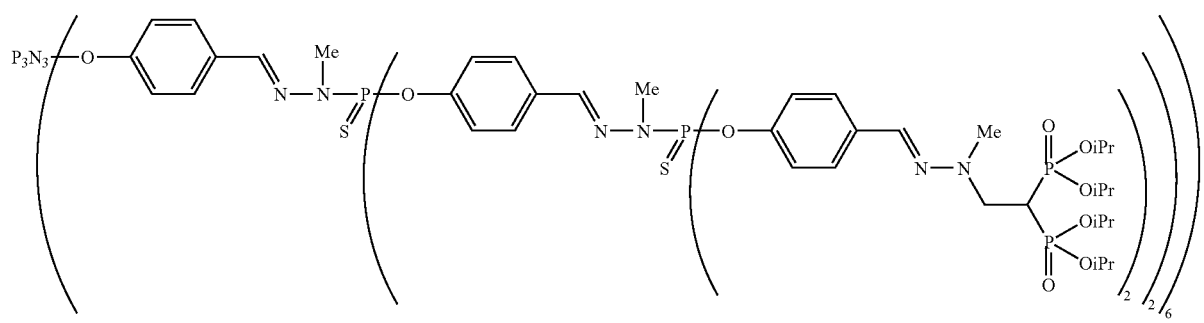

$^{31}$P—{$^1$H} NMR (CDCl$_3$): δ=30.2 (s, P(O)(OMe)$_2$) ppm.

$^1$H NMR (CDCl$_3$): δ=2.68 (t distorted, $^3J_{HH}$=7.2 Hz, 2 H, —CH$_2$—CH$_2$—N); 3.05 (t distorted, $^3J_{HH}$=7.2 Hz, 2H, —CH$_2$—CH$_2$—N—); 3.20 (d, $^2J_{HP}$=8.9 Hz, 4H, N—CH$_2$—P); 3.75 (d, $^3J_{HP}$=10.7 Hz, 12H, —OMe), 6.6-7.1 (m, 4H, CH$_{arom}$); 8.16 (s broad, 1H —OH) ppm.

$^{13}$C—{$^1$H} NMR (CDCl$_3$): δ=32.7 (s, C$_5$); 49.4 (dd, $^3J_{CP}$=6.8 Hz, $^1J_{CP}$=158.5 Hz, C$_7$); 52.8 (d, $^2J_{CP}$=3 Hz, C$_8$); 58.8 (t, $^3J_{CP}$=7.5 Hz, C$_6$); 115.4 (s, C$_3$); 129.8 (s, C$_2$); 129.8 (s, C$_4$); 155.9 (s, C$_1$) ppm.

Example 5

Synthesis of Phenol aza-bis-dimethyl-phosphonate

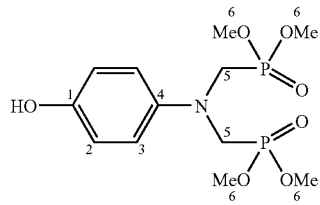

Phenolamine (5 g, 46 mmol) and dimethyl phosphite (10.5 ml, 115 mmol) are mixed at 0° C., and then a 37% formaldehyde solution in water (10.6 ml) is added slowly, still at 0° C. The whole is brought to ambient temperature over a period of 30 minutes and is heated under reflux for one hour, with magnetic stirring. Finally, the crude reaction mixture is placed under reduced pressure in order to evaporate off the excess formaldehyde. The product is extracted using a chloroform/water mixture (3×100 ml of chloroform) and is then chromatographed on silica using acetone as eluant. The final product is isolated in a yield of 30%.

$^{31}$P—{$^1$H} NMR (CDCl$_3$): δ=29.8 (s, P(O)(OMe)$_2$) ppm.

$^1$H NMR (CDCl$_3$): δ=3.67 (d, $^3J_{HP}$=10.6 Hz, 12H, —OMe); 3.84 (d, $^2J_{HP}$=5.7 Hz, 4H, N—CH$_2$—P); 6.6-6.9 (m, CH$_{arom}$, 4H); 8.05 (s broad, 1H, —OH) ppm.

$^{13}$C—{$^1$H} NMR (CDCl$_3$): δ=47.6 (d, J$_{CP}$=157.1 Hz, C$_5$); 52.6 (d, $^2J_{CP}$=3.8 Hz, C$_6$); 52.7 (d, $^2J_{CP}$=3.3 Hz, C$_6$); 115.8 (s, C$_3$); 117.3 (s, C$_2$); 141.0 (s, C$_4$); 150.9 (s, C$_1$) ppm.

Example 6

Synthesis of the First Generation Dendritic Polymer having an Aza-bis-dimethyl-phosphonate surface Cesium carbonate (6.898 mmol, 2.25 g) is added to a solution of the dendritic polymer Gc$_1$ (0.273 mmol, 500 mg) in solution in anhydrous THF (10 ml), and then phenol aza-bis-dimethyl-phosphonate is added (3.449 mmol, 1.31 g). The mixture is stirred for 24 hours at ambient temperature and then the final mixture is filtered with THF in order to separate off the salts. Finally, the final product is purified by precipitation from pentane.

$^{31}$P—{$^1$H} NMR (CDCl$_3$): δ=68.7 (s, P$_1$); 31.9 (s, P(O)(OMe)$_2$); 13.7 (s, P$_0$) ppm.

$^1$H NMR (CDCl$_3$): δ=2.69 (t, $^3J_{HH}$=6.8 Hz, 24H, CH$_2$—N); 2.99 (t, $^3J_{HH}$=6.8 Hz, 24H, CH$_2$—CH$_2$—N); 3.13 (d, $^2J_{HP}$=9.17 Hz, 48H, —CH$_2$—P(O)(OCH$_3$)$_2$); 3.2 (d, $^3J_{HP}$=11.8 Hz, 18H, CH$_3$—N-P$_1$); 3.67 (d, $^3J_{HP}$=10.2 Hz, 144H, —P(O)(O—CH$_3$)$_2$); 6.8-7.8 (m, 78H, CH$_{arom}$, CH=N) ppm.

$^{13}$C—{$^1$H} NMR (CDCl$_3$): δ=32.9 (d, $^2J_{CP}$=11 Hz, CH$_3$—N—P$_1$); 32.95 (s, CH$_2$—CH$_2$—N) 49.5 (dd, $^1J_{CP}$=157.5 Hz, $^3J_{CP}$=6.8 Hz —CH$_2$—P(O)(OCH$_3$)$_2$); 52.6 (d, $^2J_{CP}$=4.0 Hz, —P(O)(O—CH$_3$)$_2$); 57.8 (t, $^3J_{CP}$=7.2 Hz, CH$_2$—CH$_2$—N); 120.8 (s, C$_1^2$); 120.8 (d, $^3J_{CP}$=4.1 Hz, C$_1^2$); 128.3 (s, C$_0^3$); 129.6 (s, C$_1^3$); 131.9 (s, C$_0^4$); 136.3 (s, C$_1^4$); 138.4 (d, $^3J_{CP}$=14.1 Hz, CH=N); 148.5 (d, $^2J_{CP}$=7.0 Hz, C$_1^1$); 150.8 (d, $^2J_{CP}$=3.0 Hz, C$_0^1$) ppm.

Yield: [70%].

Example 7

Synthesis of the Second Generation Dendritic Polymer having an Aza-bis-dimethyl-phosphonate Surface Cesium carbonate (5.28 mmol, 1.72 g) is added to a solution of the dendritic polymer Gc$_2$ (0.104 mmol, 500 mg) in solution in anhydrous THF (10 ml), and then phenol aza-bis-dimethyl-phosphonate is added (2.6 mmol, 1.00 g). The mixture is stirred for 24 hours at ambient temperature and then the final mixture is filtered with THF in order to separate off the salts. Finally, the final product is purified by precipitation from pentane.

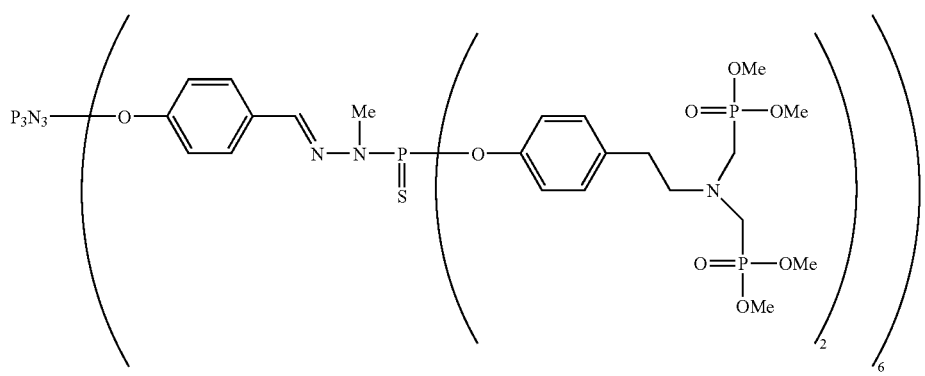

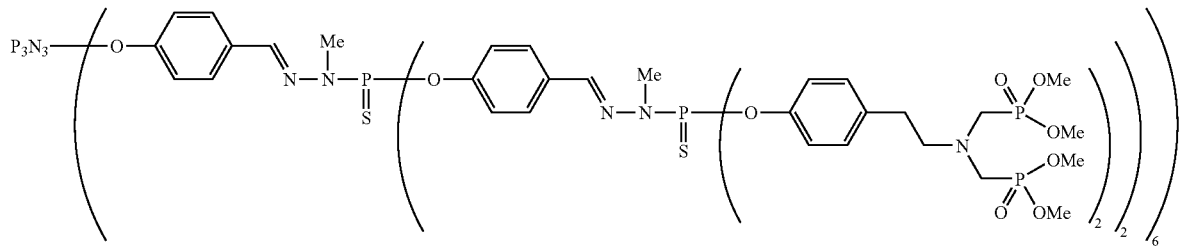

Final yield: 78%.

$^{31}$P—{$^1$H} NMR (CDCl$_3$): δ=66.5 (s, P$_2$); 66.2 (s, P$_1$); 30.1 (s, P(O)(OMe)$_2$); 12.1 (s, P$_0$) ppm.

$^1$H NMR (CDCl$_3$): δ=2.69 (s broad, 48H, C$\underline{H_2}$—CH$_2$—N); 2.99 (s broad, 48H, CH$_2$—C$\underline{H_2}$—N); 3.12 (d, $^2$J$_{HP}$=9.51 Hz, 96H, —C$\underline{H_2}$—P(O)(OC$\overline{H_3}$)$_2$); 3.24 (d, $^3$J$_{HP}$=8.5 Hz, 54H, C$\underline{H_3}$—$\overline{N}$—P); 3.66 (d,$^3$J$_{HP}$=10.4 Hz, 288H, —P(O)(O—C$\underline{H_3}$)$_2$); 6.6-7.7 (m,186H, CH$_{arom}$, CH=N) ppm.

$^{13}$C—{$^1$H} NMR (CDCl$_3$): δ=32.95 (s, $\underline{CH_2}$—CH$_2$—N); 33.0 (d, $^2$J$_{CP}$=11.2 Hz, $\underline{CH_3}$—N—P); 49.4 (dd, $^1$J$_{CP}$=157.5 Hz, $^3$J$_{CP}$=6.6 Hz —$\underline{CH_2}$—P(O)(OCH$_3$)$_2$); 52.7 (d, $^2$J$_{CP}$=4.2 Hz, —P(O)(O—C$\overline{H_3}$)$_2$); 58.0 (t, $^3$J$_{CP}$=7.1 Hz, $\underline{CH_2}$—CH$_2$—N); 121.2 (s, $\overline{C_0}^2$); 121.7 (s, C$_1^2$); 121.2 (d,$^3$J$_{CP}$=3.9 Hz, C$_2^2$) 128.3 (s, C$_1^3$); 129.65 (s, C$_0^3$); 129.9 (s, C$_2^3$); 132.1 (s, C$_0^4$); 132.4 (s$_1$, C$_1^4$); 136.5 (s, C$_2^4$) 138.6 (d,$^3$J$_{CP}$=13.3 Hz, CH=N); 148.8 (s, C$_0^1$); 148.9 (d,$^2$J$_{CP}$=7.5 Hz, C$_2^1$); 151.2 (d,$^2$J$_{CP}$=7.4 Hz, C$_1^1$) ppm.

Example 8

Synthesis of the Third Generation Dendritic Polymer having an Aza-bis-dimethyl-phosphonate Surface Cesium carbonate (0.941 mmol, 0.306 g) is added to a solution of the dendritic polymer Gc$_3$ (9.3.10$^{-3}$ mmol, 100 mg) in solution in anhydrous THF (2 ml), and then phenol aza-bis-dimethyl-phosphonate is added (0.471 mmol, 180 mg). The mixture is stirred for 24 hours at ambient temperature and then the final mixture is filtered with THF in order to separate off the salts. Finally, the final product is purified by precipitation from pentane.

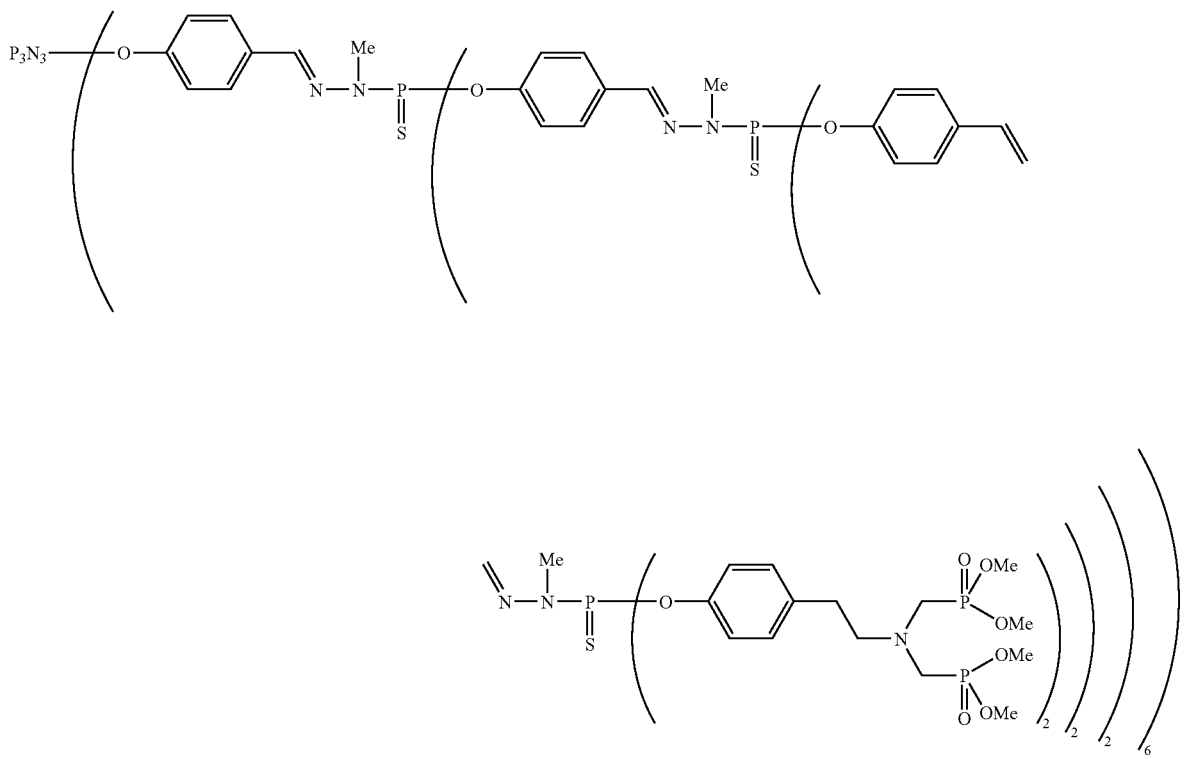

Final yield: 80%.

$^{31}$P—{$^{1}$H} NMR (CDCl$_3$): δ=66.6 (s, P$_3$); 66.3 (s, P$_2$); 65.8 (s, P$_1$); 30.2 (s, P(O)(OMe)$_2$); 12.0 (s, P$_0$) ppm.

$^{1}$H NMR (CDCl$_3$): δ=2.67 (s broad, 96H, CH$_2$—CH$_2$—N); 2.97 (s broad, 96H, CH$_2$—CH$_2$—N); 3.10 (d, $^{2}$J$_{HP}$=9.60 Hz, 192H, —CH$_2$—P(O)(OCH$_3$)$_2$); 3.25 (s broad, 126H, CH$_3$—N—P); 3.63 (d, $^{3}$J$_{HP}$=10.25 Hz, 576H, —P(O)(O—CH$_3$)$_2$); 6.5-7.7 (m, 402H, CH$_{arom}$, CH=N) ppm.

$^{13}$C—{$^{1}$H} NMR (CDCl$_3$): δ=32.9 (s, CH$_2$—CH$_2$—N); 32.9 (s, CH$_3$—N—P); 49.3 (dd, $^{1}$J$_{CP}$=157.5 Hz, $^{3}$J$_{CP}$=6.5 Hz —CH$_2$—P(O)(OCH$_3$)$_2$); 52.6 (d, $^{2}$J$_{CP}$=3.6 Hz, —P(O)(O—CH$_3$)$_2$); 58.0 (t, $^{3}$J$_{CP}$=6.9 Hz, CH$_2$—CH$_2$—N); 120.5 (s, C$_0^2$) 121.2 (d, $^{3}$J$_{CP}$=3.1 Hz, C$_3^2$); 121.5 (s, C$_1^2$); 121.8 (s, C$_2^2$); 128.2 (s, C$_0^3$) 128.2 (s, C$_1^3$); 129.6 (s, C$_2^3$); 129.9 (s, C$_3^3$); 132.3 (s, C$_0^4$); 132.3,(s, C$_1^4$); 132.3 (s C$_2^4$); 136.5 (s, C$_3^4$); 138.6 (d, $^{3}$J$_{CP}$=13.0 Hz, CH=N); 148.9 (d broad, $^{2}$J$_{CP}$=6.3 Hz, C$_0^1$, C$_1^1$, C$_3^1$); 151.2 (d, $^{2}$J$_{CP}$=6.1 Hz, C$_2^1$) ppm.

Example 9

Synthesis of the First Generation Dendritic Polymer having an Aza-bis-phosphonic Surface

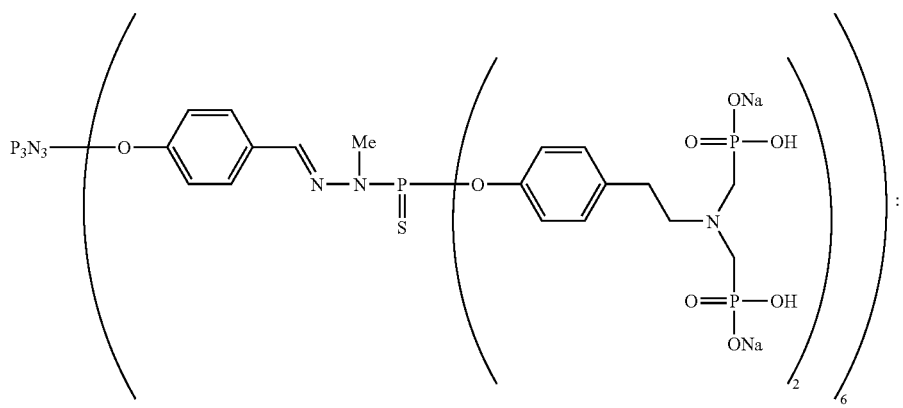

Bromotrimethylsilane (1.04 mmol, 138 μl) is added slowly to a solution of first generation dendritic polymer having aza-bis-dimethyl-phosphonate ends (1.68.10$^{-2}$ mmol, 100 mg) at 0° C. in acetonitrile (5 ml). When the addition is complete, the mixture is allowed to return to ambient temperature over a period of 12 hours. The mixture is then evaporated to dryness, and then 1 ml of anhydrous methanol is added at ambient temperature and the mixture is stirred for one hour. After evaporation to dryness, the residue is washed several times with pure ether. Because the product is totally insoluble in organic solvents, it is converted into its monosodium salt in the presence of sodium hydroxide (36.3 mg of sodium hydroxide for 100 mg of dendritic polymer). The resulting solution is lyophilised to give the dendritic polymer in the form of a white powder. The final product is isolated in a final yield of 58%.

Final yield: 50%.

$^{31}$P—{$^{1}$H} NMR (CD$_3$CN/D$_2$O): δ=67.9 (s, P$_1$); 14.4 (s, P(O)(ONa)$_2$); 12.9 (S, P$_0$) ppm.

$^{13}$C—{$^{1}$H} NMR (CD$_3$CN/D$_2$O): δ=31.95 (s, CH$_2$—CH$_2$—N); 35.5 (d, $^{2}$J$_{CP}$=10.9 Hz, CH$_3$—N—P$_1$); 57.0 (d, $^{1}$J$_{CP}$=136.8 Hz, —CH$_2$—P(O)(OH)$_2$); 60.7 (s, CH$_2$—CH$_2$—N); 124.1 (s, C$_0^2$); 124.1 (s, C$_1^2$); 131.3 (s, C$_0^3$); 133.5 (s, C$_1^3$); 135.3 (s, C$_0^4$); 139.0 (s, C$_1^4$); 143.2 (s broad, CH=N); 151.7 (d, $^{2}$J$_{CP}$=7.0 Hz, C$_1^1$); 153.3 (s, C$_0^1$) ppm.

Example 10

Synthesis of the Second Generation Dendritic Polymer having an Aza-bis-phosphonic Surface Bromotrimethylsilane (10 mmol, 1.34 ml) is added slowly to a solution of second generation dendritic polymer having aza-bis-dimethyl-phosphonate ends ($8.27.10^{-2}$ mmol, 1.08 g) at 0° C. in acetonitrile (10 ml). When the addition is complete, the mixture is allowed to return to ambient temperature over a period of 12 hours. The mixture is then evaporated to dryness, and then 3 ml of anhydrous methanol are added at ambient temperature and the mixture is stirred for one hour. After evaporation to dryness, the residue is washed several times with pure ether. Because the product is totally insoluble in organic solvents, it is converted into its monosodium salt in the presence of sodium hydroxide (8.2 mg of sodium hydroxide for 50 mg of dendritic polymer). The resulting solution is lyophilised to give the dendritic polymer in the form of a white powder. The final product is isolated in a final yield of 62%.

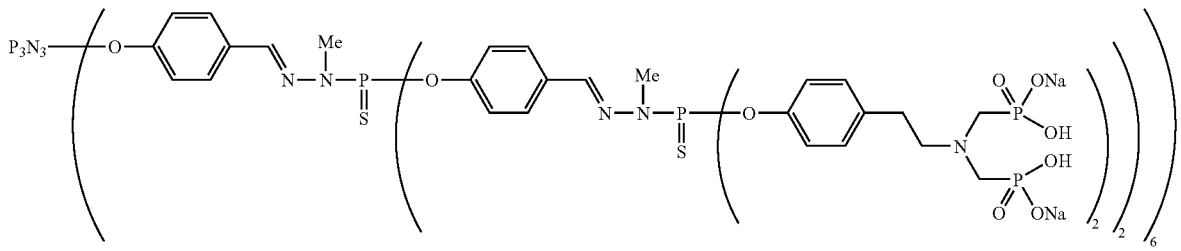

$^{31}P—\{^{1}H\}$ NMR (CD$_3$CN/D$_2$O): $\delta$=67.8 (s, P$_2$); 67.6 (s, P$_1$); 10.5 (s, P(O)(ONa)(OH)); 10.0 (s, P$_0$) ppm.

$^{13}C—\{^{1}H\}$ NMR (CD$_3$CN/D$_2$O): $\delta$=31.6 (s, CH$_3$—N—P$_1$); 35.3 (s, $\underline{CH_2}$—CH$_2$—N); 55.2 (d, $^{1}J_{CP}$=128.2 Hz, —CH$_2$—P(O)($\overline{OH}$)$_2$); 60.4 (s, CH$_2$—$\underline{CH_2}$—N); 124.3 (s, C$_0^2$); 412.3 (s, C$_1^2$); 124.3 (s, C$_2^2$); 131.3 (s, C$_0^3$); 131.3 (s, C$_1^3$); 133.3 (s, C$_2^3$); 135.0 (s, C$_0^4$); 135.0 (s, C$_1^4$); 136.0 (s, C$_2^4$); 142.5 (s broad, CH=N); 151.8 (s broad, C$_2^1$); 153.3 (s broad, C$_1^1$); 153.3 (s, C$_0^1$) ppm.

Dendritic polymers having an aza-bis-phosphonic surface cannot be prepared by application or adaptation of the above method starting from the dendritic polymers having a tetraisopropyl gem-diphosphonate surface of Examples 1 to 3.

Dendritic polymers having an aza-bis-phosphonic surface can be prepared by application or adaptation of the above method starting from the dendritic polymers having an aza-bis-dimethyl-phosphonate surface of Examples 11 and 12 below:

Example 11

Synthesis of the First Generation Dendritic Polymer having an Aza-bis-dimethyl-phosphonate Surface Cesium carbonate (2.94 mmol, 955 mg) is added to a solution of the dendritic polymer Gc$_1$ (0.116 mmol, 214 mg) in solution in anhydrous THF (10 ml), and then phenol is added (1.47 mmol, 520 mg). The mixture is stirred for 24 hours at ambient temperature and then the final mixture is filtered with THF in order to separate off the salts. Finally, the final product is washed with ether and then purified by precipitation from pentane. The final product is isolated in a final yield of 76%.

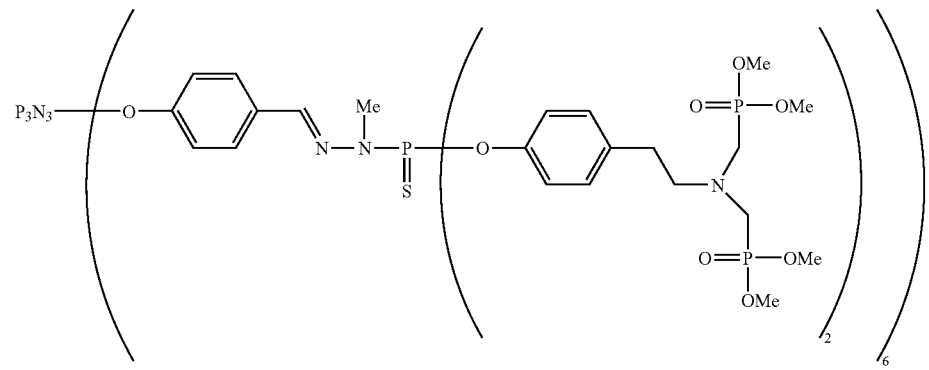

$^{31}$P—{$^1$H} NMR (C$_6$D$_6$/THF): δ=67.9 (s, P$_1$); 29.3 (s, P(O)(OMe)$_2$); 12.3 (s, Po) ppm.

$^1$H NMR (CDCl$_3$): δ=ppm.

$^{13}$C—{$^1$H} NMR (CDCl$_3$): δ=33.0 (d, $^2J_{CP}$=11.8 Hz, CH$_3$—N—P$_1$); 46.4 (d, $^1J_{CP}$=158.3 Hz, —CH$_2$—P(O)(OCH$_3$)$_2$); 52.6 (d, $^2J_{CP}$=3.7 Hz, —P(O)(O—$\overline{CH_3}$)$_2$); 52.7 (d, $^2J_{CP}$=3.9 Hz, —P(O)(O—CH$_3$)$_2$); 114.4 (s, $\overline{C_1^2}$); 121.2 (s, $C_0^2$); 122.0 (s, $C_1^3$); 128.3 $\overline{(s, C_0^3)}$; 132.2 (s, $C_0^4$); 138.5 (d, $^3J_{CP}$=14.1 Hz, CH=N); 142.9 (d, $^3J_{CP}$=6.5 Hz, $C_1^4$); 145.1 (s, $C_1^1$); 151.1 (s broad, $C_0^1$) ppm.

Example 12

Synthesis of the Second Generation Dendritic Polymer having an Aza-bis-dimethyl-phosphonate Surface Cesium carbonate (2.00 mmol, 652 mg) is added to a solution of the dendritic polymer Gc$_2$ (4.2.10$^{-2}$ mmol, 200 mg) in solution in anhydrous THF (5 ml), and then phenol is added (1.05 mmol, 372 mg). The mixture is stirred for 24 hours at ambient temperature and then the final mixture is filtered with THF in order to separate off the salts. Finally, the final product is washed with ether and then purified by precipitation from pentane. The final product is isolated in a final yield of 81%.

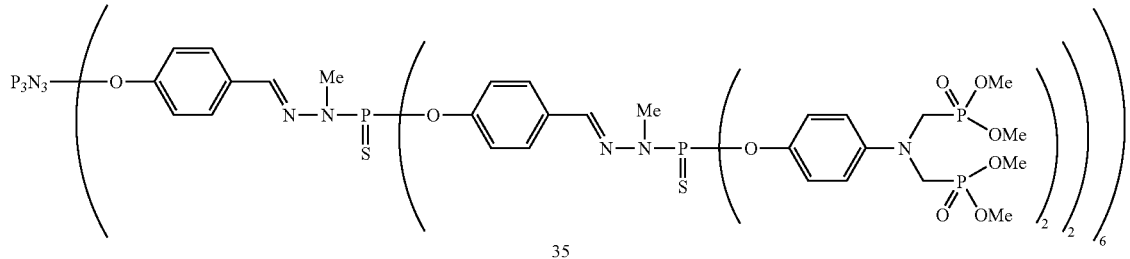

$^{31}$P—{$^1$H} NMR (CDCl$_3$): δ=68.1 (s, P$_1$); 66.2 (s, P$_1$); 29.2 (s, P(O)(OMe)$_2$); 11.7 (s, P$_0$) ppm.

$^1$H NMR (CDCl$_3$): δ=3.25 (d, $^3J_{HP}$=10.2 Hz, 54H, CH$_3$—N—P$_1$, CH$_3$—N—P$_2$); 3.65 (d, $^3J_{HP}$=10.3 Hz, 288H, —P(O)(O—$\overline{CH_3}$)$_2$); 3.88 (d, $^2J_{HP}$=4.7 Hz, 96H, —CH$_2$—P(O)($\overline{OCH_3}$)$_2$); 6.7-7.8 (m, 186H, CH$_{arom}$, CH=N) ppm.

$^{13}$C—{$^1$H} NMR (CDCl$_3$): δ=32.9 (d broad, $^2J_{CP}$=11.7 Hz, CH$_3$—N—P$_1$, CH$_3$—N—P$_2$); 46.3 (d, $^1J_{CP}$=158.5 Hz, —$\overline{CH_2}$—P(O)(OCH$_3$)$_2$); 52.6 (s broad, —P(O)(O—$\overline{CH_3}$)$_2$); 114.3 (s broad, $C_0^2$, $C_1^2$, $C_2^2$); 121.8 (s, $C_2^3$); 128.1 $\overline{(s, C_1^3)}$; 131.3 (s, $C_0^3$); 131.7 (s, $C_0^4$); 132.1 (s, $C_1^4$); 138.4 (s broad, CH=N); 142.6 (d, $^3J_{CP}$=6.8 Hz, $C_2^4$); 145.0 (s, $C_2^1$); 151.0 (s broad, $C_0^1$, $C_1^1$) ppm.

Example 12a

Synthesis of the Dendritic Polymer of Generation Zero having an Aza-bis-dimethyl-phosphonate Surface

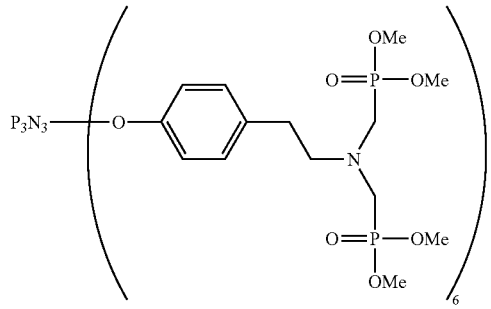

Cesium carbonate (31.2 mmol, 10.16 g) is added to a solution of hexachlorocyclotriphosphazene (2.4 mmol, 834 mg) in solution in anhydrous THF (5 ml), and then phenol aza-bis-dimethyl-phosphonate is added (15.6 mmol, 5.96 g). The mixture is left under argon, with magnetic stirring, for 3 days at ambient temperature. The isolated product can contain [0-5%] excess phenol aza-bis-dimethyl-phosphonate. The final product is isolated in a yield of 85%.

$^{31}$P—{$^1$H} NMR (CDCl$_3$): δ=30.2 (s, P(O)(OMe)$_2$); 12.9 (s, P$_0$) ppm.

$^1$H NMR (CDCl$_3$): δ=2.72 (t distorted, $^3J_{HH}$=8.4 Hz, 2H, —CH$_2$—CH$_2$—N); 3.00 (t distorted, $^3J_{HH}$=8.2 Hz, 2H, —$\overline{CH_2}$—CH$_2$—N—); 3.18 (d, $^2J_{HP}$=8.9 Hz, 4H, N—CH$_2$—P); 3.70 (d, $^3J_{HP}$=7.8 Hz, 12H, —OMe); 6.7-7.2 (m, 4 H, CH$_{arom}$) ppm.

$^{13}$C—{$^1$H} NMR (CDCl$_3$): δ=32.90 (s, $\overline{CH_2}$—CH$_2$—N); 49.4 (dd, $^1J_{CP}$157.3 Hz, $^3J_{CP}$=6.6 Hz —CH$_2$—P(O)(OCH$_3$)$_2$); 52.6 (d, $^2J_{CP}$=3.0 Hz, —P(O)(O—$\overline{CH_3}$)$_2$); 58.3 (t, $^3J_{CP}$=7.8 Hz, CH$_2$—$\overline{CH_2}$—N); 120.7 (s, $C_0^2$); 129.7 (s, $C_0^3$); 135.9 (s, $C_0^4$); 149.0 (d, $^2J_{CP}$=3.9 Hz, $C_0^1$) ppm.

Example 13

Synthesis of the Dendritic Polymer of Generation Zero having an Aza-bis-dimethyl-phosphonate Surface

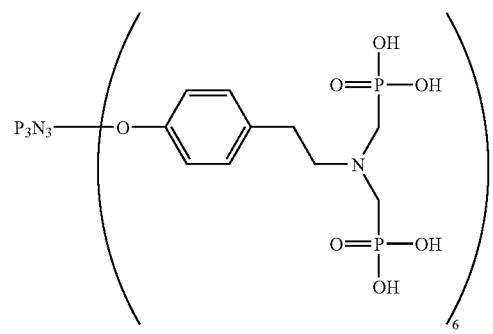

Bromotrimethylsilane (165 mmol, 22 ml) is added slowly to a solution of dendritic polymer of generation zero having aza-bis-dimethyl-phosphonate ends (4.9 mmol, 11.84 g) at 0° C. in acetonitrile (5 ml). When the addition is complete, the mixture is allowed to return to ambient temperature over a period of 24 hours. The mixture is then evaporated to dryness, and then 5 ml of water are added slowly at ambient temperature and the mixture is stirred for one hour. After filtration, the residue is washed several times with pure ether. The final product is isolated in a final yield of 50%.

$^{31}$P—{$^1$H} NMR (D$_2$O): δ=12.9 (s, P$_0$); 11.4 (s, P(O)(OH)$_2$) ppm.

$^{13}$C—{$^1$H} NMR (D$_2$): δ=31.40 (s, —CH$_2$N); 53.9 (d, $^1J_{CP}$=140.07 Hz, —CH$_2$—P(O)(OH)$_2$); 59.7 (s, CH$_2$—CH$_2$—N); 123.9 (s, C$_0^2$); 132.9 (s, C$_0^3$); 135.7 (s, C$_0^4$); 151.4 (s broad, C$_0$1) ppm.

Example 14

Synthesis of Dendritic Polymers having a Cyclotriphosphazene Core Derived from Amino-methyl Bis-phosphonate a) Synthesis of the Imine Derived from Methylamine

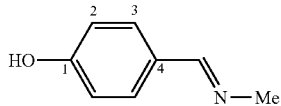

Methylamine (25 mmol, 3 ml) in 33% solution in absolute ethanol (8 mol.l$^{-1}$) and 4-hydroxybenzaldehyde (20 mmol, 2.5 g) are mixed, without solvent, at ambient temperature. The mixture is stirred magnetically for 24 hours at ambient temperature. The ethanol is evaporated off under reduced pressure to yield an oil, which is dissolved in a minimal amount of ether and then precipitated from pentane. The imine was not isolated because it is used directly in the following step.

b) Synthesis of amino-methyl mono-phosphonate

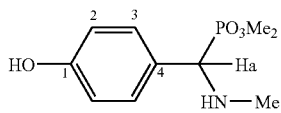

The phenol carrying the imine function from step (a) (17.0 mmol, 2.3 g) is mixed, without solvent, at ambient temperature, with several drops of triethylamine and with dimethyl phosphite (18.7 mmol, 1.7 ml). The mixture is left at ambient temperature for 12 hours and is then evaporated to dryness. The resulting powder is dissolved in acetone and then passed through a silica "patch". Finally, the eluant is evaporated off to give the final product in a yield of 68%.

$^{31}$P—{$^1$H} NMR (CDCl$_3$): δ=29.6 (s, P(O)(OMe)$_2$) ppm.

$^1$H NMR (CDCl$_3$): δ=2.29 (s, 3H, N-CH$_3$); 3.54 (d, $^3J_{HP}$=Hz, 3H, —OMe); 3.72 (d, 3H, $^3J_{HP}$=Hz, 3H, —OMe); 3.84 (d, $^2J_{HP}$=23.9 Hz, 1H, H); 6.73 (d, $^3J_{HH}$=Hz, CH$_{arom}$, 2H); 7.14 (dd, CH$_{arom}$, 2H) ppm.

$^{13}$C—{$^1$H} NMR (CDCl$_3$): δ=43.3 (t, $^3J_{CP}$=6.8 Hz, N-Me); 53.6 (d, $^2J_{CP}$=7.7 Hz, OMe); 54.1 (d, $^2J_{CP}$=6.4 Hz, OMe); 63.2 (dd, $^1J_{CP}$=159.6 Hz, $^3J_{CP}$=14.5 Hz, CH); 115.6 (s, C$_2$); 121.1 (d, $^2J_{CP}$=3.8 Hz, C$_4$); 132.0 (d, $^3J_{CP}$=8.9 Hz, C$_3$); 157.1 (s, C$_1$) ppm.

c) Synthesis of amino-methyl bis-phosphonate

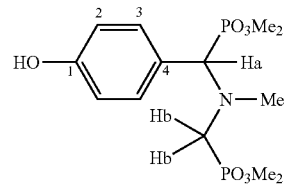

The secondary amine from step (b) (6.1 mmol, 1.5 g) is dissolved at ambient temperature in 37% aqueous formaldehyde solution (12.2 mmol, 1 ml) and dimethyl phosphite (24.4 mmol, 2.24 ml) without solvent. The mixture is stirred magnetically at ambient temperature for 12 hours. The final mixture is then washed several times with an ether/pentane mixture 1/1. Finally, the product is purified by chromatography on silica gel using ethyl acetate as solvent (Rf=0.35). The final product is isolated in a yield of 65%.

$^{31}$P—{$^1$H} NMR (CDCl$_3$): δ=28.1 (s, P(O)(OMe)$_2$); 30.9 (s, P(O)(OMe)$_2$) ppm.

$^1$H NMR (CDCl$_3$): δ=2.41 (s, 3H, N—CH$_3$); 2.61 (dd, $^2J_{HP}$=6.3 Hz, $^2J_{HH}$=15.3 Hz, 1H, Hb); 3.12 (dd, $^2J_{HP}$=15.6 Hz, $^2J_{HH}$=15.6 Hz, 1H, Hb); 3.30-3.80 (m, 12H, —OMe); 4.05 (d, $^2J_{HP}$=23.9 Hz, 1H, Ha); 6.74 (d, $^3J_{HH}$=7.84 Hz, CH$_{arom}$, 2 H); 7.17 (d, $^3J_{HH}$=7.85 Hz, CH$_{arom}$, 2H); 9.08 (s broad, 1H, —OH) ppm.

$^{13}$C—{$^1$H} NMR (CDCl$_3$): δ=42.3 (t, $^3J_{CP}$=6.3 Hz, N-Me); 49.2 (dd, $^1J_{CP}$=164.1 Hz, $^3J_{CP}$=10.1 Hz, CH$_2$); 53.0 (m, OMe); 65.2 (dd, $^1J_{CP}$=161.7 Hz, $^3J_{CP}$=13.5 Hz, CH); 115.4 (s, C$_2$); 120.9 (d, $^2J_{CP}$=3.5 Hz, C$_4$); 131.8 (d, $^3J_{CP}$=9.1 Hz, C$_3$); 157.8 (s, C$_1$) ppm.

d) Synthesis of the First Generation Dendritic Polymer Derived from amino-methyl bis-phosphonate

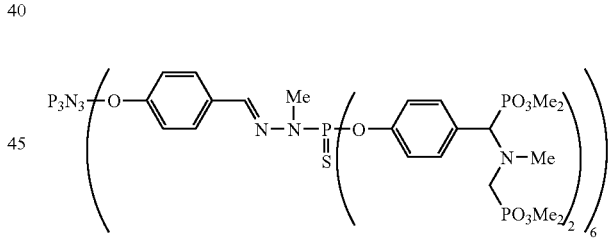

Cesium carbonate (1.2 mmol, 390 mg) is added to a solution of the dendritic polymer Gc$_1$ (0.047 mmol, 87 mg) in anhydrous THF (2 ml), and then phenol aza-bis-dimethylphosphonate derived from methylamine from step (c) is added (0.6 mmol, 220 mg). The mixture is stirred for 24 hours at ambient temperature and is then filtered over Celite, and the final mixture is centrifuged in order to separate off the salts. Finally, the final product is purified by precipitation from pentane and isolated in a yield of 75%.

$^{31}$P—{$^1$H} NMR (CDCl$_3$): δ=65.4 (s, P$_1$); 30.4 (s, P(O)(OMe)$_2$); 27.5 (s, P(O)(OMe)$_2$); 11.4 (s, P$_0$) ppm.

$^1$H-NMR (CDCl$_3$): δ=2.46 (s, 36H, N—CH$_3$); 2.65 (dd, $^2J_{HP}$=7.4 Hz, $^2J_{HH}$=15.3 Hz, 12H, CH$_2$); 3.12 (dd, $^2J_{HP}$=15.5 Hz, $^2J_{HH}$=15.5 Hz, 12H, CH$_2$); 3.25 (d, $^3J_{HP}$=10.1 Hz, 18H, CH$_3$—N—P$_1$); 3.30-3.90 (m, 144H, —OMe); 4.2 (d, $^2J_{HP}$=23.4 Hz, 12H, CH); 6.7-7.6 (m, 78H, CH$_{arom}$, CH=N) ppm.

$^{13}C\{^1H\}$ NMR (CDCl$_3$) : δ=32.8 (d, $^2J_{CP}$=12.3 Hz, CH$_3$—N—P$_1$); 42.2 (t, $^3J_{CP}$=6.8 Hz, N-<u>Me</u>); 49.3 (dd, $^1J_{CP}$=164.0 Hz, $^3J_{CP}$=9.9 Hz, CH$_2$); 52.3-53.7 (m, OMe); 64.9 (dd, $^1J_{CP}$=138.1 Hz, $^3J_{CP}$=11.9 Hz, CH); 121.1 (s broad, C$_0^2$, C$_1^2$); 128.2 (s, C$_0^3$); 128.4 (d, $^2J_{CP}$=3.1 Hz, C$_1^4$); 131.8 (s, C$_0^4$); 131.8 (d, $^3J_{CP}$=8.2 Hz, C$_1^3$); 139.0 (d, $^3J_{CP}$=14.5 Hz, CH=N); 150.6 (d, $^2J_{CP}$=6.9 Hz, C$_1^1$); 151.2 (s, C$_0^1$) ppm.

e) Synthesis of the Second Generation Dendritic Polymer Derived from amino-methyl bis-phosphonate

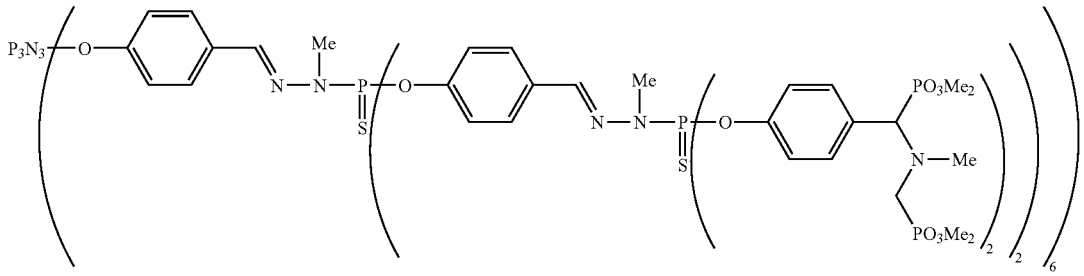

Cesium carbonate (1.3 mmol, 407 mg) is added to a solution of the dendritic polymer Gc$_2$ (0.024 mmol, 119 mg) in anhydrous THF (2 ml), and then phenol aza-bis-dimethyl-phosphonate derived from methylamine from step (c) is added (0.67 mmol, 230 mg). The mixture is stirred for 24 hours at ambient temperature and is then filtered over Celite, and the final mixture is centrifuged in order to separate off the salts. Finally, the final product is purified by precipitation from pentane and isolated in a yield of 80%.

$^{31}P\{^1H\}$ NMR (CDCl$_3$): δ=66.1 (s, P$_1$); 65.4 (s, P$_2$); 30.4 (s, P(O)(OMe)$_2$); 27.5 (s, P(O)(OMe)$_2$); 11.6 (s, P$_0$) ppm.

$^1H$ NMR (CDCl$_3$): δ=2.48 (s, 72 H, N—CH$_3$); 2.67 (dd, $^2J_{HP}$=7.1 Hz, $^2J_{HH}$=15.3 Hz, 24H, CH$_2$); 3.14 (dd, $^2J_{HP}$=15.4 Hz, $^2J_{HH}$=15.4 Hz, 24H, CH$_2$); 3.31 (d, $^3J_{HP}$=10.9 Hz, 54H, CH$_3$—N—P$_1$, CH$_3$—N—P$_2$); 3.30-3.90 (m, 288H, —OMe); 4.2 (d, $^2J_{HP}$=23.2 Hz, 24H, CH); 7.0-7.7 (m, 186H, CH$_{arom}$, CH=N) ppm.

$^{13}C\{^1H\}$ NMR (CDCl$_3$): δ=32.9 (d, $^2J_{CP}$=12.4 Hz, CH$_3$—N—P$_1$, CH$_3$—N—P$_2$); 42.3 (t, $^3J_{CP}$=7.0 Hz, N-<u>Me</u>); 49.5 (dd, $^1J_{CP}$=163.7 Hz, $^3J_{CP}$=9.8 Hz, CH$_2$); 52.4-53.6 (m, OMe); 64.9 (dd, $^1J_{CP}$=160.2 Hz, $^3J_{CP}$=12.1 Hz, CH); 121.17 (s, C$_2^2$); 121.24 (s, C$_1^2$); 121.8 (s, C$_0^2$); 128.3 (s broad, C$_2^4$); 128.5 (s broad, C$_0^3$, C$_1^3$); 131.8 (d broad, $^3J_{CP}$=8.2 Hz, C$_1^4$, C$_2^3$); 132.3 (s broad, C$_0^4$); 138.9 (d, $^3J_{CP}$=13.8 Hz, CH=N; 150.7 (d broad, $^2J_{CP}$=7.2 Hz, C$_2^1$); 151.2 (s broad, C$_0^1$, C$_1^1$) ppm.

f) Synthesis of the Fourth Generation Dendritic Polymer Derived from amino-methyl bisphosphonate

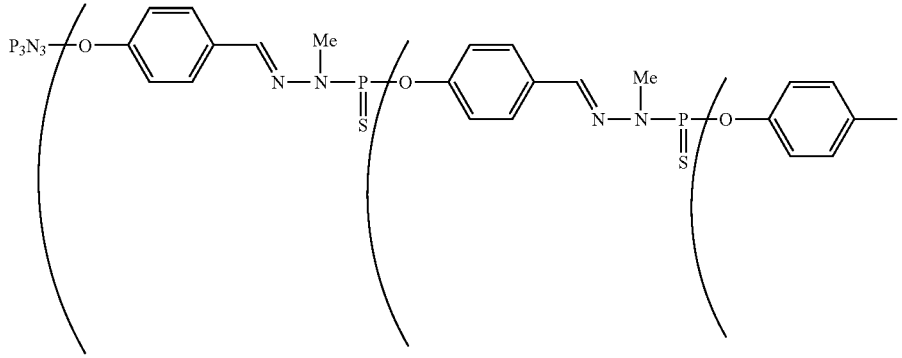

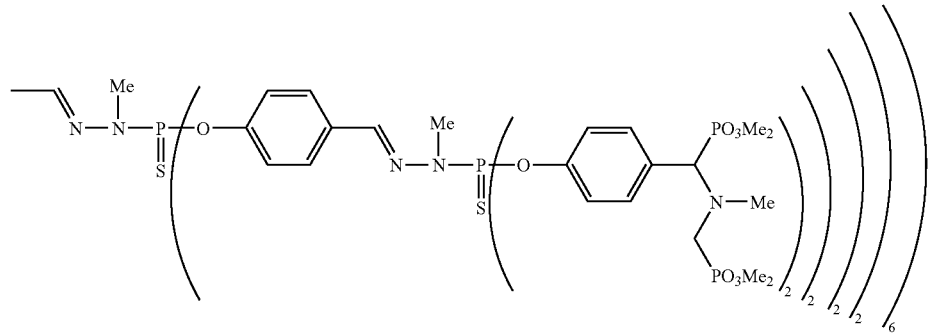

Cesium carbonate (0.71 mmol, 230 mg) is added to a solution of the dendritic polymer Gc$_4$ (3.5.10$^{-3}$ mmol, 79.2 mg) in anhydrous THF (2 ml), and then phenol aza-bis-dimethyl-phosphonate derived from methylamine from step (c) is added (0.35 mmol, 130 mg). The mixture is stirred for 48 hours at ambient temperature and is then filtered over Celite, and the final mixture is centrifuged in order to separate off the salts. Finally, the final product is purified by precipitation from pentane and isolated in a yield of 84%.

$^{31}$P—{$^1$H} NMR (CDCl$_3$): δ=66.1 (s broad, P$_1$, P$_2$, P$_3$); 65.4 (s, P$_4$); 30.1 (s, P(O)(OMe)$_2$); 27.6 (s, P(O)(OMe)$_2$); 11.6 (s, P$_0$) ppm.

$^1$H NMR (CDCl$_3$): δ=2.48 (s, 288H, N—CH$_3$); 2.65 (dd, $^2$J$_{HP}$=7.2 Hz, $^2$J$_{HH}$=15.3 Hz, 96H, CH$_2$); 3.13 (dd, $^2$J$_{HP}$=15.2 Hz, $^2$J$_{HH}$=15.2 Hz, 96H, CH$_2$); 3.27 (s broad, 270H, CH$_3$—N—P$_1$, CH$_3$—N—P$_2$, CH$_3$—N—P$_3$, CH$_3$—N—P$_4$); 3.30-3.90 (m, 1152H, —OMe); 4.2 (d, $^2$J$_{HP}$=23.3 Hz, 96H, CH); 7.0-7.7 (m, 834H, CH$_{arom}$, CH=N) ppm.

$^{13}$C—{$^1$H} NMR (CDCl$_3$): δ=32.9 (d, $^2$J$_{CP}$=12.4 Hz, CH$_3$—N—P$_1$, CH$_3$—N—P$_2$, CH$_3$—N—P$_3$, CH$_3$—N—P$_4$); 42.3 (t, $^3$J$_{CP}$=7.0 Hz, N-Me); 49.5 (dd, $^1$J$_{CP}$=163.8 Hz, $^3$J$_{CP}$=9.9 Hz, CH$_2$); 52.4-53.9 (m, OMe); 65.1 (dd, $^1$J$_{CP}$=161.2 Hz, $^3$J$_{CP}$=12.3 Hz, CH); 121.45 (s, C$_3^2$); 122.1 (s broad, C$_2^2$, C$_1^2$, C$_0^2$); 128.5 (s broad, C$_0^3$ C$_1^3$, C$_2^3$); 128.7 (s broad, C$_3^3$); 132.1 (d broad, $^3$J$_{CP}$=8.2 Hz, C$_3^4$, C$_2^4$); 132.4 (s broad, C$_0^4$, C$_1^4$); 139.2 (d, $^3$J$_{CP}$=13.4 Hz, CH=N); 151.0 (d broad, $^2$J$_{CP}$=7.2 Hz, C$_3^1$); 151.6 (s broad, C$_2^1$, C$_1^1$); 151.7 (s broad, C$_0^1$) ppm.

g) Synthesis of the First Generation Dendritic Polymer Derived from amino-methyl bis-phosphonic acid

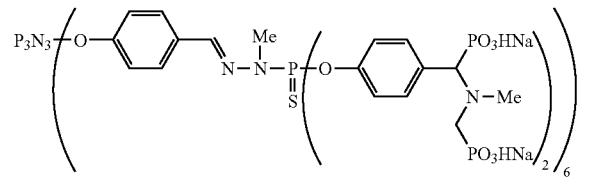

Bromotrimethylsilane (2.1 mmol, 289 μl) is added slowly to a solution of the first generation dendritic polymer having aza-bis-dimethyl-phosphonate ends derived from methylamine from step (d) (3.97.10$^{-2}$ mmol, 230 mg) at 0° C. in acetonitrile (5 ml). When the addition is complete, the mixture is allowed to return to ambient temperature over a period of 12 hours. The mixture is then evaporated to dryness, and then 1 ml of anhydrous methanol is added at ambient temperature and the mixture is stirred for one hour. After evaporation to dryness, the residue is washed several times with pure ether. Because the product is totally insoluble in organic solvents, it is converted into its monosodium salt in the presence of sodium hydroxide (3.1 ml of a 0.1955 mol.l$^{-1}$ sodium hydroxide solution for 130 mg of phosphonic acid dendritic polymer). The resulting solution is lyophilised to give the dendritic polymer in the form of a white powder. The final product is isolated in a yield of 58%.

$^{31}$P—{$^1$H} NMR (CD$_3$CN/D$_2$O): δ=66.09 (s, P$_1$ and P$_2$); 14.1 (s, P$_0$); 11.2 (s, PO$_3$HNa) ppm.

$^1$H NMR (CD$_3$CN/D$_2$O): δ=2.5-3.8 (m, 90H, CH$_3$—N—P, N-Me, CH$_2$, CH); 6.5-8.0 (m, 78H, CH$_{arom}$, CH=N).

$^{13}$C—{$^1$H} NMR (CD$_3$CN/D$_2$O): δ=35.5 (s broad, CH$_3$—N—P$_1$); 44.8 (s broad, N-Me); 54.5 (d, $^1$J$_{CP}$=132.5 Hz, CH$_2$); 70.5 (d, $^1$J$_{CP}$=129.4 Hz, CH); 124.4 (s broad, C$_0^2$, C$_1^2$); 130.4 (s broad, C$_0^3$, C$_1^3$); 136.3 (s broad, C$_0^4$, C$_1^4$); 142.9 (s broad, CH=N); 153.9 (s broad, C$_0^1$, C$_1^1$) ppm.

h) Synthesis of the Second Generation Dendritic Polymer Derived from amino-methyl bis-phosphonic acid

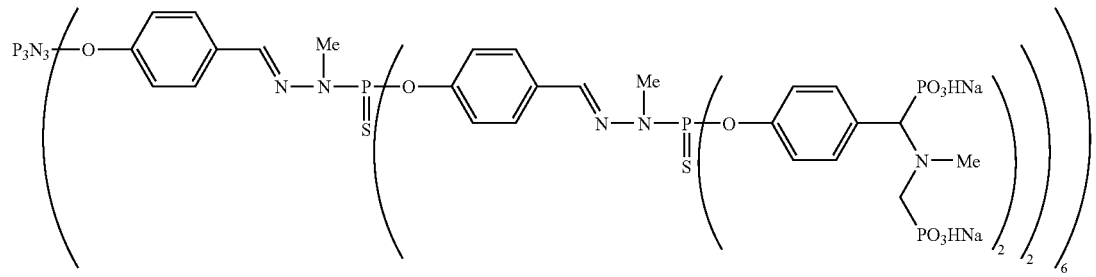

Bromotrimethylsilane (1.6 mmol, 210 μl) is added slowly to a solution of the second generation dendritic polymer having aza-bis-dimethyl-phosphonate ends derived from methylamine from step (e) (1.49.10$^{-2}$ mmol, 190 mg) at 0° C. in acetonitrile (5 ml). When the addition is complete, the mixture is allowed to return to ambient temperature over a period of 12 hours. The mixture is then evaporated to dryness, and then 1 ml of anhydrous methanol is added at ambient temperature and the mixture is stirred for one hour. After evaporation to dryness, the residue is washed several times with pure ether. Because the product is totally insoluble in organic solvents, it is converted into its monosodium salt in the presence of sodium hydroxide (3.01 ml of a 0.1955 mol.l$^{-1}$ sodium hydroxide solution for 140 mg of phosphonic acid dendritic polymer). The resulting solution is lyophilised to give the dendritic polymer in the form of a white powder. The final product is isolated in a yield of 54%.

$^{31}$P—{$^1$H} NMR (CD$_3$CN/D$_2$O): δ=66.7 (s, P$_1$); 14.4 (s, P$_0$) 10.8 (s, PO$_3$HNa) ppm.

$^1$H NMR (CD$_3$CN/D$_2$O): δ=2.5-3.8 (m, 198H, CH$_3$—N—P$_1$, CH$_3$—N—P$_2$, N-Me, CH$_2$, CH); 6.5-8.0 (m, 186 H, CH$_{arom}$, CH=N).

$^{13}$C—{$^1$H} NMR (CD$_3$CN/D$_2$O): δ=35.5 (s broad, CH$_3$—N—P$_1$, CH$_3$—N—P$_2$); 44.6 (s broad, N-$\underline{\text{Me}}$); 55.6 (d, $^1$J$_{CP}$=102.7 Hz, CH$_2$); 71.0 (d, $^1$J$_{CP}$=128.2 Hz, CH); 124.4 (s broad, Q$^2$, C$_1^2$, C$_2^2$); 130.4 (s broad, C$_0^3$, C$_1^3$, C$_2^3$); 136.3 (s broad, C$_0^4$, C$_1^4$, C$_2^4$); 142.9 (s broad, CH=N); 153.9 (s, C$_0^1$, C$_1^1$, C$_2^1$) ppm.

Example 15

Synthesis of Dendritic Polymers having a Cyclotriphosphazene Core and a Surface Derived from amino-butyl bis-phosphonate a): Synthesis of the Imine Derived from Butylamine

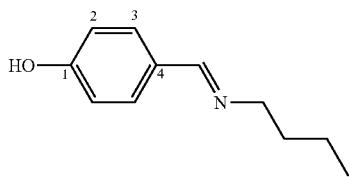

n-Butylamine (43 mmol, 4.3 ml) and 4-hydroxybenzaldehyde (41 mmol, 5 g) are mixed, without solvent and at ambient temperature, with 4 Å molecular sieve. The mixture is stirred magnetically for 24 hours and is then taken up in THF and filtered over Celite. The THF is evaporated off under reduced pressure to yield a thick, dark oil. The oil can be dissolved in a minimal amount of ether and is precipitated with pentane. There is thus obtained a slightly pink powder in a yield of 80%.

$^1$H NMR (CDCl$_3$): δ=0.90 (t, $^3$J$_{HH}$=7.6 Hz, 3H, —CH$_3$); 1.33 (m, 2H, CH$_2$—CH$_2$—CH$_3$); 1.66 (m, 2H, CH$_2$CH$_2$—CH$_3$); 3.59 (t, $^3$J$_{HH}$=7.4 Hz, 2H, N—CH$_2$); 6.7 (d, $^3$J$_{HH}$=8.4 Hz, CH$_{arom}$, 2H); 7.5 (d, $^3$J$_{HH}$=8.4 Hz, 2H, CH$_{arom}$); 8.14 (s, 1H, CH=N); 8.81 (s broad, 1H, —OH) ppm.

$^{13}$C—{$^1$H} NMR (CDCl$_3$): δ=13.9 (s, $\underline{\text{CH}}_3$); 20.3 (s, $\underline{\text{CH}}_2$—CH$_3$); 32.7 (s, $\underline{\text{CH}}_2$—CH$_2$—CH$_3$); 60.1 (s, N—$\underline{\text{CH}}_2$—CH$_2$—CH$_2$—CH$_3$); 116.3 (s, C$_2$); 125.4 (s, C$_4$); 130.6 (s, C$_3$); 161.5 (s, C$_1$); 162.9 (s, CH=N) ppm.

b) Synthesis of amino-butyl mono-phosphonate

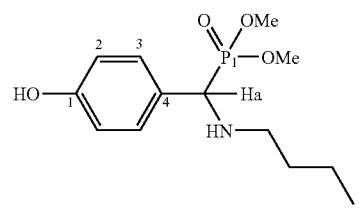

The phenol carrying the imine function from step (a) (16.9 mmol, 3 g) is mixed, without solvent and at ambient temperature, with triethylamine (16.9 mmol, 2.35 ml) and dimethyl phosphite (16.9 mmol, 1.55 ml). The mixture is left at ambient temperature for 12 hours and is then evaporated to dryness. The resulting powder is dissolved in acetone and then passed through a silica "patch". Finally, the eluant is evporated off to give the final product in a yield of 65%.

$^{31}$P—{$^1$H} NMR (CDCl$_3$): δ=29.8 (s, P$_1$) ppm.

$^1$H NMR (CDCl$_3$): δ=0.80 (t, $^3$J$_{HH}$=7.6 Hz, 3H, —CH$_3$); 1.20-1.55 (m, 4H, CH$_2$—CH$_2$); 2.41 (m, 2H, N—CH$_2$—); 3.6.(d, $^3$J$_{HP}$=10.4 Hz, 3H, —P$_1$OMe); 3.8 (d, $^3$J$_{HP}$=10.8 Hz, 3H, —P$_2$OMe); 4.0 (d, $^2$J$_{HP}$=26.0 Hz, 1 H, Ha); 6.7 (d, $^3$J$_{HH}$=8.4 Hz, CH$_{arom}$, 2H); 7.2 (d, $^3$J$_{HH}$=8.4 Hz, CH$_{arom}$, 2H) ppm.

$^{13}$C—{$^1$H} NMR (CDCl$_3$): δ=13.9 (s, $\underline{\text{CH}}_3$); 20.3 (s, —$\underline{\text{CH}}_2$—CH$_3$); 31.8 (s, $\underline{\text{CH}}_2$—CH$_2$—CH$_3$); 47.4 (d, $^3$J$_{CP}$=17.6 Hz, N—$\underline{\text{CH}}_2$—$\underline{\text{CH}}_2$—CH$_2$—CH$_3$); 53.6 (d, $^2$J$_{CP}$=7.9 Hz, OMe); 53.9 (d, $^2$J$_{CP}$=6.2 Hz, OMe); 59.8 (d, $^1$J$_{CP}$=157.1 Hz, CH); 115.9 (s, C$_2$); 125.4 (s, C$_4$); 129.5 (s, C$_3$); 157.0 (s, C$_1$) ppm.

c) Synthesis of amino-butyl bis-phosphonate

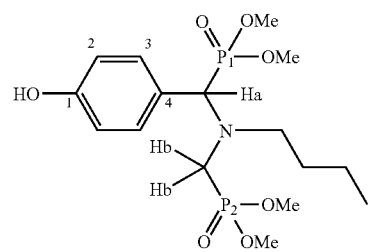

The secondary amine from step (b) (5.8 mmol, 1.67 g) is dissolved at ambient temperature in, 37% aqueous formaldehyde solution (8.7 mmol, 657 μl) and dimethyl phosphite (5.8 mmol, 530 μl). The mixture is stirred magnetically at ambient temperature for 12 hours. Finally, the excess formaldehyde is removed under reduced pressure and the product is purified by chromatography on silica gel using ethyl acetate as solvent. The final product is isolated in a yield of 60%.

$^{31}$P—{$^1$H} NMR (CDCl$_3$): δ=28.3 (s, P$_1$); 30.9 (s, P$_2$) ppm.
$^1$H NMR (CDCl$_3$): δ=0.86 (t, $^3J_{HH}$=7.6 Hz, 3H, CH$_3$); 1.25-1.55 (m, 4H, CH$_2$—CH$_2$); 2.31 (m, 1H, N—CH$_2$—); 2.64 (dd, $^2J_{HP}$=3.2 Hz, $^2J_{HH}$=15.6 Hz, 1H, CH$_2$—P$_2$); 3.11 (m, 1H, N—CH$_2$—CH$_2$); 3.35 (ddd, $^2J_{HP}$=17.2 Hz, $^2J_{HH}$=17.0 Hz, $^4J_{HP}$=1.6 Hz, 1H, CH$_2$—P$_2$); 3.5 (d, $^3J_{HP}$=10.4 Hz, 3H, —P$_1$OMe); 3.7 (d, $^3J_{HP}$=10.8 Hz, 3H, —P$_2$OMe); 3.8 (d, $^3J_{HP}$=10.8 Hz, 3H, —P$_2$OMe); 3.9 (d, $^3J_{HP}$=10.8 Hz, 3H, —P$_1$OMe); 4.4 (d, $^2J_{HP}$=26.0 Hz, 1H, Ha); 6.84 (d, $^3J_{HH}$=8.4 Hz, CH$_{arom}$, 2H); 7.26 (d, $^3J_{HH}$=8.4 Hz, CH$_{arom}$, 2H); 9.1 (s broad, 1H, —OH) ppm.

$^{13}$C—{$^1$H} NMR (CDCl$_3$): δ=14.4 (s, CH$_3$); 20.4 (s, CH$_2$—CH$_3$); 30.6 (s, CH$_2$—CH$_2$—CH$_3$); 46.0 (dd, $^1J_{CP}$=166.8 Hz, $^3J_{CP}$=8.8 Hz, CH$_2$—P$_2$); 53.0 (d, $^2J_{CP}$=6.8 Hz, P$_2$OMe); 53.4 (d, $^2J_{CP}$=7.0 Hz, P$_1$OMe); 53.7 (d, $^2J_{CP}$=7.0 Hz, P$_2$OMe); 54.1 (d; 2J$_{CP}$=7.1 Hz, P$_1$OMe); 53.1 (t, $^3J_{CP}$=7.8 Hz, N—CH$_2$—CH$_2$—CH$_2$—CH$_3$); 61.3 (dd, $^1J_{CP}$=162.9 Hz, $^3J_{CP}$=10.0 Hz, CH); 115.9 (s, C$_2$); 121.5 (d, $^2J_{CP}$=6.0 Hz, C$_4$); 132.5 (d, $^3J_{CP}$=9.1 Hz, C$_3$); 158.1 (s, C$_1$) ppm.

d) Synthesis of the First Generation Dendritic Polymer Derived from amino-butyl bis-phosphonate

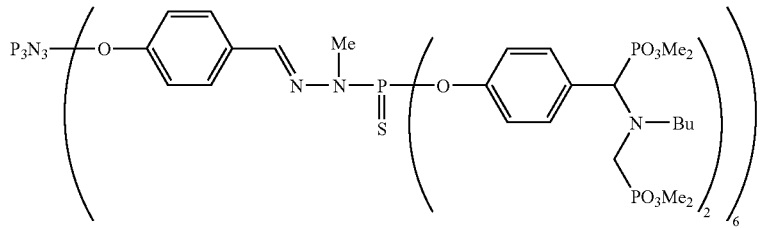

Cesium carbonate (1.4 mmol, 453 mg) is added to a solution of the dendritic polymer Gc$_1$ (0.058 mmol, 106 mg) in anhydrous THF (3 ml), and then phenol aza-bis-dimethylphosphonate derived from butylamine from step (c) is added (0.73 mmol, 300 mg). The mixture is stirred for 24 hours at ambient temperature and is then filtered over Celite, and the final mixture is centrifuged in order to separate off the salts. Finally, the final product is purified by precipitation from pentane and isolated in a yield of 65%.

$^{31}$P—{$^1$H} NMR (CDCl$_3$): δ=65.4 (s, P$_1$); 30.8 (s, P(O)(OMe)$_2$); 28.3 (s, P(O)(OMe)$_2$); 11.4 (s, P$_0$) ppm.
$^1$H NMR (CDCl$_3$): δ=0.82 (t, $^3J_{HH}$=7.6 Hz, 36H, CH$_3$); 1.20-1.50 (m, 48H, CH$_2$—CH$_2$); 2.27 (m, 12H, N—CH$_2$—); 2.57 (dd, $^2J_{HP}$=3.4 Hz, $^2J_{HH}$=15.2 Hz, 12H, CH$_2$—P$_2$); 3.11 (m, 12H, N—CH$_2$—CH$_2$); 3.26 (d, $^3J_{HP}$=10.6 Hz, 18H, CH$_3$—N—P); 3.4 (d, $^3J_{HP}$=10.6 Hz, 36H, —P$_1$OMe); 3.6 (d, $^3J_{HP}$=10.7 Hz, 36H, —P$_2$OMe); 3.7 (d, $^3J_{HP}$=10.8 Hz, 36H, —P$_2$OMe); 3.8 (d, $^3J_{HP}$=10.6 Hz, 36H, —P$_1$OMe); 4.4 (d, $^2J_{HP}$=25.0 Hz, 12H, Ha); 6.9-7.8 (m, 78H, CH$_{arom}$, CH=N) ppm.
$^{13}$C—{$^1$H} NMR (CDCl$_3$): δ=14.0 (s, CH$_3$); 19.9 (s, CH$_2$—CH$_3$); 30.2 (s, CH$_2$—CH$_2$—CH$_3$); 32.8 (d, $^2J_{CP}$=11.5 Hz, CH$_3$N—P$_1$); 46.0 (dd, $^1J_{CP}$=166.7 Hz, $^3J_{CP}$=8.6 Hz, CH$_2$—P$_2$); 52-54 (m, PO$_3$Me$_2$); 60.3 (dd, $^1J_{CP}$=163.9 Hz, $^3J_{CP}$=10.4 Hz, CH); 121.2 (s broad, C$_0^2$, C$_1^2$); 128.2 (s, C$_0^3$); 128.8 (d, $^3J_{CP}$=4.5 Hz, C$_1^3$); 131.9 (s, C$_1^4$); 132.1 (s, C$_0^4$); 139.1 (d, $^3J_{CP}$=13.9 Hz, CH=N); 150.6 (d, $^2J_{CP}$=6.9 Hz, C$_1^1$); 15.3 (s, C$_0^1$) ppm.

e) Synthesis of the Second Generation Dendritic Polymer Derived from amino-butyl bis-phosphonate

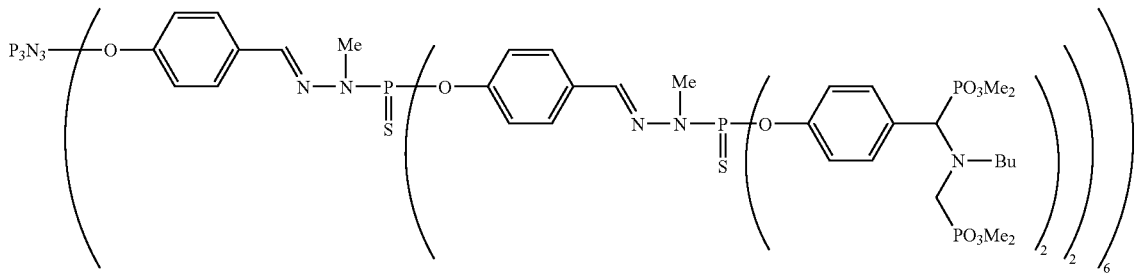

Cesium carbonate (0.54 mmol, 176 mg) is added to a solution of the dendritic polymer Gc$_2$ (0.0106 mmol, 51 mg) in anhydrous THF (2 ml), and then phenol aza-bis-dimethyl-phosphbnate derived from butylamine from step (c) is added (0.27 mmol, 110 mg). The mixture is stirred for 36 hours at ambient temperature and is then filtered over Celite, and the final mixture is centrifuged. in order to separate off the salts. Finally, the final product is purified by precipitation from pentane and isolated in a yield of 75%.

$^{31}$P—{$^1$H} NMR (CDCl$_3$): δ=66.1 (s, P$_1$); 65.3 (s, P$_2$); 30.8 (s, P(O)(OMe)$_2$); 28.3 (s, P(O)(OMe)$_2$); 11.4 (s, PO) ppm.

$^1$H NMR (CDCl$_3$): δ=0.88 (t, $^3J_{HH}$=7.6 Hz, 72H, CH$_3$); 1.20-1.45 (m, 96H, CH$_2$—CH$_2$); 2.33 (m, 24H, N—CH$_2$—); 2.63 (dd, $^2J_{HP}$=3.4 Hz, $^2J_{HH}$=15.2 Hz, 24H, CH$_2$—P$_2$); 3.16 (m, 24H, N—CH$_2$—CH$_2$); 3.33 (m, 54H, CH$_3$—N—P); 3.44 (d, $^3J_{HP}$=12.0 Hz, 72H, P$_1$OMe); 3.7 (d, $^3J_{HP}$=10.7 Hz, 72H, —P$_2$OMe); 3.8 (d, $^3J_{HP}$=10.6 Hz, 72H, —P$_2$OMe); 3.9 (d, $^3J_{HP}$=10.7 Hz, 72H, —P$_1$OMe); 4.5 (d, $^2J_{HP}$=25.5 Hz, 24H, Ha); 6.9-7.8 (m, 186H, CH$_{arom}$, CH=N) ppm.

$^{13}$C—{$^1$H} NMR (CDCl$_3$): δ=14.4 (s, CH$_3$); 20.3 (s, CH$_2$—CH$_3$); 30.6 (s, CH$_2$—CH$_2$—CH$_3$); 33.3 (d, $^2J_{CP}$=11.7 Hz, CH$_3$—N—P$_2$, CH$_3$N—P$_1$); 46.5 (dd, $^1J_{CP}$=166.7 Hz, $^3J_{CP}$=8.6 Hz, CH$_2$—P$_2$); 52.5-54.1 (m, PO$_3$Me$_2$); 53.1 (t, $^3J_{CP}$=7.8 Hz, N—CH$_2$—CH$_2$—CH$_2$—CH$_3$) PB "; 61.3 (dd, $^1J_{CP}$=164.9 Hz, $^3J_{CP}$=10.9 Hz, CH); 121.6 (s broad, C$_1^2$, C$_2^2$); 122.2 (s, C$_0^2$); 128.7 (s broad, C$_2^3$); 129.3 (s broad, C$_0^3$, C$_1^3$); 132.5 (d broad, $^2J_{CP}$=7.5 Hz, C$_2^4$, C$_1^4$, C$_0^4$); 139.1 (s broad, CH=N); 151.0 (d, $^2J_{CP}$=6.9 Hz, C$_2^1$); 151.8 (s broad, C$_1^1$, C$_0^1$) ppm.

f) Synthesis of the First Generation Dendritic Polymer Derived from amino-butyl bis-phosphonic acid

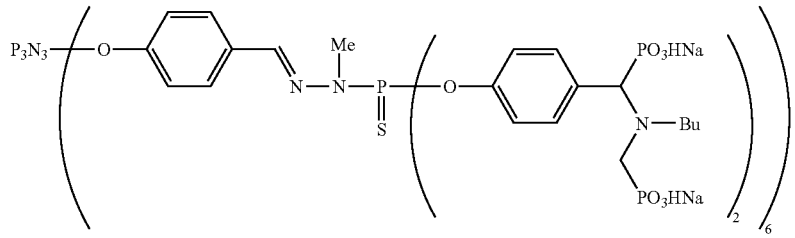

Bromotrimethylsilane (0.92 mmol, 123 µl) is added slowly to a solution of first generation dendritic polymer having aza-bis-dimethyl-phosphonate ends derived from butylamine from step (d) (1.75.10$^{-5}$ mmol, 110 mg) at 0° C. in acetonitrile (4 ml). When the addition is complete, the mixture is allowed to return to ambient temperature over a period of 12 hours. The mixture is then evaporated to dryness, and then 1 ml of anhydrous methanol is added at ambient temperature and the mixture is stirred for one hour. After evaporation to dryness, the residue is washed several times with pure ether. Because the product is totally insoluble in organic solvents, it is converted into its monosodium salt in the presence of sodium hydroxide (0.98 ml of a 0.1955 mol.l$^{-1}$ sodium hydroxide solution for 45 mg of phosphonic acid dendritic polymer). The resulting solution is lyophilised to give the dendritic polymer in the form of a white powder. The final product is isolated in a yield of 55%.

$^{31}$P—{$^1$H} NMR (CD$_3$CN/D$_2$O): δ=69.3 (s, P$_1$); 15.3 (s, P$_0$); 13.5 (s, P(O)(OHNa)$_2$) ppm.

$^1$H NMR (CD$_3$CN/D$_2$O): δ=0.9 (s broad, 36H, CH$_3$); 1.20-1.50 (m, 48H, CH$_2$—CH$_2$); 2.5-3.8 (m, 78H, CH$_3$—N—P, N—CH$_2$, CH$_2$, CH); 6.5-8.0 (m, 78H, CH$_{arom}$, CH=N).

$^{13}$C—{$^1$H} NMR (CD$_3$CN/D$_2$O): δ=13.4 (s, CH$_3$); 19.6 (s, CH$_2$—CH$_3$); 26.2 (s, CH$_2$—CH$_2$—CH$_3$); 33.4 (s broad, CH$_3$—N—P$_2$, CH$_3$—N—P$_1$); 50.5 (d, $^1J_{CP}$=123.0 Hz, CH$_2$—P$_2$); 54.1 (s broad, N—CH$_2$—CH$_2$—CH$_2$—CH$_3$); 66.3 (dd, $^1J_{CP}$=126.9 Hz, CH); 121.0 (s, C$_0^2$); 121.9 (s, C$_1^2$); 128.6 (s, C$_0^3$); 129.0 (s, C$_1^3$); 132.8 (s, C$_0^4$); 134.1 (s, C$_1^4$); 141.5: (s broad, CH=N); 150.8 (s, C$_0^1$); 151.5 (d, $^2J_{CP}$=6.9 Hz, C$_1^1$) ppm.

Example 16

Dimethyl N-allyl-N-(4-hydroxy)-benzyl-α-amino-phosphonate

750 µl (10 mmol) of allylamine are added slowly to a suspension of 4-hydroxybenzaldehyde (1.1 g, 10 mmol) in the presence of MgSO$_4$ in 10 ml of CH$_2$Cl$_2$. After 30 minutes' stirring, dimethyl phosphite is added (900 µl, 10 mmol). The suspension is stirred for 18 hours and is then filtered and diluted with 10 ml of CH$_2$Cl$_2$. The organic phase is washed with water, dried over MgSO$_4$ and then evaporated under reduced pressure. After washing with distilled ether (2×10 ml) and chromatography on silica (ethyl acetate), the pure product is obtained in the form of a viscous oil in a yield of 55%.

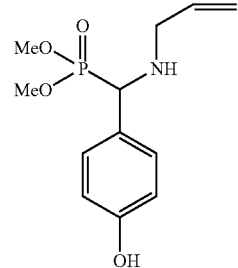

$^{31}P$—$\{^1H\}$ NMR (CDCl$_3$): δ=29.8(s).

$^1$H NMR (CDCl$_3$): δ=2.99 (m, 1H); 3.20 (m, 1H); 3.54 (d, $^3J_{HP}$=10.3 Hz, 3H); 3.74 (d, $^3J_{HP}$=10.5 Hz, 3H); 4.02 (d, $^2J_{HP}$=19.8 Hz, 1H); 5.09 (m, 2 H); 5.79 (m, 1 H); 6.74 (d, $^3J_{HH}$=7.6 Hz, 2H); 7.15 (d, $^3J_{HH}$=8.3 Hz, 2H).

Example 17

Dimethyl N-allyl-N-(4-hydroxy)-benzyl-α-amino-bis-phosphonate

Aqueous formaldehyde (37% in water, 1.06 ml, 14.3 mmol) and then dimethyl phosphite (490 µl, 5.35 mmol) are added to a solution of dimethyl N-allyl-N-(4-hydroxy)-benzyl-α-amino-phosphonate from Example 16 (970 mg, 3.58 mmol) in THF (7 ml). The solution is stirred vigorously for 48 hours at ambient temperature. 25 ml of CH$_2$Cl$_2$ are added and the solution is washed with 15 ml of water, and then the organic phase is dried over MgSO$_4$ and concentrated under reduced pressure. The residual oil is purified by washing twice with 10 ml of distilled ether followed by chromatography on silica (ethyl acetate/methanol 9/1). Yield 55%.

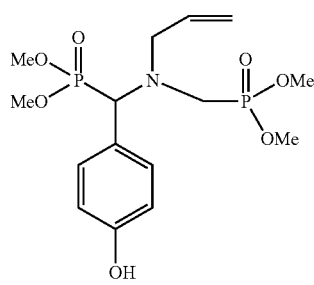

$^{31}P$—$\{^1H\}$ NMR (CDCl$_3$): δ=28.7 (s); 31.5 (s).

$^1$H NMR (CDCl$_3$): δ=2.57 (m, 1H); 2.82 (m, 1H); 3.46 (d, $^3J_{HP}$=10.5 Hz, 3H); 3.47 (m, 1H); 3.70 (d, $^3J_{HP}$=10.6 Hz, 3H); 3.79 (d, $^3J_{HP}$=10.7 Hz, 3H); 3.87 (d, $^2J_{HP}$=10.6 Hz, 3H); 3.88 (m, 1H); 4.47 (d, $^2J_{HP}$=25.8 Hz, 1H); 5.19 (m, 2H); 5.83 (m, 1H); 6.82 (d, $^3J_{HH}$=8.4 Hz, 2H); 7.25 (d, $^3J_{HH}$=8.3 Hz, 2H); 9.02 (sl, 1H).

Example 18

First Generation aza-bis-phosphonate Dendritic Polymer Derived from Allylamine

The phenol aza-bis-phosphonate from Example 17 (400 mg, 1.02 mmol) and cesium carbonate (348 mg, 1.07 mmol) are added to a solution of Gc$_1$ (143 mg, 78:2 µmol) in THF (5 ml). The suspension is stirred for 48 hours at ambient temperature and is then filtered twice. The solvent is evaporated off under reduced pressure, and the residue is dissolved in a minimal amount of THF (approximately 1 ml), a large volume of pentane is added, and the solid is isolated. Purification is repeated twice, and then washing is carried out an additional two times using 5 ml of distilled ether; drying under reduced pressure yields the dendritic polymer in pure form in the form of a white powder. Yield 80%.

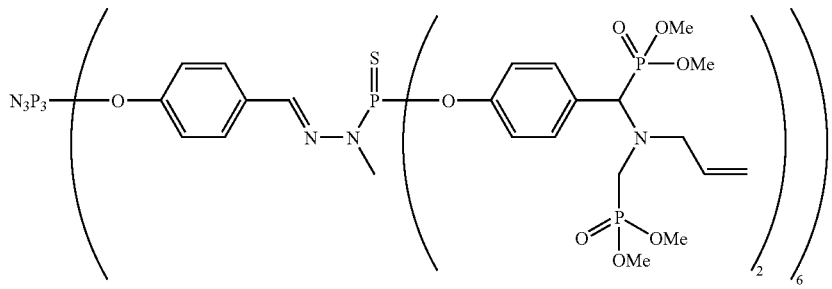

$^{31}P$—$\{^1H\}$ NMR (CDCl$_3$): δ=11.3 (s); 28.9 (s); 31.3 (s); 65.4 (s).

Example 19

First Generation aza-bis-phosphonic Dendritic Polymer Derived from Allylamine

The dendritic polymer having aza-bis-phosphonate terminations derived from allylamine from Example 18 (200 mg, 32 µmol) is dissolved in 5 ml of distilled acetonitrile, and then bromotrimethylsilane (270 µl, 2.04 mmol) is added slowly at 0° C. The solution is then stirred for 18 hours at ambient temperature. The solvent is evaporated off under reduced pressure, and the residue is treated with approximately 10 ml of methanol. After 1 hour's vigorous stirring in methanol, the solid is dried under reduced pressure. The phosphonic acid is washed with 2×15 ml of distilled ether. The solvent is removed and the dendritic polymer having pure phosphonic acid ends is treated slowly with an aqueous 0.1955 M sodium hydroxide solution (4.0 ml). The homogeneous solution is lyophilised, and the dendritic polymer having a N-(allyl) bis-methylphosphonic acid termination (monosodium salt) is isolated in a quantitative yield in the form of a white powder.

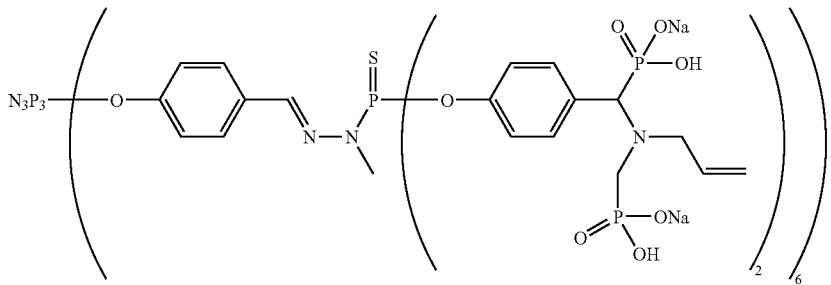

$^{31}$P—{$^{1}$H} NMR (CD$_3$CN/D$_2$O): δ=8.7 (s); 10.9 (sl); 65.1 (sl).

Example 20

Dimethyl N-benzyl-N-(4-hydroxy)-benzyl-α-amino-bis-phosphonate

Benzylamine (4.4 ml, 40 mmol) and MgSO$_4$ (10 g) are added to a solution of 4-hydroxy-benzaldehyde (4.4 g; 36 mmol) in THF (30 ml). After 1 hour's stirring, dimethyl phosphite (4.4 g, 36 mmol) is added and the solution is stirred for 4 days at ambient temperature. The suspension is filtered, diluted with CH$_2$Cl$_2$ (100 ml) and then washed with 25 ml of water. The organic phase is dried over MgSO$_4$, and the solvent is evaporated off under reduced pressure. The residual solid is washed with 3×30 ml of distilled ether and then dried under reduced pressure. Yield 83%, white solid.

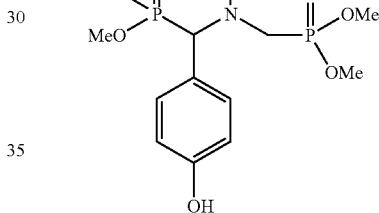

$^{31}$P—{$^{1}$H} NMR (CDCl$_3$): δ=29.8 (s).
$^{1}$H NMR (CDCl$_3$): δ=3.48 (m, 1H); 3.54 (d, $^{3}$J$_{HP}$=10.4 Hz, 3H); 3.75 (m, 1H); 3.76 (d, $^{3}$J$_{HP}$=10.5 Hz, 3H); 3.98 (d, $^{2}$J$_{HP}$=19.9 Hz, 1H); 6.81 (d, $^{3}$J$_{HH}$=7.8 Hz, 2H); 7.25 (m, 7H).

Example 21

Dimethyl N-benzyl-N-(4-hydroxy)-benzyl-α-amino-phosphonate

Aqueous formaldehyde (37% in water, 570 mg, 7.01 mmol) and dimethyl phosphite. (565 mg, 5.20 mmol) are added to a solution of dimethyl N-benzyl-N-(4-hydroxy)-benzyl-α-amino-phosphonate (1.5 g, 4.67 mmol) in 10 ml of THF. The solution is stirred for 18 hours at ambient temperature, and then 300 μl of aqueous formaldehyde are added. After 12 hours, the solution is diluted with 50 ml of CH$_2$Cl$_2$ and washed with 20 ml of water. The organic phase is dried over MgSO$_4$ and concentrated under reduced pressure. The residual oil is washed 3 times with distilled ether (20 ml) and is then dissolved in a minimal amount of THF. A large volume of pentane is added, and the oil, which has become insoluble, is separated from the mixture. After washing with 10 ml of distilled ether and drying under reduced pressure, a yellow foam is obtained in a yield of 80%.

$^{31}$P—{$^{1}$H} NMR (CDCl$_3$): δ=29.1 (s); 31.5 (s).
$^{1}$H NMR (CDCl$_3$): δ=2.70 (dd, $^{2}$J$_{HH}$=15.6, $^{3}$J$_{HH}$=3.3 Hz, 1H); 3.28 (d, $^{3}$J$_{HP}$=13.4 Hz, 1H); 3.44 (d, $^{3}$J$_{HP}$=10.5 Hz, 3H); 3.54 (m, 1H); 3.65 (d, $^{3}$J$_{HP}$=10.7 Hz, 3H); 3.71 (m, 1H); 3.72 (d, $^{3}$J$_{HP}$=10.6 Hz, 3H); 3.85 (d, $^{3}$J$_{HP}$=10.7 Hz, 3H); 4.41 (m, 1H); 6.86 (d, $^{3}$J$_{HH}$=8.3 Hz, 2H); 7.27 (m, 7H).

Example 22

First Generation aza-bis-phosphonate Dendritic Polymer Derived from Benzylamine The phenol aza-bis-phosphonate derived from benzylamine from Example 21 (500 mg, 1.13 mmol) and cesium carbonate (382 mg, 1.17 mmol) are added to a solution of Gc$_1$ (160 mg, 87.5 μmol) in 5 ml of THF. After 72 hours' stirring, the solution is filtered and the solvent is removed under reduced pressure. The residue is purified by washing with ether (2×10 ml) and is then dissolved in a minimal amount of THF and precipitated by addition of a large volume of pentane. The resulting solid is isolated and then precipitated twice under the same conditions. After drying under reduced pressure, the dendritic polymer is obtained in the form of a white powder in a yield of 85%.

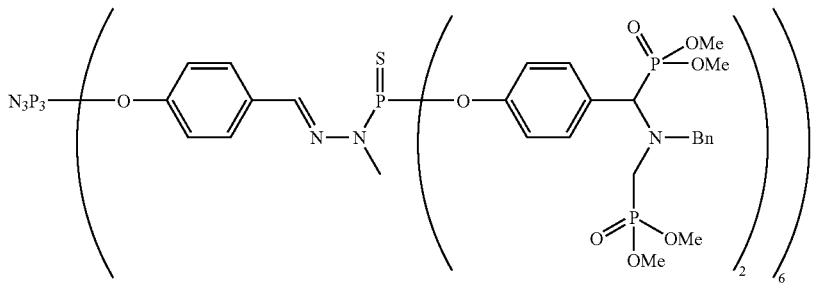

$^{31}P-\{^1H\}$ NMR (CDCl$_3$): δ=12.2 (s); 29.2 (s); 31.3 (s); 65.3 (s).

Example 23

First Generation aza-bis-phosphonic Dendritic Polymer Derived from Benzylamine

The dendritic polymer having aza-bis-phosphonate terminations derived from benzylamine from Example 22 (150 mg, 22.3 μmol) is dissolved in 5 ml of distilled acetonitrile, and then bromotrimethylsilane (185 μl, 1.39 mmol) is added slowly at 0° C. The solution is then stirred for 24 hours at ambient temperature. The solvent is evaporated off under reduced pressure, and the residue is treated with approximately 10 ml of methanol. After 1 hour's vigorous stirring in methanol, the solid is dried under reduced pressure. The phosphonic acid is washed with 2×15 ml of distilled ether. The solvent is removed and the dendritic polymer having pure phosphonic acid ends is treated slowly with an aqueous 0.1955 M sodium hydroxide solution (2.7 ml). The homogeneous solution is lyophilised, and the dendritic polymer having a N-(benzyl) bis-methylphosphonic acid termination (monosodium salt) is isolated in a quantitative yield in the form of a white powder.

(a) n=1

5 g of glycine (66.6 mmol) are introduced into a flask and stirred with 20 ml of THF; 200 mmol of 37% aqueous formaldehyde solution are added at ambient temperature, and stirring is carried out for 30 minutes. 266 mmol of dimethyl phosphite are then added. The mixture is stirred magnetically at ambient temperature for 12 hours, 40 ml of distilled water are added to the reaction mixture, the THF is removed under reduced pressure, and the product is extracted using 3×100 ml of chloroform. The organic phase is dried over magnesium sulfate and then evaporated. The product is then purified by chromatography on a silica column using a CH$_2$Cl$_2$/MeOH mixture (95/5) as eluant. The product is obtained in a yield of 37%.

Rf (CH$_2$Cl$_2$/MeOH: 95/5)=0.32
$^{31}P-\{^1H\}$ NMR (CDCl$_3$): δ=30.0 ppm.
$^1H$ NMR (CDCl$_3$): δ=3.22 (d, $^2J_{HP}$=10.1 Hz, 4H, CH$_2$—P), 3.61 (s, 2H, CH$_2$—CO), 3.68 (d, $^3J_{HP}$=10.6 Hz, 12H, O—CH$_3$), 10.8 (s, 1H, COOH) ppm.

(b) n=3

5 g of 4-aminobutyric acid (48.5 mmol) are introduced into a flask and stirred with 20 ml of THF; 145 mmol of 37% aqueous formaldehyde solution are added at ambient temperature, and stirring is carried out for 30 minutes. 194 mmol

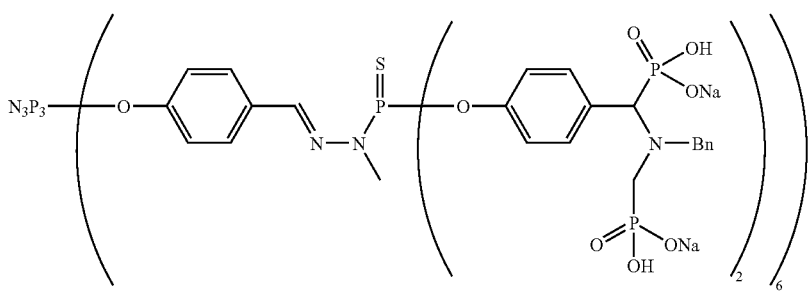

$^{31}P-\{^1H\}$ NMR (CD$_3$CN/D$_2$O): δ=8.9 (s); 10.5 (sl); 65.1 (sl).

Example 24

Synthesis of aza-bis-phosphonate Carboxylic Acids

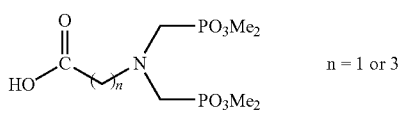

n = 1 or 3 of dimethyl phosphite are then added. The mixture is stirred magnetically at ambient temperature for 12 hours, 40 ml of distilled water are added to the reaction mixture, the THF is removed under reduced pressure, and the product is extracted using 3×100 ml of chloroform. The organic phase is dried over magnesium sulfate and then evaporated. The product is then purified by chromatography on a silica column using a CH$_2$Cl$_2$/MeOH mixture (95/5) as eluant. The product is obtained in a yield of 53%.

Rf (CH$_2$Cl$_2$/MeOH: 95/5)=0.35
$^{31}P-\{^1H\}$ NMR (CDCl$_3$): δ=30.7 ppm.
$^1H$ NMR (CDCl$_3$): δ=1.74 (quint, $^3J_{HH}$=7.1 Hz, 2H, CO—CH$_2$—CH$_2$), 2.36 (t, $^3J_{HH}$=7.1 Hz, 2H, CO—CH$_2$), 2.78 (t, $^3J_{HH}$=7.1 Hz, 2H, CH$_2$—N), 3.10 (d, $^2J_{HP}$=8.8 Hz, 4H, CH$_2$—P), 3.74 (d, $^3J_{HP}$=10.7 Hz, 12H, O—CH$_3$) ppm. The proton COOH was not observed.

Example 25

Synthesis of amido-tyramine aza-bis-phosphonate Compounds

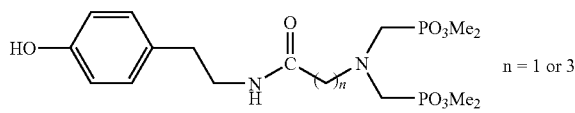

(a) n=1

300 mg of carboxylic acid (0.94 mmol) are introduced into a flask under argon and dissolved in 5 ml of dry DMF. The solution is brought to 0° C., then 1.3 equivalents of 1-hydroxybenzotriazole (HOBt) are added thereto, stirring is maintained for 15 minutes at 0° C., and then 1.3 equivalents of 1,3-dicyclohexylcarbodiimide (DCC) are added. The mixture is stirred for 30 minutes at 0° C. and then for 1 hour at ambient temperature. The formation of a precipitate is observed. The mixture is returned to 0° C., and then tyramine (1.1 equivalents) is added and stirring is carried out for 30 minutes at 0° C. and then for 15 hours at ambient temperature. The precipitate is removed on a 5 μ millipore filter and the solution is lyophilised. The residual oil is purified by chromatography on a silica column. The eluant used is a CH$_2$Cl$_2$/MeOH mixture (90/10), Rf=0.47. The product is obtained in a yield of 42%.

$^{31}$P—{$^1$H} NMR (CDCl$_3$): δ=30.2 ppm.

$^1$H NMR (CDCl$_3$): δ=2.73 (t, $^3J_{HH}$=7.4 Hz, 2H, C$_6$H$_5$—CH$_2$), 3.13 (d, $^2J_{HP}$=9.0 Hz, 4H, CH$_2$—P), 3.33-3.52 (m, 4H, CH$_2$—N, CH$_2$—NH), 3.74 (d, $^3J_{HP}$=10.7 Hz, 12H, O—CH$_3$), 6.75 (d, $^3J_{HH}$=8.4 Hz, 2H, H$_{Ar}$), 7.00 (d, $^3J_{HH}$=8.4 Hz, 2H, H$_{Ar}$), 7.46 (t, $^3J_{HH}$=5.8 Hz, 1H, NH) ppm.

(b) n=3

300 mg of carboxylic acid (0.86 mmol) are introduced into a flask under argon and dissolved in 5 ml of dry DMF. The solution is brought to 0° C., then 1.3 equivalents of 1-hydroxybenzotriazole (HOBt) are added thereto, stirring is maintained for 15 minutes at 0° C.; and then 1.3 equivalents of 1,3-dicyclohexylcarbodiimide (DCC) are added. The mixture is stirred for 30 minutes at 0° C. and then for 1 hour at ambient temperature. The formation of a precipitate is observed. The mixture is returned to 0° C., and then tyramine (1.1 equivalents) is added and stirring is carried out for 30 minutes at 0° C. and then for 15 hours at ambient temperature. The precipitate is removed on a 5 μ millipore filter and the solution is lyophilised. The residual oil is purified by chromatography on a silica column. The eluant used is a CH$_2$Cl$_2$/MeOH mixture (95/5), Rf=0.52. The product is obtained in a yield of 51%.

$^{31}$P—{$^1$H} NMR (CDCl$_3$): δ=30.6 ppm.

Example 26

Synthesis of DAB Models having aza-bis-phosphonate Ends

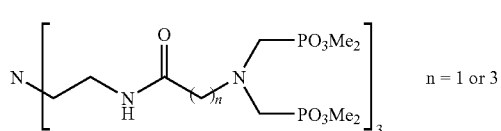

The syntheses are carried out according to the protocol described in the preceding Example for the coupling of azabisphosphonate carboxylic acids to tyramine in the presence of HOBt and DCC. The amounts used are as follows: 0.4 mmol of tris(2-aminoethyl)amine, 1.57 mmol of aza-bis-phosphonate carboxylic acid (where n=1 or 3), 2.22 mmol of HOBt and 2.22 mmol of DCC. The products are purified by dissolution in a minimal volume of CH$_2$Cl$_2$ and precipitation from a large volume of diethyl ether. The precipitations are repeated three times in order to remove traces of HOBt.

(a) n=1

The product is obtained in a yield of 55%.

$^{31}$P—{$^1$H} NMR (CDCl$_3$): δ=30.3 ppm.

(b) n=3

$^{31}$P—{$^1$H} NMR (CDCl$_3$): δ=30.5 ppm.

Example 27

Synthesis of DAB Models having aza-bis-phosphonic acid Ends

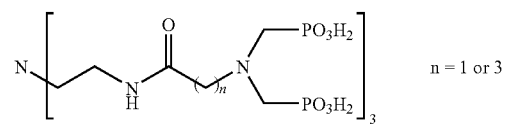

0.25 mmol of model DAB aza-bis-phosphonate compound from Example 26 is dissolved in 3 ml of acetonitrile and brought to 0° C., and then 3.75 mmol of BrTMS are added dropwise under an inert atmosphere. After 30 minutes' stirring at 0° C., the ice bath is removed and stirring is continued for 15 hours at ambient temperature. The solvent is removed under reduced pressure, and 3 ml of MeOH are added to the dry residue. Stirring is carried out for 30 minutes, and then the solvent is removed in vacuo and 3 ml of distilled water are added. After 1 hour's stirring, the mixture is lyophilised. The dry residue is washed 3 times with dry ether. The products are obtained in the form of a beige powder.

(a) n=1

$^{31}$P—{$^1$H} NMR (D$_2$O, THFd8) δ=11.2 ppm.

(b) n=3:

$^{31}$P—{$^1$H} NMR (D$_2$O, THFd8) δ=11.0 ppm.

Example 28

Synthesis of the Monosodium Salts of the DAB Models having aza-bis-phosphonic acid Ends

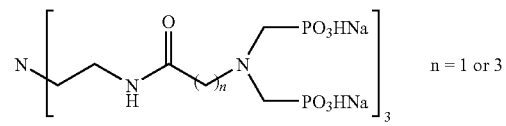

1 equivalent of NaOH (0.1955 N in aqueous solution) per PO$_3$H$_2$ group is added directly to the aza-bis-phosphonic acid compounds from Example 27. After lyophilisation, the products are obtained quantitatively.

(a) n=1

$^{31}$P—{$^1$H} NMR (D$_2$O, THFd8) δ=17.8 ppm.

(b) n=3

$^{31}$P—{$^1$H} NMR (D$_2$O, THFd8) δ=17.5 ppm.

Example 29

Synthesis of DAB-type Dendritic Polymers of Generation 1 and Generation 2 having 4 and 8 aza-bis-phosphonate Groups, Respectively, at the Surface

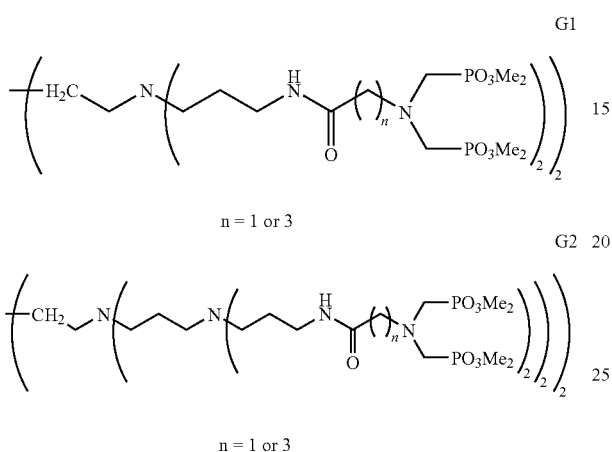

4 ml of dry DMF are added, under an inert atmosphere, to 2 mmol of aza-bis-phosphonate carboxylic acid from Example 28. The solution is brought to 0° C., and then 3 mmol of HOBt are added and stirring is carried out at 0° C. for 30 minutes; 3 mmol of DCC are added. After 30 minutes at 0° C., the mixture is allowed to return to ambient temperature, and stirring is continued for a further 1 hour; the gradual formation of a precipitate is observed. The suspension is again brought to 0° C., and then 0.33 mmol of dendritic polymer in the case of G1 or 0.17 mmol of dendritic polymer in the case of G2 is added. After 30 minutes at 0° C., stirring is continued at ambient temperature for 20 hours. The precipitate is removed on 5 μ millipore filters, and then the DMF is lyophilised. The product is treated three times by dissolution in a minimal volume of dichloromethane and precipitation from a large volume of diethyl ether in order to remove excess reagents.

In the case of the DAB-type dendritic polymers of generation 1:

For n=1: the yield is 73%

$^{31}P$—$\{^{1}H\}$ NMR (CDCl$_3$) δ=30.2 ppm.

For n=3: the yield is 69%

$^{31}P$—$\{^{1}H\}$ NMR (CDCl$_3$) δ=30.4 ppm.

In the case of the DAB-type dendritic polymers of generation 2:

For n=1: the yield is 64%

$^{31}P$—$\{^{1}H\}$ NMR (CDCl$_3$) δ=30.3 ppm.

For n=3: the yield is 75%

$^{31}P$—$\{^{1}H\}$ NMR (CDCl$_3$) δ=30.5 ppm.

Example 30

Synthesis of DAB-type Dendritic Polymers of Generation 1 and Generation 2 having 4 and 8 aza-bis-phosphonic acid Groups, Respectively, at the Surface

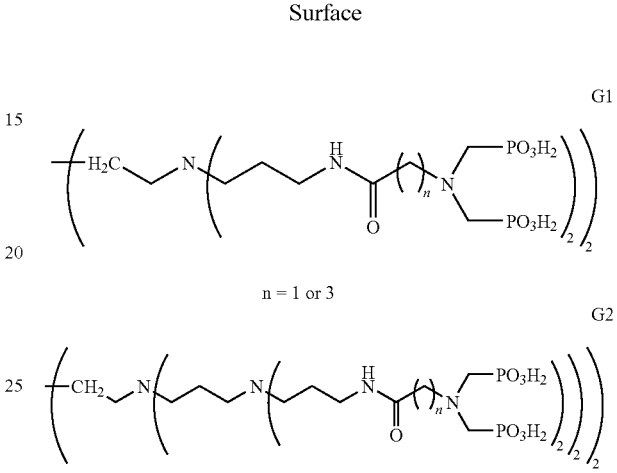

4 ml of freshly distilled acetonitrile are added to 0.2 mmol of DAB-type dendritic polymer of generation 1 or 2 having aza-bis-phosphonate ends from the preceding Example, and the mixture is cooled to 0° C. There are then added dropwise 6.4 mmol (that is to say 32 equivalents) of BrTMS in the case of the dendritic polymer of generation 1 and 12.8 mmol (that is to say 64 equivalents) in the case of the dendritic polymer of generation 2. The mixture is maintained at 0° C. for 30 minutes and is then stirred at ambient temperature for a further 15 hours. The acetonitrile is removed under reduced pressure, and then the mixture is methanolysed and hydrolysed as in the preceding cases. The dry residue is then washed twice with a THF/diethyl ether mixture (1/9). The powder is then dried in vacuo to yield the pure product.

In the case of the DAB-type dendritic polymers of generation 1

For n=1: the yield is 79%

$^{31}P$—$\{^{1}H\}$ NMR (D$_2$O, THFd8) δ=11.5 ppm.

For n=3: the yield is 68%

$^{31}P$—$\{^{1}H)\}$ NMR (D$_2$O, CD$_3$COCD$_3$) δ=11.0 ppm.

In the case of the DAB-type dendritic polymers of generation 2

For n=1: the yield is 68%

$^{31}P$—$\{^{1}H\}$ NMR (D$_2$O, CD$_3$COCD$_3$) δ=10.6 ppm.

For n=3: the yield is 74%

$^{31}P$—$\{^{1}H\}$ NMR (D$_2$O, CD$_3$COCD$_3$) δ=10.9 ppm.

Example 31

Synthesis of the Corresponding Monosodium Salts

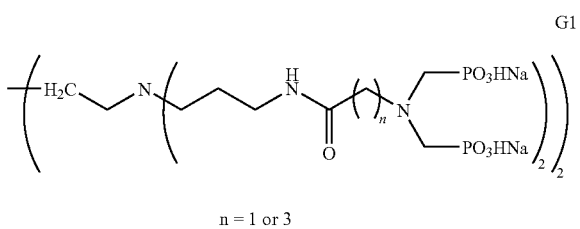

G1 n = 1 or 3

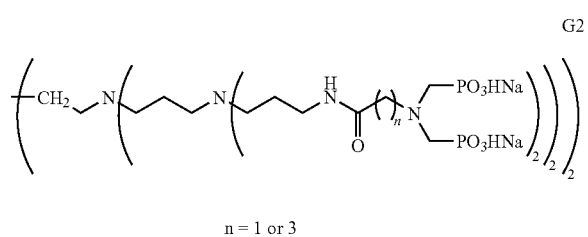

G2 n = 1 or 3

The procedure is the same as that described in the preceding example, that is to say the addition of 1 equivalent of NaOH (0.1955 N in aqueous solution) per surface $PO_3H_2$ function. In the case of the dendritic polymers of generation 1, 8 equivalents of NaOH are added and in the case of the dendritic polymers of generation 2, 16 equivalents of NaOH are added. After lyophilisation, the products are obtained quantitatively.

In the case of the DAB-type dendritic polymers of generation 1

For n=1:
$^{31}P-\{^1H\}$ NMR ($D_2O$, THFd8) δ=20.0 ppm.

For n=3:
$^{31}P-\{^1H\}$ NMR ($D_2O$, $CD_3COCD_3$) δ=10.2 ppm.

In the case of the DAB-type denddtic polymers of generation 2

For n=1:
$^{31}P-\{^1H\}$ NMR ($D_2O$, $CD_3COCD_3$) δ=10.3 ppm.

For n=3:
$^{31}P-\{^1H\}$ NMR ($D_2O$, $CD_3COCD_3$) δ=10.2 ppm.

Example 32

Synthesis of PAMAM-type Dendritic Polymers of Generation 0 and Generation 1 having 4 and 8 aza-bis-phosphonate Groups, Respectively, at the Surface

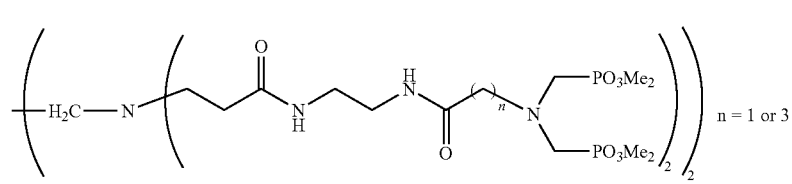

G0 n = 1 or 3

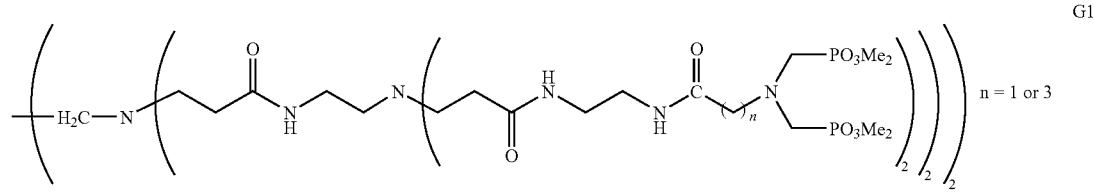

G1 n = 1 or 3

4 ml of dry DMF are added, under an inert atmosphere, to 2 mmol of aza-bis-phosphonate carboxylic acid from Example 28. The solution is brought to 0° C., and then 3 mmol of HOBt are added and stirring is carried out at 0° C. for 30 minutes; 3 mmol of DCC are added. After 30 minutes at 0° C., the mixture is allowed to return to ambient temperature, and stirring is continued for a further 1 hour; the gradual formation of a precipitate is observed. The suspension is again brought to 0° C., and then 0.33 mmol of dendritic polymer in the case of G0 or 0.17 mmol of dendritic polymer in the case of G1 is added. After 30 minutes at 0° C., stirring is continued at ambient temperature for 20 hours. The precipitate is removed on 5 µ millipore filters, and then the DMF is lyophilised. The product is treated three times by dissolution in a minimal volume of dichloromethane and precipitation from a large volume of diethyl ether in order to remove excess reagents.

In the case of the PAMAM-type dendritic polymers of generation 0

For n=1: the yield is 67%
$^{31}P-\{^{1}H\}$ NMR (CDCl$_3$) δ=30.1 ppm.

For n=3: the yield is 75%
$^{31}P-\{^{1}H\}$ NMR (CDCl$_3$) δ=30.4 ppm.

In the case of the PAMAM-type dendritic polymers of generation 1

For n=1: the yield is 63%
$^{31}P-\{^{1}H\}$ NMR (CDCl$_3$) δ=30.2 ppm.

For n=3: the yield is 78%
$^{31}P-\{^{1}H\}$ NMR (CDCl$_3$) δ=30.4 ppm.

Example 33

Synthesis of PAMAM-type Dendritic Polymers of Generation 0 and Generation 1 having 4 and 8 aza-bis-phosphonic acid Groups, Respectively, at the Surface in the case of the dendritic polymer of generation 0 and 12.8 mmol (that is to say 64 equivalents) in the case of the dendritic polymer of generation 1. The mixture is maintained at 0° C. for 30 minutes and is then stirred at ambient temperature for a further 15 hours. The acetonitrile is removed under reduced pressure, and then the mixture is methanolysed and hydrolysed as in the preceding cases. The dry residue is then washed twice with a THF/diethyl ether mixture (1/9). The powder is then dried in vacuo to yield the pure product.

In the case of the PAMAM-type dendritic polymers of generation 0

For n=1: the yield is 65%
$^{31}P-\{^{1}H\}$ NMR (D$_2$O, THFd8) δ=10.9 ppm.

For n=3: the yield is 71%
$^{31}P-\{^{1}H\}$ NMR (D$_2$O, CD$_3$COCD$_3$) δ=11.1 ppm.

In the case of the PAMAM-type dendritic polymers of generation 1

For n=1: the yield is 73%
$^{31}P-\{^{1}H\}$ NMR (D$_2$O, CD$_3$COCD$_3$) δ=11.0 ppm.

For n=3: the yield is 67%
$^{31}P-\{^{1}H\}$ NMR (D$_2$O, CD$_3$COCD$_3$) δ=11.3 ppm.

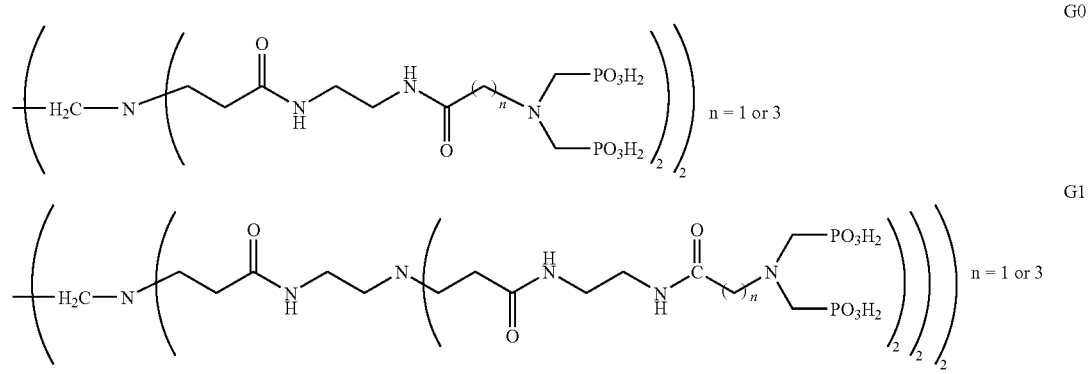

4 ml of freshly distilled acetonitrile are added to 0.2 mmol of PAMAM-type dendritic polymer of generation 0 or 1 having aza-bis-phosphonate ends from the preceding Example, and the mixture is cooled to 0° C. There are then added dropwise 6.4 mmol (that is to say 32 equivalents) of BrTMS Example 34

Synthesis of the Monosodium Salts Corresponding to the Compounds of Example 35

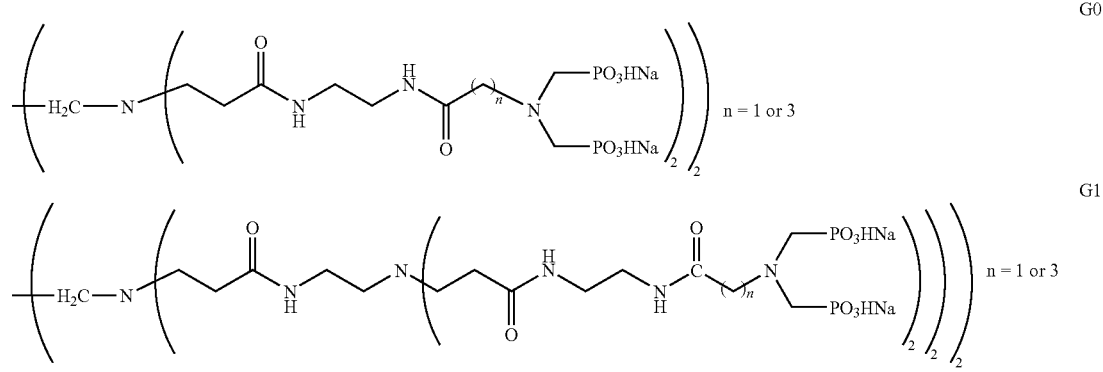

The procedure is the same as that described above, that is to say the addition of 1 equivalent of NaOH (0.1955 N in aqueous solution) per surface $PO_3H_2$ function. In the case of the dendritic polymers of generation 0 where n=1 or 3, 8 equivalents of NaOH are added and in the case of the dendritic polymers of generation 1 where n=1 or 3, 16 equivalents of NaOH are added. After lyophilisation, the products are obtained quantitatively.

In the case of the PAMAM-type dendritic polymers of generation 0

For n=1:
$^{31}P$—$\{^1H\}$ NMR ($D_2O$, THFd8) δ=19.7 ppm.

For n=3:
$^{31}P$—$\{^1H\}$ NMR ($D_2O$, $CD_3COCD_3$) δ=10.2 ppm.

In the case of the PAMAM-type dendritic polymers of generation 1

For n=1:
$^{31}P$—$\{^1H\}$ NMR ($D_2O$, $CD_3COCD_3$) δ=10.5 ppm.

For n=3:
$^{31}P$—$\{^1H\}$ NMR ($D_2O$, $CD_3COCD_3$) δ=10.4 ppm.

Example 35

Synthesis of Phosphorus-containing Gc-type Dendritic Polymers having 12 amido-aza-bis-phosphonate Ends at the Surface

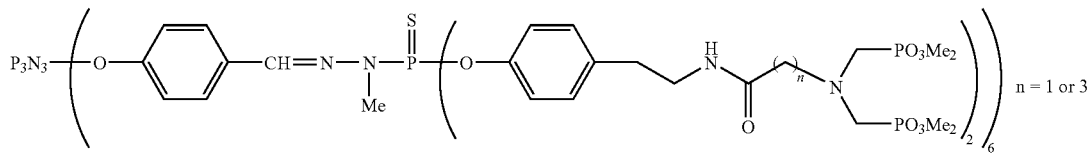

0.017 mmol of $Gc_1$ dendritic polymer of generation 1 having 12 P(S)—Cl bonds at the surface is dissolved in 3 ml of dry THF. To that solution there are added in succession 5.04 mmol of cesium carbonate and then 0.23 mmol of tyramine amido-aza-bis-phosphonate compound where n=1 or 3 from Example 25 in solution in 3 ml of dry THF. The mixture is stirred overnight at ambient temperature and then filtered over Celite. The reaction mixture is evaporated under reduced pressure and then the dry residue is dissolved in a minimal volume of dichloromethane. The product is then precipitated from a large volume of ether. That operation is repeated three times in order to remove the slight excess of starting phenol. The products are obtained in the form of powders in a yield of 88% for n=1 and 85% for n=3.

For n=1:
$^{31}P$—$\{^1H\}$ NMR ($CDCl_3$) δ=11.7 (s, $N_3P_3$), 30.1 (s, $PO_3Me_2$), 66.6 (s, P=S) ppm.

For n=3:
$^{31}P$—$\{^1H\}$ NMR ($CDCl_3$) δ=11.7 (s, $N_3P_3$), 30.3 (s, $PO_3Me_2$), 66.6 (s, P=S) ppm.

Example 36

Synthesis of Phosphorus-containing Gc-type Dendritic Polymers having 12 amido-aza-bis-phosphonic acid Ends at the Surface

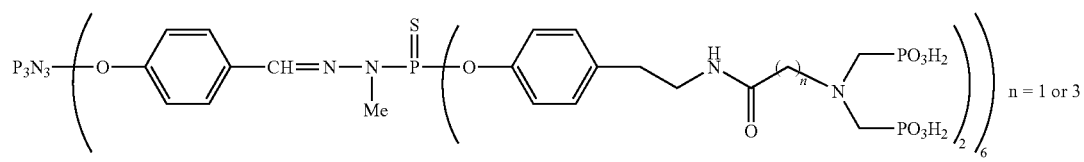

0.015 mmol of the above-described dendritic polymers having an amido-aza-bis-phosphonate end (where n=1 or 3) is dissolved, under an inert atmosphere, in 3 ml of distilled acetonitrile. The solution is brought to 0° C., and then 48 equivalents of BrTMS (0.73 mmol) are added dropwise under argon. The mixture is stirred for 30 minutes at 0° C. and then overnight at ambient temperature. After methanolysis and hydrolysis as described in the conventional protocol (i.e. DAB and PAMAM), the dry residue is washed with dry ether to give the pure product in a yield of 63% for n=1 and 58% for n=3.

For n=1:
$^{31}P-\{^1H\}$ NMR (D$_2$O, THFd8) δ=11:9 (s, PO$_3$H$_2$), 12.8 (s, N$_3$P$_3$), 66.5 (s, P=S) ppm.

For n=3:
$^{31}P-\{^1H\}$ NMR (D$_2$O, THFd8) δ=12.1 (s, PO$_3$H$_2$), 12.8 (s, N$_3$P$_3$), 66.5 (s, P=S) ppm.

Example 37

Synthesis of the Corresponding Monosodium Salts

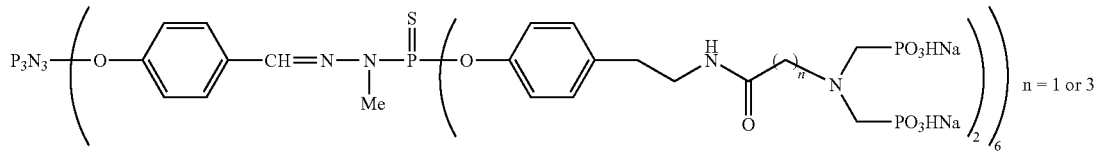

0.010 mmol of dendritic polymers having aza-bis-phosphonic ends from the preceding Example is dissolved in 0.24 mmol of 0.1955 N aqueous NaOH solution. The mixture is stirred for 30 minutes at ambient temperature and is then lyophilised. The products are obtained quantitatively.

For n=1:
$^{31}P-\{^1H\}$ NMR (D$_2$O, THFd8) δ=12.8 (s, N$_3$P$_3$), 16.5 (s, PO$_3$HNa), 66.8 (s, P=S) ppm.

For n=3:
$^{31}P-\{^1H\}$ NMR (D$_2$O, THFd8) δ=12.8 (s, N$_3$P$_3$), 16.2 (s, PO$_3$HNa), 66.8 (s, P=S) ppm.

Example 38

Lubricating Properties

The compound of Example 12 was tested in a Falex lubrication test (rupture test) with steel/steel contact. This test demonstrated that the functionalised biphosphonate dendritic polymers of the invention can be used as an extreme pressure lubrication additive. Such additives, diluted at 1%, allow a level of lubrication to be obtained that is equal or superior to that of an alkyl phosphate ester, which is often used as a lubrication additive.

The invention claimed is:
1. A dendritic polymer of generation n comprising:
a central core § of valence m;
generation chains branching around the core;
an intermediate chain at the end of each generation chain that is present, or at the end of each bond around the core, where appropriate; and
a terminal group at the end of each intermediate chain, wherein said terminal group is represented by the formula:

$$-(A1){<}[A2\text{-}P(\!\!=\!\!O)(OX)_2]_2 \qquad (T)$$

wherein
-A1< represents the radical —CR< or -Heteroatom<;
the radicals A2, which are identical or different, each independently of the other represents a single bond or a linear or branched hydrocarbon chain having from 1 to 6 chain members, each of said chain members optionally being selected from a heteroatom, each chain member being optionally substituted by one or more substituents selected from -Alkyl, -Hal, —NO$_2$, —NRR', —CN, —CF$_3$, —OH, -OAlkyl, -Aryl, and -Aralkyl;
R and R', which are identical or different, each independently of the other represents a hydrogen atom or an -Alkyl, -Aryl, or -Aralkyl radical;
X represents an -Alkyl or -Aryl radical, —H or /M$^+$, where M is a cation,
m represents an integer greater than or equal to 1
n represents an integer from 0 to 12; and
< represents two bonds situated on A1,
wherein the intermediate chains are represented by formula:

$$-J\text{-}K\text{-}L- \qquad (C2)$$

wherein
J represents an oxygen atom, a sulfur atom or a radical —NR—;
K represents an -Aryl-, —C(=O), -Heteroaryl-, or -Alkyl- radical, each of which is optionally substituted by a Halogen atom or a —NO$_2$, —NRR', —CN, —CF$_3$, —OH, -Alkyl, -Aryl, or -Aralkyl radical;
L represents a linear or branched hydrocarbon chain having from 1 to 6 chain members and optionally having one or more double or triple bonds, each of said chain members optionally being a heteroatom, each chain member being optionally substituted by one or more substituents selected from -Alkyl, -Hal, —NO$_2$, —NRR', —CN, —CF$_3$, —OH, —OAlkyl, -Aryl, and -Aralkyl,
wherein R and R', which are identical or different, each independently of the other represents a hydrogen atom or an -Alkyl, -Aryl, or -Aralkyl radical,
wherein the generation chains are represented by the formula:

$$-A'\text{-}(C\!\!=\!\!O)\text{—}N(R)\text{—}B'\text{—}N< \qquad (C1')$$

wherein
A' and B' each independently of the other represents an -Alkyl, -Alkenyl, or -Alkynyl radical, each of which is optionally substituted by one or more substituents selected from -Alkyl, -Hal, —NO$_2$, —NRR', —CN, —CF$_3$, —OH, —OAlkyl, -Aryl, and -Aralkyl; and
R and R', which are identical or different, each independently of the other represents a hydrogen atom or an -Alkyl, -Aryl, or -Aralkyl radical.

2. A dendritic polymer according to claim 1, wherein A' and B' each independently of the other represents a radical -Alkyl-.

3. A dendritic polymer of generation n comprising:

a central core § of valence m;

generation chains branching around the core;

an intermediate chain at the end of each generation chain that is present, or at the end of each bond around the core, where appropriate; and a terminal group at the end of each intermediate chain, wherein said terminal group is represented by the formula:

-(A1)<[A2-P(=O)(OX)₂]₂    (T)

wherein

-A1< represents the radical —CR< or -Heteroatom<;

the radicals A2, which are identical or different, each independently of the other represents a single bond or a linear or branched hydrocarbon chain having from 1 to 6 chain members, each of said chain members optionally being selected from a heteroatom, each chain member being optionally substituted by one or more substituents selected from -Alkyl, -Hal, —NO₂, —NRR', —CN, —CF₃, —OH, —OAlkyl, -Aryl, and -Aralkyl;

R and R', which are identical or different, each independently of the other represents a hydrogen atom or an -Alkyl, -Aryl, or -Aralkyl radical;

X represents an -Alkyl or -Aryl radical, —H or /M⁺, where M is a cation, m represents an integer greater than or equal to 1, n represents an integer from 0 to 12; and < represents two bonds situated on A1, wherein the intermediate chains are represented by formula:

-J-K-L-    (C2)

wherein

J represents an oxygen atom, a sulfur atom or a radical —NR—;

K represents an -Aryl-, —C(=O), -Heteroaryl-, or -Alkyl- radical, each of which is optionally substituted by a Halogen atom or a —NO₂, —NRR', —CN, —CF₃, —OH, -Alkyl, -Aryl, or -Aralkyl radical;

L represents a linear or branched hydrocarbon chain having from 1 to 6 chain members and optionally having one or more double or triple bonds, each of said chain members optionally being a heteroatom, each chain member being optionally substituted by one or more substituents selected from -Alkyl, -Hal, —NO₂, —NRR', —CN, —CF₃, —OH, —OAlkyl, -Aryl, and -Aralkyl, wherein R and R', which are identical or different, each independently of the other represents a hydrogen atom or an -Alkyl, -Aryl, or -Aralkyl radical, wherein the generation chains are represented by the formula:

-A"-N<    (C1")

wherein

A" represents an -Alkyl, -Alkenyl, or -Alkynyl radical, each of which is optionally substituted by one or more substituents selected from -Alkyl, -Hal, —NO₂, —NRR', —CN, —CF₃, —OH, —OAlkyl, -Aryl, and -Aralkyl, wherein R and R', which are identical or different, each independently of the other represents a hydrogen atom or an -Alkyl, -Aryl, or -Aralkyl radical.

4. A dendritic polymer according to claim 3, wherein A" represents an optionally substituted radical -Alkyl-.

5. A dendritic polymer of generation n comprising:

a central core § of valence m;

optionally, generation chains branching around the core;

an intermediate chain at the end of each generation chain that is present, or at the end of each bond around the core, where appropriate; and a terminal group at the end of each intermediate chain, wherein said dendritic polymer which is represented by the following formula (I-1i):

§-{{A-B-C(D)=N—N(E)-(P(=G))<}ⁿ[J-K-(Alk)ₐ-N< [A2-P(=O)(OX)₂]₂}₂}ₘ    (I-1i)

in which:

§ represents a central core;

{A-B-C(D)=N—N(E)-(P(=G))<}ⁿ represents generation chains;

J-K-(Alk)ₐ- represents an intermediate chain;

A represents an oxygen, sulfur or phosphorus atom or a radical —NR—;

B represents an -Aryl-, -Heteroaryl-, or -Alkyl- radical, each of which is optionally substituted by a Halogen atom or a —NO₂, —NRR', —CN, —CF₃, —OH, -Alkyl, -Aryl, or -Aralkyl radical;

C represents a carbon atom,

D and E, which are identical or different, each independently of the other represents a hydrogen atom, or an -Alkyl, —OAlkyl, -Aryl, or -Aralkyl radical, each of which is optionally substituted by a Halogen atom or a —NO₂, —NRR', —CN, —CF₃, —OH, -Alkyl, -Aryl, or -Aralkyl radical;

G represents a sulfur, oxygen, nitrogen, selenium or tellurium atom or a radical =NR;

N represents a nitrogen atom;

P represents a phosphorus atom;

R and R', which are identical or different, each independently of the other represents a hydrogen atom or an -Alkyl, -Aryl, or -Aralkyl radical;

J represents an oxygen atom, a sulfur atom or a radical —NR—;

K represents an -Aryl-, -Heteroaryl-, or -Alkyl- radical, each of which is optionally substituted by a Halogen atom or a —NO2, —NRR', —CN, —CF3, —OH, -Alkyl, -Aryl, or -Aralkyl radical;

X represents an -alkyl or -Aryl radical, —H or /M⁺, where M is a cation, the radicals A2, which are identical or different, each independently of the other represents a single bond or a linear or branched hydrocarbon chain having from 1 to 6 chain members, each of said chain members optionally being selected from a heteroatom, each chain member being optionally substituted by one or more substituents selected from -Alkyl, -Hal, —NO₂, —NRR', —CN, —CF₃, —OH, —OAlkyl, -Aryl, and -Aralkyl;

m represents an integer greater than or equal to 1;

n represents an integer from 0 to 12;

0ⁿdenotes the branched structure of the generation n chains of said dendritic polymer, and a represents 0 or 1.

6. A dendritic polymer according to claim 5, wherein A2 represents -Me-.

7. A dendritic polymer according to claim 5, wherein the central core § is selected from the group consisting of:

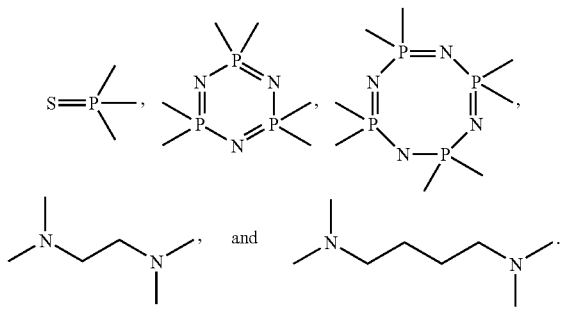

8. A dendritic polymer according to claim 5, wherein the central core § has the formula:

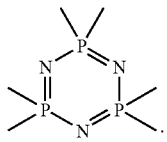

9. A dendritic polymer according to claim 5, wherein m represents an integer from 1 to 8.

10. A dendritic polymer according to claim 5, wherein m is selected from 3, 4 and 6.

11. A dendritic polymer according to claim 5, wherein n is from 0 to 3.

12. A dendritic polymer according to claim 5, wherein in formula (I-1i), A represents an oxygen atom.

13. A dendritic polymer according to claim 5, wherein B represents an optionally substituted phenyl radical.

14. A dendritic polymers according to claim 5, wherein D represents a hydrogen atom.

15. A dendritic polymer according to claim 5, wherein E represents an -Alkyl radical.

16. A dendritic polymer according to claim 5, wherein G represents a sulfur atom.

17. A dendritic polymer according to claim 5, wherein $M^+$ represents a cation of an element of group IA, IIA, IIB or IIIA of the periodic table or a cation of a nitrogen-containing base.

18. A dendritic polymer according to claim 5, wherein M is selected from the atoms sodium and potassium.

19. A method for preparing a dendritic polymer according to claim 5, comprising:
(i) reacting the corresponding dendritic polymer having a terminal function —CHO, —CH=NR, —NH$_2$ or —P(=G)Cl$_2$
with a corresponding compound having one or two functionalities —PO$_3$X$_2$;
(ii) optionally followed, when X represents H or M, by a step which comprises converting the dendritic polymer obtained in (i) having a —PO$_3$Me$_2$ termination into the corresponding dendritic polymer having an -A1<[A2-P(=O)(OH)$_2$]$_2$ termination,
(iii) optionally followed, when X represents M, by a step which comprises converting the dendritic polymer obtained in (ii) having an -A1<[A2-P(=O)(OH)$_2$]$_2$ termination into the salt of the corresponding dendritic polymer having an -A1<[A2-P(=O)(OM)$_2$]$_2$ termination.

20. A method for preparing a dendritic polymer according to claim 19, wherein, when the dendritic polymer according to the invention is represented by the formula (I-1i)

§-{{A-B-C(D)=N—N(E)-(P(=G))<}$^n$[J-K-(Alk)$_a$-N< [A2-P(=O)(OX)$_2$]$_2$]$_2$}$_m$ (I-1 i)

in which §, A, B, C, D, E, G, N, P, J, K, A2, Alk, X, a, m, n, and <have the meanings defined above,
step (i) comprises reacting with the corresponding dendritic polymer of the same generation n of the formula §-{{A-B-C(D)=N—N(E)-(P(=G))<Y$_2$}$^n$ (II-1i)

wherein Y represents —Cl;
a compound of formula

H-J-K-(Alk)$_a$-N<[A2-P(=O)(OX)$_2$]$_2$ (III).

21. A method according to claim 20, wherein the reaction is carried out in solution in a polar aprotic solvent, in the presence of an organic or inorganic base, at a temperature of from −80° C. to 100° C.

22. A method according to claim 19, wherein, when the dendritic polymer according to the invention is represented by formula (I-1ii)

§-{{A-B-C(D)=N—N(E)-(P(=G))<}$^n$[J-K-C(D)=N— N(E)-(Alk)$_a$-CH<[A2-P(=O)(OX)$_2$]$_2$]$_2$}$_m$ (I-1ii)

in which:
§, A, B, C, D, E, G, N, P, J, K, L, X, A2, m, n, and a have the meanings defined above,
step (i) comprises reacting with the corresponding dendritic polymer of formula §-{{A-B-C(D)=N—N(E)-(P(=G))<}$^n$-[J-K-L']$_2$}$_m$ (II-1 ii)

wherein L' represents a radical —CHO ;
a compound of formula (Alk')$_a$—CH—[A2-P(=O)(OX)$_2$] (VI)

wherein Alk' corresponding to Alk defined above in formula (I-1ii) represents a radical Alkenyl, and X has the meaning defined above, in the presence of a compound of formula

H$_3$C—NH—NH$_2$ (VII).

23. A method according to claim 22, wherein the reaction is carried out in a polar aprotic solvent medium, by addition of the compounds (VI) and (VII) to the dendritic polymer (II-1ii) at a temperature of from −80° C. to 100° C.

24. A method for preparing a dendritic polymer according to claim 19, wherein step (ii) is carried out:
by the action of a trimethylsilane halide,
followed by the action of anhydrous MeOH, which is added to the reaction mixture.

25. A method according to claim 24, wherein the procedure is carried out in a polar aprotic organic solvent by addition of the trimethylsilane halide while keeping the reaction mixture at a temperature of from −80° C. to 50° C.

26. A method for preparing a dendritic polymer according to claim 19, wherein in step (iii) a salt of a compound according to the invention is obtained starting from a compound according to the invention having a terminal group in which X represents a hydrogen atom.

27. A method for preparing a dendritic polymer according to claim 26, wherein the procedure is carried out in solution, in a suitable polar protic or aprotic solvent, in the presence of an organic or inorganic base, depending on the salt that is desired.

28. A method for treating or being in contact with surfaces comprising using a dendritic polymer according to claim 5.

29. A method according to claim 28, wherein said surfaces are metal, silica-based or oxide-based.

30. A method according to claim 28, wherein said dendritic polymer is used as an additive in a composition that is to be in contact with or to treat said surface.

31. A method according to claim 28, wherein said dendritic polymer is used as an anti-corrosive agent, a lubricating agent, a scale preventer or as a flame retardant.

32. A dendritic polymer of generation n comprising:
a central core § of valence m;
optionally, generation chains branching around the core;
an intermediate chain at the end of each generation chain that is present, or at the end of each bond around the core, where appropriate; and
a terminal group at the end of each intermediate chain,
wherein said dendritic polymer is represented by the following formula (I-1ii):

$$\S-\{\{A-B-C(D)=N—N(E)-(P(=G))<\}^n[J-K-C(D)=N—N(E)-(Alk)_a-CH<[A2-P(=O)(OX)_2]_2]_2\}_m \quad (I-1\ ii)$$

in which:
§ represents a central core;
{A-B-C(D)=N—N(E)-(P(=G))<}$^n$ represents generation chains;
J-K-C(D)=N—N(E)-(Alk)$_a$- represents and intermediate chain;
A represents an oxygen, sulfur or phosphorus atom or a radical —NR—;
B represents an -Aryl-, -Heteroaryl-, or -Alkyl- radical, each of which is optionally substituted by a Halogen atom or a —NO$_2$, —NRR', —CN, —CF$_3$, —OH, -Alkyl, -Aryl, or -Aralkyl radical;
C represents a carbon atom,
D and E, which are identical or different, each independently of the other represents a hydrogen atom, or an -Alkyl, —OAlkyl, -Aryl, or -Aralkyl radical, each of which is optionally substituted by a Halogen atom or a —NO$_2$, —NRR', —CN, —CF$_3$, —OH, -Alkyl, -Aryl, or -Aralkyl radical;
G represents a sulfur, oxygen, nitrogen, selenium or tellurium atom or a radical =NR;
N represents a nitrogen atom;
P represents a phosphorus atom;
J represents an oxygen atom, a sulfur atom or a radical —NR—;
K represents an -Aryl-, -Heteroaryl-, or -Alkyl- radical, each of which is optionally substituted by a Halogen atom or by a —NO$_2$, —NRR', —CN, —CF$_3$, —OH, -Alkyl, -Aryl, or -Aralkyl radical;
X represents an Alkyl or-Aryl radical, —H or /M$^+$, where M is a cation,
the radicals A2, which are identical or different, each independently of the other represents a single bond or a linear or branched hydrocarbon chain having from 1 to 6 chain members, each of said chain members optionally being selected from a heteroatom, each chain member being optionally substituted by one or more substituents selected from -Alkyl, -Hal, —NO$_2$, —NRR', —CN, —CF$_3$, —OH, —OAlkyl, -Aryl, and -Aralkyl;
m represents an integer greater than or equal to 1;
n represents an integer from 0 to 12;
0$^n$denotes the branched structure of the generation n chains of said dendritic polymer, and
a represents 0 or 1.

33. A dendritic polymer according to claim 32, wherein A2 represents -Me-.

34. A dendritic polymer according to claim 32, wherein the central core § is selected from the group consisting of:

35. A dendritic polymer according to claim 32, wherein the central core § has the formula:

36. A dendritic polymer according to claim 32, wherein m represents an integer from 1 to 8.

37. A dendritic polymer according to claim 32, wherein m is selected from 3, 4 and 6.

38. A dendritic polymer according to claim 32, wherein n is from 0 to 3.

39. A dendritic polymer according to claim 32, wherein in formula (I-1ii), A represents an oxygen atom.

40. A dendritic polymer according to claim 32, wherein B represents an optionally substituted phenyl radical.

41. A dendritic polymer according to claim 32, wherein D represents a hydrogen atom.

42. A dendritic polymer according to claim 32, wherein E represents an -Alkyl radical.

43. A dendritic polymer according to claim 32, wherein G represents a sulfur atom.

44. A dendritic polymer according to claim 32, wherein M$^+$represents a cation of an element of group IA, IIA, IIB or IIIA of the periodic table or a cation of a nitrogen-containing base.

45. A dendritic polymer according to claim 32, wherein M is a sodium or a potassium atom.

46. A dendritic polymer of generation n comprising:
a central core § of valence m;
optionally, generation chains branching around the core;
an intermediate chain at the end of each generation chain that is present, or at the end of each bond around the core, where appropriate; and
a terminal group at the end of each intermediate chain,
wherein said terminal group is represented by the formula:

$$-(A1)<[A2-P(=O)(OX)_2]_2 \quad (T)$$

wherein
-A1< represents the radical —CR< or -Heteroatom<;
the radicals A2, which are identical or different, each independently of the other represents a single bond or a linear or branched hydrocarbon chain having from 1 to 6 chain members, each of said chain members optionally being selected from a heteroatom, each chain member being optionally substituted by one or more substituents selected from -Alkyl, -Hal, —NO$_2$, —NRR', —CN, —CF$_3$, —OH, —OAlkyl, -Aryl, and -Aralkyl;

R and R', which are identical or different, each independently of the other represents a hydrogen atom or an -Alkyl, -Aryl, or -Aralkyl radical;

X represents an -Alkyl or -Aryl radical, —H or /M$^+$, where M is a cation, m represents an integer greater than or equal to 1;

n represents an integer from 0 to 3, and < represents two bonds situated on A1, wherein the intermediate chains are represented by formula:

-J-K-L- (C2)

wherein

J represents an oxygen atom, a sulfur atom or a radical —NR—;

K represents an -Aryl-, —C(=O), -Heteroaryl-, or -Alkyl- radical, each of which is optionally substituted by a Halogen atom or a —NO$_2$, —NRR', —CN, —CF$_3$, —OH, -Alkyl, -Aryl, or -Aralkyl radical;

L represents a linear or branched hydrocarbon chain having from 1 to 6 chain members and optionally having one or more double or triple bonds, each of said chain members optionally being a heteroatom, each chain member being optionally substituted by one or more substituents selected from -Alkyl, -Hal, —NO$_2$, —NRR', —CN, —CF$_3$, —OH, —OAlkyl, -Aryl, and -Aralkyl, wherein R and R', which are identical or different, each independently of the other represents a hydrogen atom or an -Alkyl, -Aryl, or -Aralkyl radical.

47. A dendritic polymer according to claim 46, wherein the generation chains are selected from linear and branched hydrocarbon chains having from 1 to 12 chain members and optionally having one or more double or triple bonds, each of said chain members optionally being selected from a heteroatom, an Aryl radical, a Heteroaryl radical, >C=O, and >C=NR, each chain member being optionally substituted by one or more substituents selected from the group consisting of -Alkyl, -Hal, —NO$_2$, —NRR', —CN, —CF$_3$, —OH, —OAlkyl, -Aryl, and -Aralkyl, wherein R and R', which are identical or different, each independently of the other represents a hydrogen atom or an -Alkyl, -Aryl, or -Aralkyl radical.

48. A dendritic polymer according to claim 46, wherein M$^+$ represents a cation of an element of group IA, IIA, IIB or IIIA of the periodic table or a cation of a nitrogen-containing base.

49. A dendritic polymer according to claim 46, wherein M is selected from the atoms sodium and potassium.

50. A dendritic polymer according to claim 46, wherein the generation chains are identical.

51. A dendritic polymer according to claim 46, wherein the generation chains and intermediate chains are respectively represented by the formula (C1) and (C2):

-A-B-C(D)=N—N(E)-(P(=G))< (C1)

-J-K-L- (C2)

wherein:

A represents an oxygen, sulfur or phosphorus atom or a radical —NR—;

B represents an -Aryl-, -Heteroaryl-, or -Alkyl- radical, each of which is optionally substituted by a Halogen atom or by a —NO$_2$, —NRR', —CN, —CF$_3$, —OH, -Alkyl, -Aryl, or -Aralkyl radical;

C represents a carbon atom,

D and E, which are identical or different, each independently of the other represents a hydrogen atom, or an -Alkyl, —OAlkyl, -Aryl, or -Aralkyl radical, each of which is optionally substituted by a Halogen atom or a —NO$_2$, —NRR', —CN, —CF$_3$, —OH, -Alkyl, -Aryl, or -Aralkyl radical;

G represents a sulfur, oxygen, nitrogen, selenium or tellurium atom or a radical =NR;

N represents a nitrogen atom;

P represents a phosphorus atom;

J represents an oxygen atom, a sulfur atom or a radical —NR—;

K represents a radical -Aryl-, -Heteroaryl-, or -Alkyl-, each of which is optionally substituted by a Halogen atom or a —NO$_2$, —NRR', —CN, —CF$_3$, —OH, -Alkyl, -Aryl, or -Aralkyl radical;

L represents a linear or branched hydrocarbon chain having from 1 to 6 chain members and optionally having one or more double or triple bonds, each of said chain members optionally being a heteroatom, each chain member being optionally substituted by one or more substituents selected from -Alkyl, -Hal, —NO$_2$, —NRR', —CN, —CF$_3$, —OH, —OAlkyl, -Aryl, and -Aralkyl, wherein R and R', which are identical or different, each independently of the other represents a hydrogen atom or an -Alkyl, -Aryl, or -Aralkyl radical.

52. A dendritic polymer according to claim 46, which is represented by the following formula (I-1 i):

§-{{A-B-C(D)=N—N(E)-(P(=G))<}$^n$[J-K-(Alk)$_a$-N<[A2-P(=O)(OX)$_2$]$_2$]$_2$}$_m$ (I-1 i)

in which:

§ represents a central core;

{{A-B-C(D)=N—N(E)-(P(=G))<}$^n$ represents generation chains;

J-K-(Alk)$_a$- represents an intermediate chains;

A represents an oxygen, sulfur or phosphorus atom or a radical —NR—;

B represents an -Aryl-, -Heteroaryl-, or -Alkyl- radical, each of which is optionally substituted by a Halogen atom or a —NO$_2$, —NRR', —CN, —CF$_3$, —OH, -Alkyl, -Aryl, or -Aralkyl radical;

C represents a carbon atom,

D and E, which are identical or different, each independently of the other represents a hydrogen atom, or an -Alkyl, —OAlkyl, -Aryl, or -Aralkyl radical, each of which is optionally substituted by a Halogen atom or a —NO$_2$, —NRR', —CN, —CF$_3$, —OH, -Alkyl, -Aryl, or -Aralkyl radical;

G represents a sulfur, oxygen, nitrogen, selenium or tellurium atom or a radical =NR;

N represents a nitrogen atom;

P represents a phosphorus atom;

R and R', which are identical or different, each independently of the other represents a hydrogen atom or an -Alkyl, -Aryl, or -Aralkyl radical;

J represents an oxygen atom, a sulfur atom or a radical —NR—;

K represents an -Aryl-, -Heteroaryl-, or -Alkyl- radical, each of which is optionally substituted by a Halogen atom or a —NO2, —NRR', —CN, —CF3, —OH, -Alkyl, -Aryl, or -Aralkyl radical;

X represents an -alkyl or -Aryl radical, -H or /M$^+$, where M is a cation, the radicals A2, which are identical or different, each independently of the other represents a single bond or a linear or branched hydrocarbon chain having from 1 to 6 chain members, each of said chain members optionally being selected from a heteroatom, each chain member being optionally substituted by one or more substituents selected from -Alkyl, -Hal, —NO$_2$, —NRR', —CN, —CF$_3$, —OH, —OAlkyl, -Aryl, and -Aralkyl;

m represents an integer greater than or equal to 1;

n represents an integer from 0 to 3;

𝔊$^n$ denotes the branched structure of the generation n chains of said dendritic polymer, and a represents 0 or 1.

53. A method for preparing a dendritic polymer according to claim 46, comprising:
   (i) reacting the corresponding dendritic polymer having a terminal function —CHO, —CH═NR, —NH$_2$ or —P(═G)Cl$_2$ with a corresponding compound having one or two functionalities —PO$_3$X$_2$;
   (ii) optionally followed, when X represents H or M, by a step which comprises converting the dendritic polymer obtained in (i) having a —PO$_3$Me$_2$ termination into the corresponding dendritic polymer having an -A1<[A2-P(═O)(OH)$_2$]$_2$ termination,
   (iii) optionally followed, when X represents M, by a step which comprises converting the dendritic polymer obtained in (ii) having an -A1<[A2-P(═O)(OH)$_2$]$_2$ termination into the salt of the corresponding dendritic polymer having an -A1<[A2-P(═O)(OM)$_2$]$_2$ termination.

54. A method for treating or being in contact with surfaces comprising using a dendritic polymer according to claim 46.

55. A dendritic polymer according to claim 46, wherein J represents an oxygen atom.

56. A dendritic polymer according to claim 46, wherein K represents an optionally substituted -Phenyl- radical.

57. A dendritic polymer according to claim 46, wherein L represents a radical -(Alk)$_a$- or the radical —C(D)═N—N(E)-(Alk)$_a$-, where D and E, which are identical or different, each independently of the other represent a hydrogen atom, or an -Alkyl, —OAlkyl, -Aryl, or -Aralkyl radical, each of which is optionally substituted by a halogen atom or by a —NO$_2$, —NRR', —CN, —CF$_3$, —OH, -Alkyl, -Aryl, or -Aralkyl radical.

58. A dendritic polymer according to claim 46, wherein A2 represents -Me-.

59. A dendritic polymer according to claim 46, wherein the central core § is selected from the group consisting of:

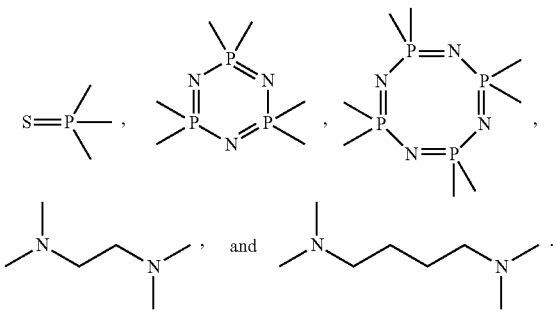

60. A dendritic polymer according to claim 46, wherein the central core § has the formula:

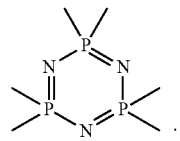

61. A dendritic polymer according to claim 46, wherein m represents an integer from 1 to 8.

62. A dendritic polymer according to claim 46, wherein m is selected from 3, 4 and 6.

* * * * *

UNITED STATES PATENT AND TRADEMARK OFFICE
CERTIFICATE OF CORRECTION

PATENT NO. : 7,838,625 B2  
APPLICATION NO. : 10/580459  
DATED : November 23, 2010  
INVENTOR(S) : Anne-Marie Caminade It is certified that error appears in the above-identified patent and that said Letters Patent is hereby corrected as shown below:

Title Page, Section (73) Assignees: change "Center" to --Centre--.

Signed and Sealed this
Fifteenth Day of February, 2011

David J. Kappos
*Director of the United States Patent and Trademark Office*